US011335350B2

(12) United States Patent
Li et al.

(10) Patent No.: US 11,335,350 B2
(45) Date of Patent: *May 17, 2022

(54) DUAL USE OF AUDIO NOISE LEVEL IN SPEECH-TO-TEXT FRAMEWORK

(71) Applicant: SAS Institute Inc., Cary, NC (US)

(72) Inventors: Xiaolong Li, Cary, NC (US); Xiaozhuo Cheng, Cary, NC (US); Xu Yang, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,966

(22) Filed: Oct. 12, 2021

(65) Prior Publication Data

US 2022/0028396 A1    Jan. 27, 2022

Related U.S. Application Data

(63) Continuation of application No. 17/498,811, filed on Oct. 12, 2021, which is a continuation-in-part of
(Continued)

(51) Int. Cl.
*G10L 15/26* (2006.01)
*G10L 15/16* (2006.01)
(Continued)

(52) U.S. Cl.
CPC ............ *G10L 15/26* (2013.01); *G06N 3/0454* (2013.01); *G06N 3/08* (2013.01); *G10L 15/02* (2013.01);
(Continued)

(58) Field of Classification Search
CPC .......... G10L 15/22; G10L 15/16; G10L 25/78
See application file for complete search history.

(56) References Cited

U.S. PATENT DOCUMENTS

| 2010/0169090 | A1* | 7/2010 | Cui ........................ G10L 15/20 704/233 |
| 2015/0340034 | A1* | 11/2015 | Schalkwyk ............. G10L 15/18 704/235 |

(Continued)

OTHER PUBLICATIONS

Yoshimura et al., "End-to-End Automatic Speech RecognitionIntegrated With CTC-Based Voice Activity Detection" arXiv:2002.00551v2 [eess.AS] Feb. 14, 2020.

*Primary Examiner* — Jialong He
(74) *Attorney, Agent, or Firm* — KDB Firm, PLLC

(57) ABSTRACT

An apparatus includes processor(s) to: perform pre-processing operations including derive an audio noise level of speech audio of a speech data set, derive a first relative weighting for first and second segmentation techniques for identifying likely sentence pauses in the speech audio based on the audio noise level, and select likely sentence pauses for a converged set of likely sentence pauses from likely sentence pauses identified by the first and/or second segmentation techniques based on the first relative weighting; and perform speech-to-text processing operations including divide the speech data set into data segments representing speech segments of the speech audio based on the converged set of likely sentence pauses, and derive a second relative weighting based on the audio noise level for selecting words indicated by an acoustic model or by a language model as being most likely spoken in the speech audio for inclusion in a transcript.

30 Claims, 51 Drawing Sheets

Related U.S. Application Data application No. 17/370,441, filed on Jul. 8, 2021, which is a continuation of application No. PCT/CN2021/082572, filed on Mar. 24, 2021, said application No. 17/498,811 is a continuation-in-part of application No. 17/205,871, filed on Mar. 18, 2021, now Pat. No. 11,145,309, which is a continuation-in-part of application No. 17/138,521, filed on Dec. 30, 2020, now Pat. No. 11,049,502, which is a continuation of application No. 17/138,445, filed on Dec. 30, 2020, now Pat. No. 11,138,979.

(60) Provisional application No. 62/991,275, filed on Mar. 18, 2020.

(51) Int. Cl.
*G10L 15/04* (2013.01)
*G10L 25/78* (2013.01)
*G06N 3/08* (2006.01)
*G06N 3/04* (2006.01)
*G10L 25/30* (2013.01)
*G10L 15/02* (2006.01)

(52) U.S. Cl.
CPC .............. *G10L 15/04* (2013.01); *G10L 25/30* (2013.01); *G10L 25/78* (2013.01); *G10L 2025/783* (2013.01)

(56) References Cited

U.S. PATENT DOCUMENTS

2016/0379632 A1* 12/2016 Hoffmeister ............ G10L 15/18
   704/253
2018/0061439 A1* 3/2018 Diamos ................ G10L 15/063
2018/0090134 A1* 3/2018 Miller ................ G10L 21/0232

* cited by examiner

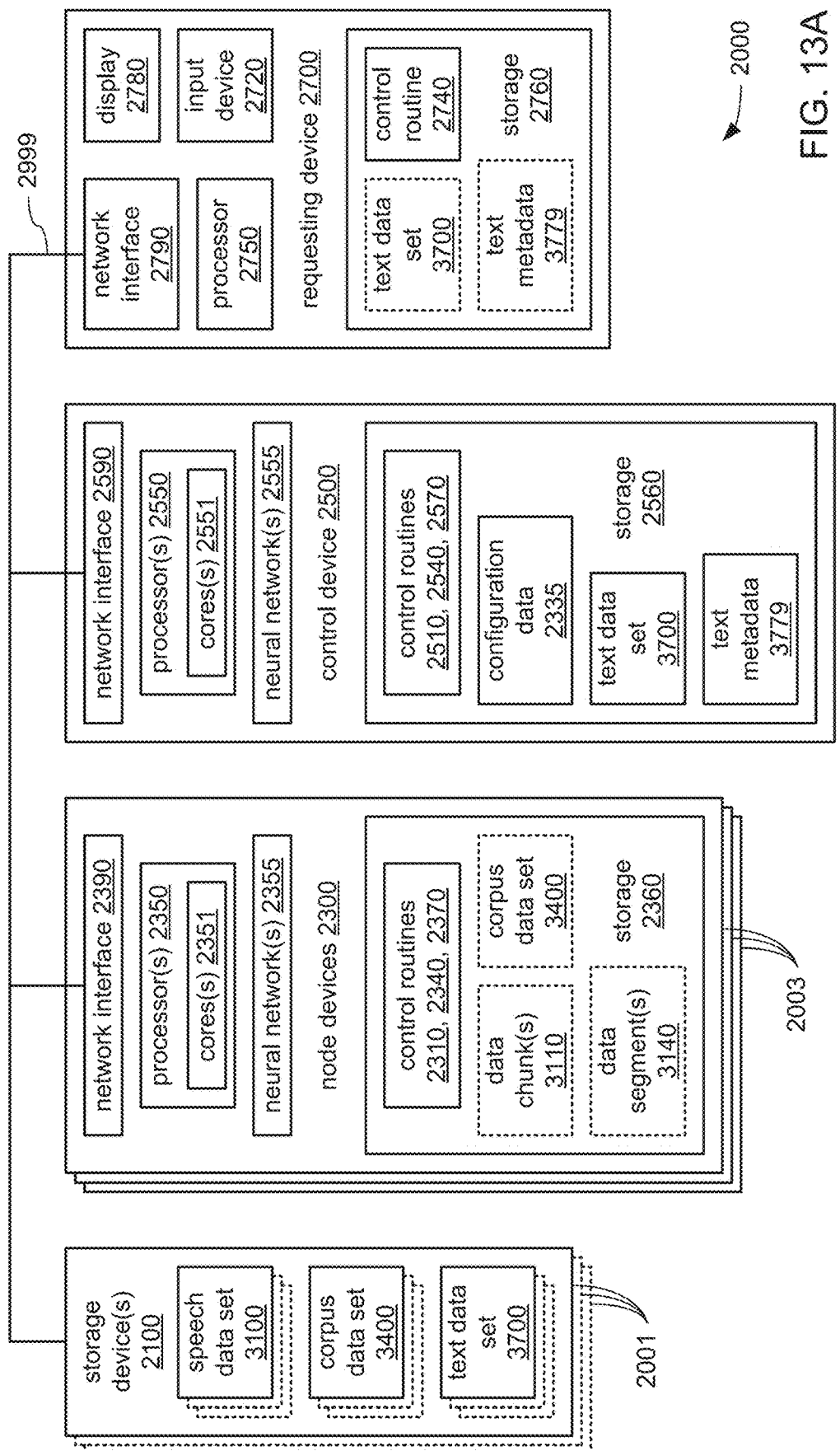

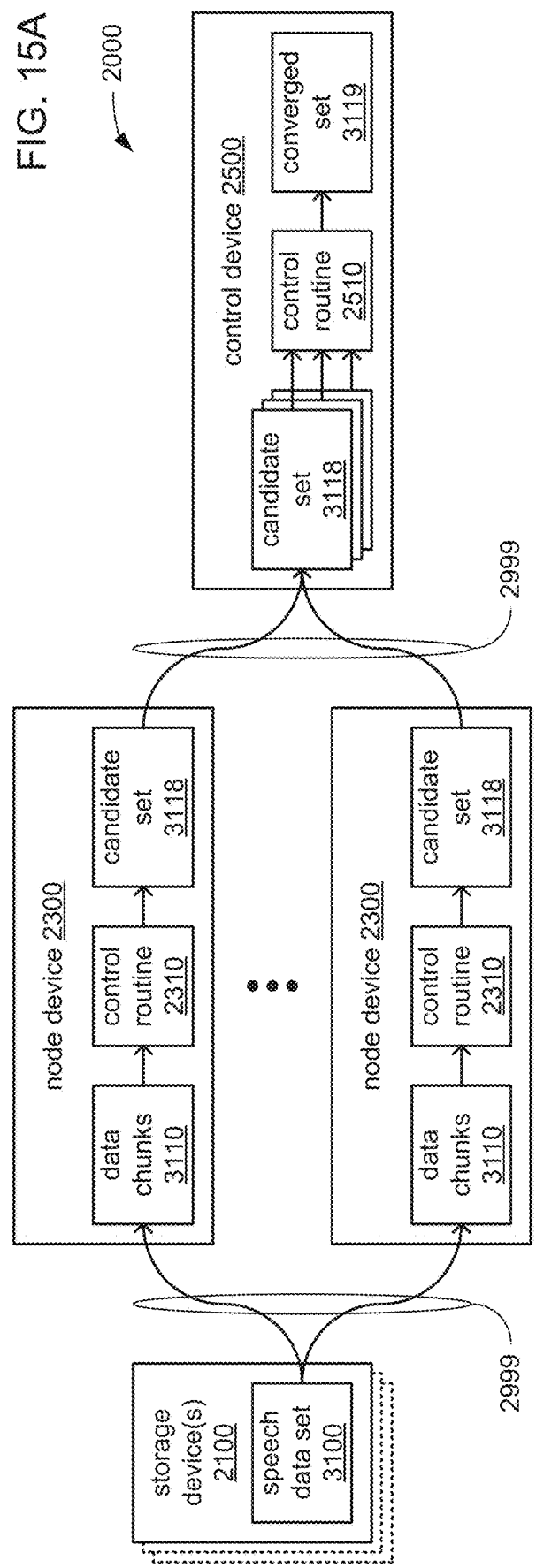

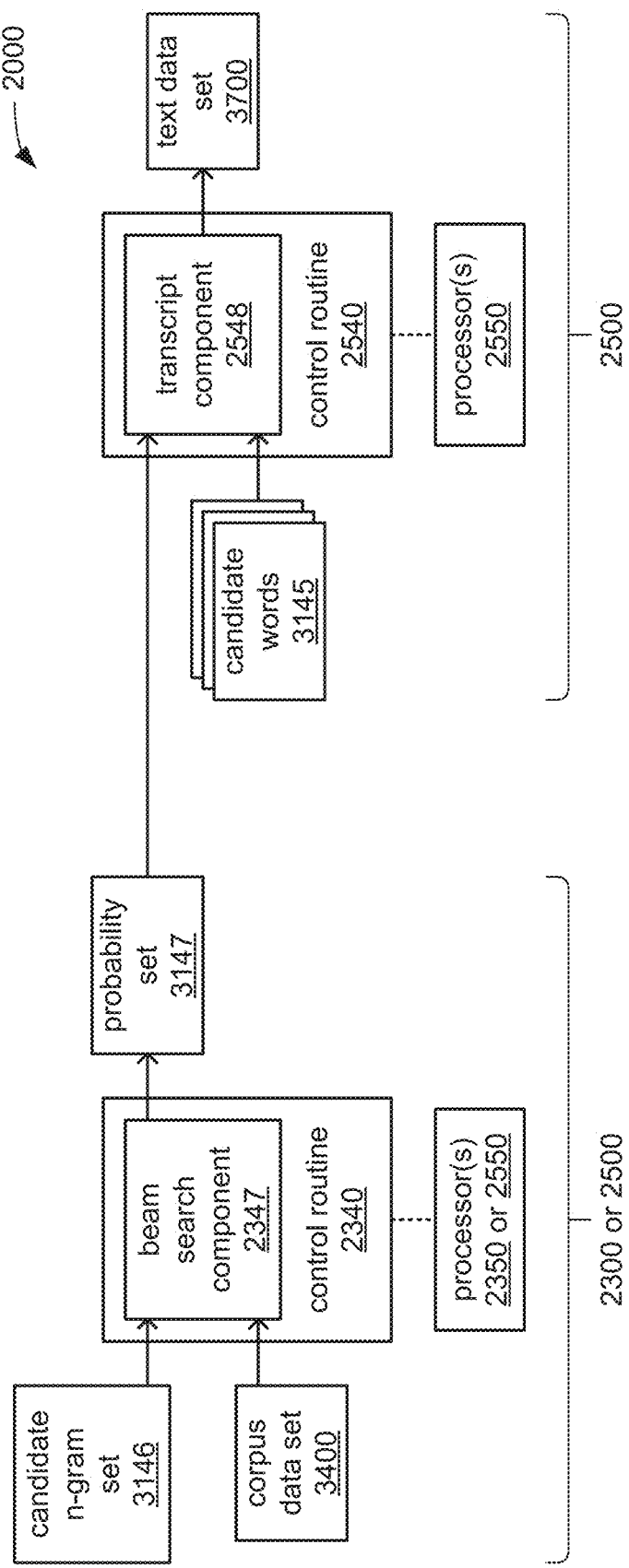

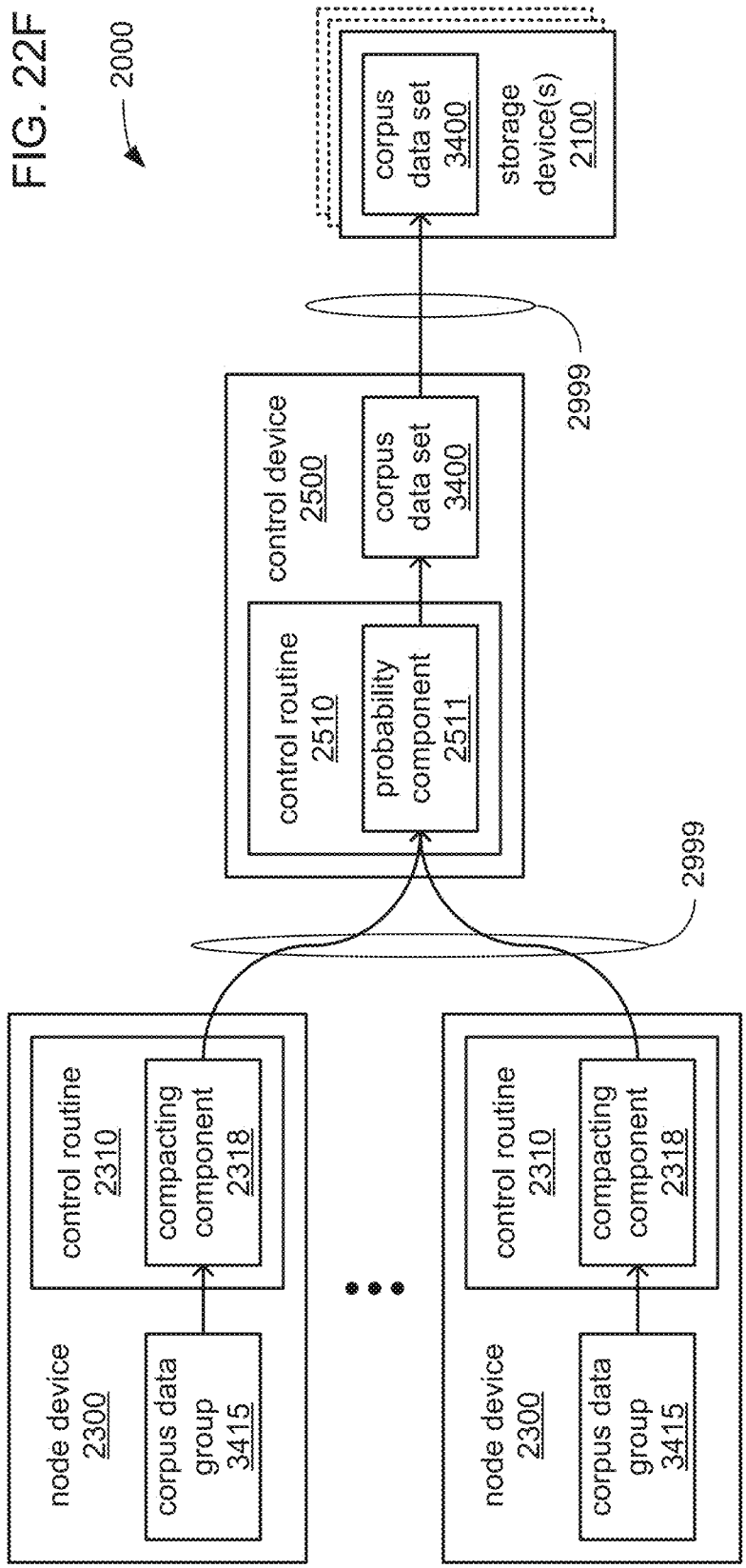

FIG. 22G

| 3431 | 3422a | 3422b | |
|---|---|---|---|
| -1 | <unk> | | -0.2553 |
| -98.9366 | <s> | | -0.3064 |
| -1 | </s> | | 0 |
| -0.699 | wood | | -0.2553 |
| -0.699 | cindy | | -0.2553 |
| -0.699 | pittsburgh | | -0.2553 |
| -0.699 | jean | | -0.1973 |
| -0.2553 | <unk> | wood | |
| -0.2553 | <s> | <unk> | |
| -0.2553 | wood | pittsburgh | |
| -0.2553 | cindy | jean | |
| -0.2553 | pittsburgh | cindy | |
| -0.5563 | jean | </s> | |
| -0.5563 | jean | wood | |

3421, 3432, 3400, 2000

4100

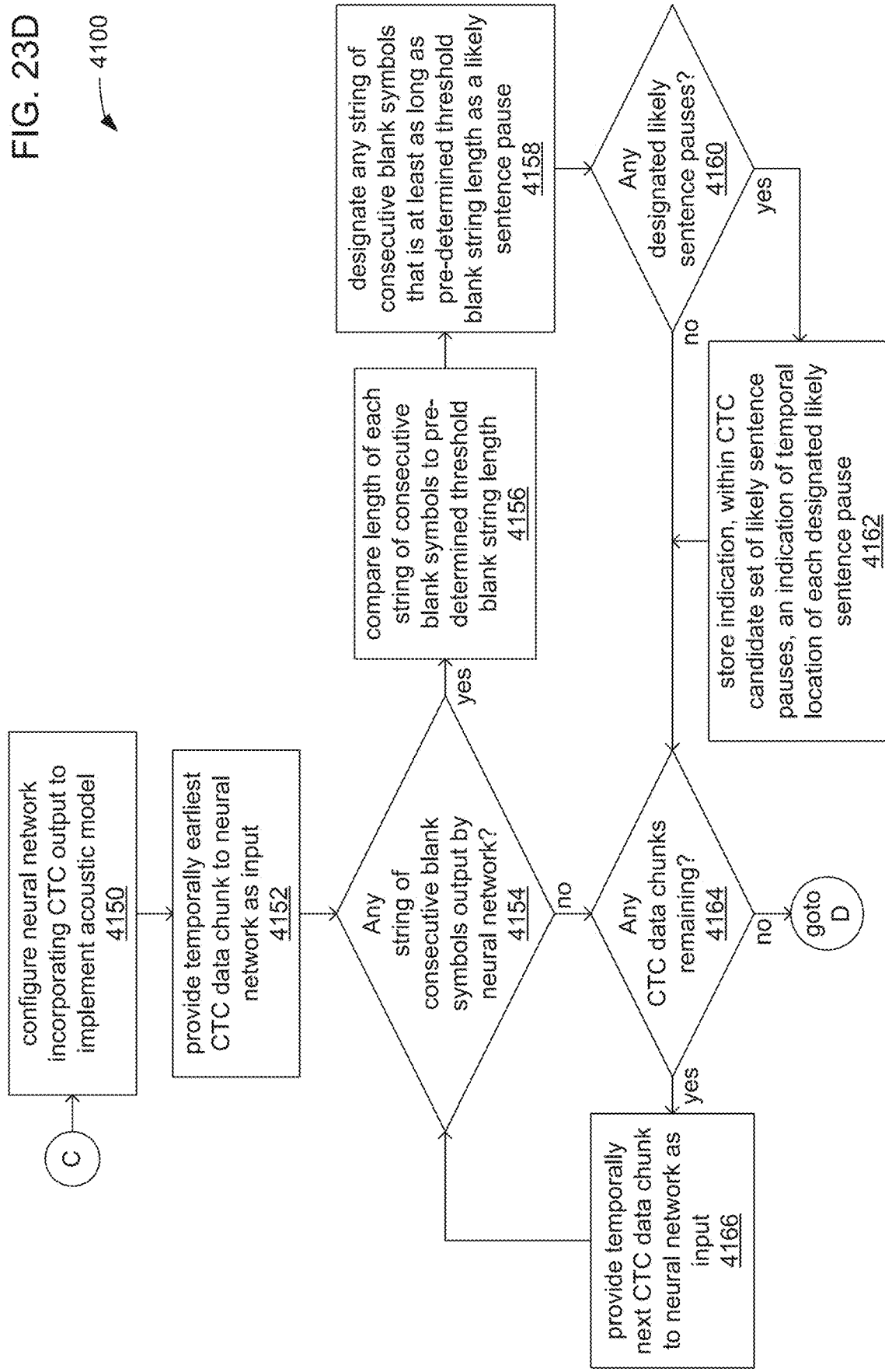

DUAL USE OF AUDIO NOISE LEVEL IN SPEECH-TO-TEXT FRAMEWORK

CROSS-REFERENCE TO RELATED APPLICATIONS

This application is a continuation of, and claims the benefit of priority under 35 U.S.C. § 120 to, U.S. patent application Ser. No. 17/498,811 filed Oct. 12, 2021, and entitled "Dual Use of Acoustic Model in Speech-to-Text Framework", which is incorporated herein by reference in its entirety for all purposes.

U.S. patent application Ser. No. 17/498,811 is a continuation-in-part of, and claims the benefit of priority under 35 U.S.C. § 120 to, U.S. patent application Ser. No. 17/205,871 filed Mar. 18, 2021, and entitled "Dynamic Model Selection In Speech-to-Text Processing"; which is a continuation-in-part of, and claims the benefit of priority under 35 U.S.C. § 120 to, U.S. patent application Ser. No. 17/138,521 filed Dec. 30, 2020, and entitled "Speech Audio Pre-Processing Segmentation"; which is a continuation of, and claims the benefit of priority under 35 U.S.C. § 120 to, U.S. patent application Ser. No. 17/138,445 filed Dec. 30, 2020, and entitled "Speech Audio Pre-Processing Segmentation"; which claims the benefit of priority under 35 U.S.C. § 119(e) to U.S. Provisional Application Ser. No. 62/991,275 filed Mar. 18, 2020, and entitled "A Pipeline for Information Extraction from Audio Files"; each of which is incorporated herein by reference in its entirety for all purposes.

U.S. patent application Ser. No. 17/498,811 is also a continuation-in-part of, and claims the benefit of priority under 35 U.S.C. § 120 to, U.S. patent application Ser. No. 17/370,441 filed Jul. 8, 2021, and entitled "Speech-to-Analytics Framework with Support for Large N-Gram Corpora"; which is a continuation of, and claims the benefit of priority under 35 U.S.C. § 120 to, International Application No. PCT/CN2021/082572 filed Mar. 24, 2021, and entitled "Speech-to-Analytics Framework with Support for Large N-Gram Corpora", each of which is incorporated herein by reference in its entirety for all purposes.

To be more precise, International Application No. PCT/CN2021/082572 designates the United States such that it is eligible to be treated as if it were "a national application for patent regularly filed in the Patent and Trademark Office" with its Mar. 24, 2021 international filing date being treated as the filing date on which such regular filing is deemed to have occurred, as per at least 35 U.S.C. § 363. Therefore, and as per at least 35 U.S.C. § 120 and § 365(c), U.S. patent application Ser. No. 17/370,441 claims domestic priority to International Application No. PCT/CN2021/082572 as a "bypass" application (more specifically, a "bypass" continuation application).

BACKGROUND

It has become commonplace to perform automated speech-to-text conversion of captured speech audio. Such a conversion to text may be performed as part of receiving verbal commands used as input for the provision of various voice-controlled online services. Such a conversion to text may be performed as part of indexing and/or memorializing the contents of recorded voice messages or of phone conversations for future retrieval and reference. Such indexing and/or memorializing may be done as part of archiving official records, preserving testimony in judicial proceedings, preserving data gathered in scientific and/or medical field studies, etc.

Alternatively or additionally, such a conversion to text may be used as part of various automated analyses of the contents of conversations or verbal presentations to retrieve various insights. Such analyses may include an evaluation of the quality of service provided in telephone service calls, the efficiency or effectiveness of communication in emergency services calls, the effectiveness of an effort to disseminate information to the public in press interviews or in other verbal presentations, the audience participation and/or reaction to a verbal presentation, the identification of topic(s) of conversations and/or verbal presentations, the relative degrees of focus of each topic among multiple topics, the relative levels of participation among multiple speakers, the type and/or strength of sentiments concerning topics, etc. Such automated retrieval of insights may be performed to enhance the indexing and/or memorializing the contents of captured speech audio.

Regardless of the purpose for performing automated speech-to-text conversion and/or automated analyses, a longstanding challenge has been improving the accuracy of the speech-to-text conversion and/or of the analyses. As will be familiar to those skilled in the art, there are numerous challenges, including and not limited to, quality issues with the devices used to capture speech audio, high environmental noise levels, languages having multiple dialects, differences in regional accents, differences in idiomatic expressions, and/or per-person differences in pronunciation, speed of speaking, speaking volume, speech impediments, etc. Such accuracy issues with speech-to-text conversion result in the provision of error-laden text as the input to text analyses, which in turn, results in the generation of false and misleading insights.

Over time, various significant improvements have been made to acoustic models and language models that are used. However, there remains challenges in this technical field. By way of example, the preprocessing used to divide streamed speech audio and/or lengthy recorded speech audio into segments has seen comparatively little improvement.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform operations including receive, from a requesting device via a network, a request to perform speech-to-text conversion of a specified speech data set representing speech audio. Also, in response to the request, the at least one processor is caused to perform preprocessing operations of a first segmentation technique including: divide the speech data set into multiple data chunks that each represent a chunk of multiple chunks of the speech audio; use an acoustic model with each data chunk of the multiple data chunks to identify pauses in the speech audio; and analyze a length of time of each identified pause in the speech audio to identify a first candidate set of likely sentence pauses in the speech audio. Further, in response to the request, the at least one processor is caused to perform speech-to-text operations including: based, at least in part, on the first candidate set of likely sentence pauses, divide the speech data set into multiple data segments that each represent a speech segment of multiple speech segments of the speech audio; use the acoustic model with each data segment of the multiple data segments to identify likely speech sounds in the speech audio; analyze the identified likely speech sounds to identify candidate sets of words likely spoken in the speech audio; based, at least in part, on the candidate sets of words likely spoken in the speech audio, generate a transcript of the speech data set; and transmit an indication of the generation of the transcript to the requesting device.

A computer-program product tangibly embodied in a non-transitory machine-readable storage medium includes instructions operable to cause at least one processor to perform operations including receive, from a requesting device via a network, a request to perform speech-to-text conversion of a specified speech data set representing speech audio. Also, in response to the request, the at least one processor is caused to perform pre-processing operations of a first segmentation technique including: divide the speech data set into multiple data chunks that each represent a chunk of multiple chunks of the speech audio; use an acoustic model with each data chunk of the multiple data chunks to identify pauses in the speech audio; and analyze a length of time of each identified pause in the speech audio to identify a first candidate set of likely sentence pauses in the speech audio. Further, in response to the request, the at least one processor is caused to perform speech-to-text operations including: based, at least in part, on the first candidate set of likely sentence pauses, divide the speech data set into multiple data segments that each represent a speech segment of multiple speech segments of the speech audio; use the acoustic model with each data segment of the multiple data segments to identify likely speech sounds in the speech audio; analyze the identified likely speech sounds to identify candidate sets of words likely spoken in the speech audio; based, at least in part, on the candidate sets of words likely spoken in the speech audio, generate a transcript of the speech data set; and transmit an indication of the generation of the transcript to the requesting device.

The acoustic model may be based on a neural network, the neural network may include a connectionist temporal classification (CTC) output, the CTC output may generate strings of one or more blank symbols for the identified pauses, a quantity of blank symbols in each string of one or more blank symbols may correlate to a length of a corresponding identified pause, and the identification of the first candidate set of likely sentence pauses may include: comparing the length of each identified speech pause indicated by a corresponding string of one or more blank symbols to a predetermined blank threshold length; and designating each identified speech pause that is at least as long as the predetermined blank threshold length as a likely sentence pause of the first candidate set of likely sentence pauses.

The acoustic model may output indications of occurrences of speech sounds as indications of occurrences of graphemes of a set of graphemes, the blank symbol may include a grapheme of the set of graphemes that is indicative of a pause between speech sounds, and the identification of candidate sets of words likely spoken in the speech audio may include analyzing the indications of occurrence of graphemes output by the acoustic model to identify combinations of graphemes that correspond to words.

The apparatus may include at least one neuromorphic device to enable instantiation of the acoustic model, and/or the at least one processor may be caused to perform operations including: prior to the use of the acoustic model to identify pauses in the speech audio, configure the at least one neuromorphic device to instantiate at least one instance of the acoustic model; and following the use of the acoustic model to identify pauses in the speech audio, maintain the configuration of the at least one neuromorphic device to maintain the at least one instance of the acoustic model to enable use of the at least one instance of the acoustic model to identify speech sounds in the speech audio.

The apparatus may include a distributed processing system that includes a control device and multiple node devices, the at least one processor may include a processor of the control device and multiple processors of the multiple node devices, and/or the processor of the control device is caused to distribute indications of a configuration of the neural network of the acoustic model to the multiple node devices to enable instantiation of multiple instances of the acoustic model within the multiple node devices by the multiple processors of the multiple node devices.

In response to the request, the at least one processor may be caused to perform pre-processing operations of a second segmentation technique including: divide the speech audio into multiple alternate data chunks that each represent an alternate chunk of multiple alternate chunks of the speech audio; derive a threshold amplitude based on at least one peak amplitude of the speech audio; compare a peak amplitude of the alternate chunk of the speech audio of each alternate data chunk to the threshold amplitude; designate each alternate data chunk with a peak amplitude that is below the threshold amplitude as an alternate pause data chunk; within at least one set of temporally consecutive alternate data chunks of the multiple alternate chunks, identify a longest subset of temporally consecutive alternate pause data chunks; and for each set of the at least one set of temporally consecutive alternate data chunks, store an indication of the longest subset of temporally consecutive alternate pause data chunks as a likely sentence pause of a second candidate set of likely sentence pauses. The division of the of the speech data set into the multiple data segments may be based on a combination of the first candidate set of likely sentence pauses and the second candidate set of likely sentence pauses.

The identification of the first candidate set of likely sentence pauses may include: analyzing each data chunk of the multiple data chunks to identify acoustic features occurring within each corresponding chunk of speech audio; and providing indications of the acoustic features occurring within each chunk of speech audio to the acoustic model as input. The identification of the candidate sets of words likely spoken in the speech audio may include: subdividing a data segment of the multiple data segments into multiple data frames that each represent a portion of the corresponding speech segment; analyzing each data frame of the multiple data frames to identify acoustic features occurring within each corresponding portion of the corresponding speech segment; and providing indications of the acoustic features occurring within each portion of the corresponding speech segment to the acoustic model as input.

The acoustic model may output probability distributions indicative of probabilities of occurrence of speech sounds for each of multiple specific times within a period of time; and the identification of the candidate sets of words likely spoken in the speech audio may include analyzing the probability distributions output by the acoustic model to identify combinations of speech sounds that correspond to words.

In response to the request, the at least one processor may be caused to perform further speech-to-text operations including: use a language model with the candidate sets of words to derive corresponding candidate sets of n-grams accompanied by corresponding indications of relative probabilities of use of each n-gram within each candidate set of n-grams; and use at least one of probability distributions output by the acoustic model or indications of relative probabilities output by the language model to select each word included in the transcript from either a corresponding candidate set of words or a corresponding candidate set of n-grams.

The selection of each word included in the transcript may be further based on a relative weighting of the acoustic model and the language model that is based on a level of audio noise of the speech audio.

A computer-implemented method includes receiving, by at least one processor, and from a requesting device via a network, a request to perform speech-to-text conversion of a specified speech data set representing speech audio. The method also includes, in response to the request, performing pre-processing operations of a first segmentation technique including: dividing the speech data set into multiple data chunks that each represent a chunk of multiple chunks of the speech audio; using, by the at least one processor, an acoustic model with each data chunk of the multiple data chunks to identify pauses in the speech audio; and analyzing, by the at least one processor, a length of time of each identified pause in the speech audio to identify a first candidate set of likely sentence pauses in the speech audio. The method further includes, in response to the request, performing speech-to-text operations including: based, at least in part, on the first candidate set of likely sentence pauses, dividing the speech data set into multiple data segments that each represent a speech segment of multiple speech segments of the speech audio; using, by the at least one processor, the acoustic model with each data segment of the multiple data segments to identify likely speech sounds in the speech audio; analyzing, by the at least one processor, the identified likely speech sounds to identify candidate sets of words likely spoken in the speech audio; based, at least in part, on the candidate sets of words likely spoken in the speech audio, generating, by the at least one processor, a transcript of the speech data set; and transmitting, from the at least one processor, an indication of the generation of the transcript to the requesting device.

The acoustic model may be based on a neural network, the neural network may include a connectionist temporal classification (CTC) output, the CTC output may generate strings of one or more blank symbols for the identified pauses, a quantity of blank symbols in each string of one or more blank symbols may correlate to a length of a corresponding identified pause, and the identification of the first candidate set of likely sentence pauses may include performing operations including: comparing, by the at least one processor, the length of each identified speech pause indicated by a corresponding string of one or more blank symbols to a predetermined blank threshold length; and designating, by the at least one processor, each identified speech pause that is at least as long as the predetermined blank threshold length as a likely sentence pause of the first candidate set of likely sentence pauses.

The acoustic model may output indications of occurrences of speech sounds as indications of occurrences of graphemes of a set of graphemes; the blank symbol may include a grapheme of the set of graphemes that is indicative of a pause between speech sounds; and the identification of candidate sets of words likely spoken in the speech audio may include performing operations comprising analyzing, by the at least one processor, the indications of occurrence of graphemes output by the acoustic model to identify combinations of graphemes that correspond to words.

The method may include: prior to the use of the acoustic model to identify pauses in the speech audio, configuring, by the at least one processor, at least one neuromorphic device to instantiate at least one instance of the acoustic model; and following the use of the acoustic model to identify pauses in the speech audio, maintaining, by the at least one processor, the configuration of the at least one neuromorphic device to maintain the at least one instance of the acoustic model to enable use of the at least one instance of the acoustic model to identify speech sounds in the speech audio.

The at least one processor may include a processor of a control device of a distributed processing system, and multiple processors of multiple node devices of the distributed processing system; and the method may include, distributing, by the processor of the control device, indications of a configuration of the neural network of the acoustic model to the multiple node devices to enable instantiation of multiple instances of the acoustic model within the multiple node devices by the multiple processors of the multiple node devices.

The method may include, in response to the request, performing pre-processing operations of a second segmentation technique including: dividing the speech audio into multiple alternate data chunks that each represent an alternate chunk of multiple alternate chunks of the speech audio; deriving, by the at least one processor, a threshold amplitude based on at least one peak amplitude of the speech audio; comparing, by the at least one processor, a peak amplitude of the alternate chunk of the speech audio of each alternate data chunk to the threshold amplitude; designating, by the at least one processor, each alternate data chunk with a peak amplitude that is below the threshold amplitude as an alternate pause data chunk; within at least one set of temporally consecutive alternate data chunks of the multiple alternate chunks, identifying, by the at least one processor, a longest subset of temporally consecutive alternate pause data chunks; and for each set of the at least one set of temporally consecutive alternate data chunks, storing an indication of the longest subset of temporally consecutive alternate pause data chunks as a likely sentence pause of a second candidate set of likely sentence pauses. The division of the of the speech data set into the multiple data segments may be based on a combination of the first candidate set of likely sentence pauses and the second candidate set of likely sentence pauses.

The identification of the first candidate set of likely sentence pauses may include performing operations including: analyzing, by the at least one processor, each data chunk of the multiple data chunks to identify acoustic features occurring within each corresponding chunk of speech audio; and providing, by the at least one processor, indications of the acoustic features occurring within each chunk of speech audio to the acoustic model as input. The identification of the candidate sets of words likely spoken in the speech audio may include performing operations including: subdividing a data segment of the multiple data segments into multiple data frames that each represent a portion of the corresponding speech segment; analyzing, by the at least one processor, each data frame of the multiple data frames to identify acoustic features occurring within each corresponding portion of the corresponding speech segment; and providing, by the at least one processor, indications of the acoustic features occurring within each portion of the corresponding speech segment to the acoustic model as input.

The acoustic model may output probability distributions indicative of probabilities of occurrence of speech sounds for each of multiple specific times within a period of time; and the identification of the candidate sets of words likely spoken in the speech audio may include performing operations comprising analyzing, by the at least one processor, the probability distributions output by the acoustic model to identify combinations of speech sounds that correspond to words.

In response to the request, performing further speech-to-text operations may include: using, by the at least one processor, a language model with the candidate sets of words to derive corresponding candidate sets of n-grams accompanied by corresponding indications of relative probabilities of use of each n-gram within each candidate set of n-grams; and using, by the at least one processor, at least one of probability distributions output by the acoustic model or indications of relative probabilities output by the language model to select each word included in the transcript from either a corresponding candidate set of words or a corresponding candidate set of n-grams.

The selection of each word included in the transcript may be further based on a relative weighting of the acoustic model and the language model that is based on a level of audio noise of the speech audio.

An apparatus includes at least one processor and a storage to store instructions that, when executed by the at least one processor, cause the at least one processor to perform operations including receive, from a requesting device via a network, a request to perform speech-to-text conversion of a specified speech data set representing speech audio. In response to the request, the at least one processor is caused to perform pre-processing operations including: derive an audio noise level based on at least one measure of a level of audio noise of the speech audio; based on the audio noise level, derive a first relative weighting for a first segmentation technique for identifying likely sentence pauses in the speech audio and a second segmentation technique for identifying likely sentence pauses in the speech audio, wherein the first segmentation technique becomes more susceptible than the second segmentation technique to inaccuracies in identifying likely sentence pauses as the audio noise level increases; and based on the first relative weighting, select likely sentence pauses for inclusion in a converged set of likely sentence pauses from among the likely sentence pauses identified by the first segmentation technique and from among the likely sentence pauses identified by the second segmentation technique. In response to the request, the at least one processor is caused to perform speech-to-text processing operations including: based on the converged set of likely sentence pauses, divide the speech data set into multiple data segments that each represent a speech segment of multiple speech segments of the speech audio; use an acoustic model with each data segment of the multiple data segments to identify candidate sets of words likely spoken in the speech audio; based on the audio noise level, derive a second relative weighting for selecting each word to include in generating a transcript of the speech audio from candidate words indicated by the acoustic model as most likely spoken or candidate words indicated by a language model as most likely spoken; and transmit an indication of the generation of the transcript to the requesting device.

A computer-program product tangibly embodied in a non-transitory machine-readable storage medium includes instructions operable to cause at least one processor to perform operations including receive, from a requesting device via a network, a request to perform speech-to-text conversion of a specified speech data set representing speech audio. In response to the request, the at least one processor is caused to perform pre-processing operations including: derive an audio noise level based on at least one measure of a level of audio noise of the speech audio; based on the audio noise level, derive a first relative weighting for a first segmentation technique for identifying likely sentence pauses in the speech audio and a second segmentation technique for identifying likely sentence pauses in the speech audio, wherein the first segmentation technique becomes more susceptible than the second segmentation technique to inaccuracies in identifying likely sentence pauses as the audio noise level increases; and based on the first relative weighting, select likely sentence pauses for inclusion in a converged set of likely sentence pauses from among the likely sentence pauses identified by the first segmentation technique and from among the likely sentence pauses identified by the second segmentation technique. In response to the request, the at least one processor is caused to perform speech-to-text processing operations including: based on the converged set of likely sentence pauses, divide the speech data set into multiple data segments that each represent a speech segment of multiple speech segments of the speech audio; use an acoustic model with each data segment of the multiple data segments to identify candidate sets of words likely spoken in the speech audio; based on the audio noise level, derive a second relative weighting for selecting each word to include in generating a transcript of the speech audio from candidate words indicated by the acoustic model as most likely spoken or candidate words indicated by a language model as most likely spoken; and transmit an indication of the generation of the transcript to the requesting device.

In response to the request, the at least one processor may be caused to perform further pre-processing operations of one of the first segmentation technique and the second segmentation technique, the further pre-processing operations including: divide the speech data set into multiple data chunks that each represent a chunk of multiple chunks of the speech audio; derive a threshold amplitude based on at least one peak amplitude of the speech audio; compare a peak amplitude of the chunk of the speech audio of each data chunk to the threshold amplitude; designate each data chunk with a peak amplitude that is below the threshold amplitude as a pause data chunk; within at least one set of temporally consecutive data chunks of the multiple data chunks, identify a longest subset of temporally consecutive pause data chunks; and within each set of the at least one set of temporally consecutive data chunks, designate the longest subset of temporally consecutive pause data chunks as a likely sentence pause.

The at least one processor may be caused to derive the audio noise level at least partially in parallel with the derivation of the threshold amplitude.

In response to the request, the at least one processor may be caused to perform further pre-processing operations of one of the first segmentation technique and the second segmentation technique, the further pre-processing operations including: divide the speech data set into multiple data chunks that each represent a chunk of multiple chunks of the speech audio; configure a neural network to implement the acoustic model, wherein the neural network comprises a connectionist temporal classification (CTC) output; provide each data chunk of the multiple data chunks to the neural network as an input and monitor the CTC output for a string of blank symbols generated based on the speech chunk;

compare a length of each string of blank symbols from the CTC output to a predetermined blank threshold length; and designate each string of blank symbols from the CTC output that is at least as long as the predetermined blank threshold length as a likely sentence pause.

The at least one processor may be caused, in response to the audio noise level exceeding a predetermined upper threshold noise level, to exclude likely sentence pauses identified by the first segmentation technique from inclusion in the converged set of likely sentence pauses.

In response to the request, the at least one processor may be caused to perform further speech-to-text processing operations including: use the acoustic model to generate a first set of probabilities of speech sounds within a portion of the speech audio; derive at least a first candidate word of a set of candidate words most likely spoken in the speech audio using the first set of probabilities; analyze the first set of probabilities to derive a degree of uncertainty of the first set of probabilities; in response to at least the degree of uncertainty and the second relative weighting, select either the first candidate word, or a second candidate word of the set of candidate words indicated as being most likely spoken based on a second set of probabilities generated by the language model, as a next word most likely spoken in the speech audio; and add the next word most likely spoken to the transcript.

The at least one processor may be caused to condition expending processing resources to use the language model to generate the second set of probabilities on at least one of the degree of uncertainty of the first set of probabilities being less than a threshold degree of uncertainty or the audio noise level being less than a predetermined lower threshold audio noise level.

The at least one processor may be caused, in response to the audio noise level exceeding a predetermined upper threshold audio noise level, to exclude probabilities generated by the acoustic model in selecting words to include in the transcript.

The first set of probabilities may include at least one probability distribution indicative of relative probabilities of utterance of each grapheme of a pre-selected set of graphemes at a time during pronunciation of speech sounds of the next word; and analysis of the first set of probabilities to derive the degree of uncertainty may include deriving a degree of entropy or perplexity for each probability distribution of the at least one probability distribution.

The language model may be based on an n-gram corpus including n-grams correlated to corresponding probabilities of use in a pre-selected language, and the use of the language model to generate the second set of probabilities may include the at least one processor performing operations including: for each candidate word of the set of candidate words, generate a corresponding candidate n-gram of a set of candidate n-grams that comprises a combination of the candidate word and at least one preceding word spoken in the speech audio; for each candidate n-gram, search the n-gram corpus for the candidate n-gram to retrieve the corresponding probability for inclusion in the second set of probabilities; determine which candidate n-gram of the set of candidate n-grams corresponds to the highest probability among the second set of probabilities; and indicate the candidate word that corresponds to the candidate n-gram that corresponds to the highest probability of the second set of probabilities as being the second candidate word.

A computer-implemented method includes receiving, by at least one processor, and from a requesting device via a network, a request to perform speech-to-text conversion of a specified speech data set representing speech audio. The method also includes, in response to the request, performing pre-processing operations including: deriving, by the at least one processor, an audio noise level based on at least one measure of a level of audio noise of the speech audio; based on the audio noise level, deriving, by the at least one processor, a first relative weighting for a first segmentation technique for identifying likely sentence pauses in the speech audio and a second segmentation technique for identifying likely sentence pauses in the speech audio, wherein the first segmentation technique becomes more susceptible than the second segmentation technique to inaccuracies in identifying likely sentence pauses as the audio noise level increases; and based on the first relative weighting, selecting, by the at least one processor, likely sentence pauses for inclusion in a converged set of likely sentence pauses from among the likely sentence pauses identified by the first segmentation technique and from among the likely sentence pauses identified by the second segmentation technique. The method further includes, in response to the request, performing speech-to-text processing operations including: based on the converged set of likely sentence pauses, dividing the speech data set into multiple data segments that each represent a speech segment of multiple speech segments of the speech audio; using, by the at least one processor, an acoustic model with each data segment of the multiple data segments to identify candidate sets of words likely spoken in the speech audio; based on the audio noise level, deriving, by the at least one processor, a second relative weighting for selecting each word to include in generating a transcript of the speech audio from candidate words indicated by the acoustic model as most likely spoken or candidate words indicated by a language model as most likely spoken; and transmitting, from the at least one processor, an indication of the generation of the transcript to the requesting device.

The method may include, in response to the request, performing further pre-processing operations of one of the first segmentation technique and the second segmentation technique, the further pre-processing operations including: dividing the speech data set into multiple data chunks that each represent a chunk of multiple chunks of the speech audio; deriving, by the at least one processor, a threshold amplitude based on at least one peak amplitude of the speech audio; comparing, by the at least one processor, a peak amplitude of the chunk of the speech audio of each data chunk to the threshold amplitude; designating, by the at least one processor, each data chunk with a peak amplitude that is below the threshold amplitude as a pause data chunk; within at least one set of temporally consecutive data chunks of the multiple data chunks, identifying, by the at least one processor, a longest subset of temporally consecutive pause data chunks; and within each set of the at least one set of temporally consecutive data chunks, designating, by the at least one processor, the longest subset of temporally consecutive pause data chunks as a likely sentence pause.

The method may include deriving, by the at least one processor, the audio noise level at least partially in parallel with the derivation of the threshold amplitude.

The method may include, in response to the request, performing further pre-processing operations of one of the first segmentation technique and the second segmentation technique, the further pre-processing operations including: dividing the speech data set into multiple data chunks that each represent a chunk of multiple chunks of the speech audio; configuring, by the at least one processor, a neural network to implement the acoustic model, wherein the neural network comprises a connectionist temporal classification (CTC) output; providing, by the at least one processor, each data chunk of the multiple data chunks to the neural network as an input and monitor the CTC output for a string of blank symbols generated based on the speech chunk; comparing, by the at least one processor, a length of each string of blank symbols from the CTC output to a predetermined blank threshold length; and designating, by the at least one processor, each string of blank symbols from the CTC output that is at least as long as the predetermined blank threshold length as a likely sentence pause.

The method may include, in response to the audio noise level exceeding a predetermined upper threshold noise level, excluding likely sentence pauses identified by the first segmentation technique from inclusion in the converged set of likely sentence pauses.

The method may include, in response to the request, performing further speech-to-text processing operations including: using, by the at least one processor, the acoustic model to generate a first set of probabilities of speech sounds within a portion of the speech audio; deriving, by the at least one processor, at least a first candidate word of a set of candidate words most likely spoken in the speech audio using the first set of probabilities; analyzing, by the at least one processor, the first set of probabilities to derive a degree of uncertainty of the first set of probabilities; in response to at least the degree of uncertainty and the second relative weighting, selecting, by the at least one processor, either the first candidate word, or a second candidate word of the set of candidate words indicated as being most likely spoken based on a second set of probabilities generated by the language model, as a next word most likely spoken in the speech audio; and adding the next word most likely spoken to the transcript.

The method may include conditioning, by the at least one processor, expending processing resources to use the language model to generate the second set of probabilities on at least one of the degree of uncertainty of the first set of probabilities being less than a threshold degree of uncertainty or the audio noise level being less than a predetermined lower threshold audio noise level.

The method may include, in response to the audio noise level exceeding a predetermined upper threshold audio noise level, excluding, by the at least one processor, probabilities generated by the acoustic model in selecting words to include in the transcript.

The first set of probabilities may include at least one probability distribution indicative of relative probabilities of utterance of each grapheme of a pre-selected set of graphemes at a time during pronunciation of speech sounds of the next word; and analysis of the first set of probabilities to derive the degree of uncertainty may include performing operations comprising deriving, by the at least one processor, a degree of entropy or perplexity for each probability distribution of the at least one probability distribution.

The language model may be based on an n-gram corpus comprising n-grams correlated to corresponding probabilities of use in a pre-selected language; and the use of the language model to generate the second set of probabilities may include performing operations including: for each candidate word of the set of candidate words, generating, by the at least one processor, a corresponding candidate n-gram of a set of candidate n-grams that comprises a combination of the candidate word and at least one preceding word spoken in the speech audio; for each candidate n-gram, searching, by the at least one processor, the n-gram corpus for the candidate n-gram to retrieve the corresponding probability for inclusion in the second set of probabilities; determining, by the at least one processor, which candidate n-gram of the set of candidate n-grams corresponds to the highest probability among the second set of probabilities; and indicating the candidate word that corresponds to the candidate n-gram that corresponds to the highest probability of the second set of probabilities as being the second candidate word.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 13A and 13B each illustrate an example embodiment of a processing system.

FIGS. 15A, 15B, 15C, 15D and 15E, together, illustrate aspects of a framework defining a set of processing operations to be performed to derive insights from the contents of recorded and stored speech audio.

FIGS. 20A, 20B, 20C, 20D and 20E, taken together, illustrate an example of using the candidate sets of words, sets of candidate n-grams and an n-gram language model to generate transcript(s).

FIGS. 22A, 22B, 22C, 22D, 22E, 22F and 22G, together, illustrate aspects of the generation and/or augmentation of a larger than commonplace n-gram corpus of the type that may be used as described in the processing operations of FIGS. 20A-E and 21A-B.

FIGS. 23A, 23B, 23C, 23D and 23E, together, illustrate an example logic flow of operations performed within a processing system to perform pre-processing and speech-to-text processing operations.

DETAILED DESCRIPTION

Figure 1:
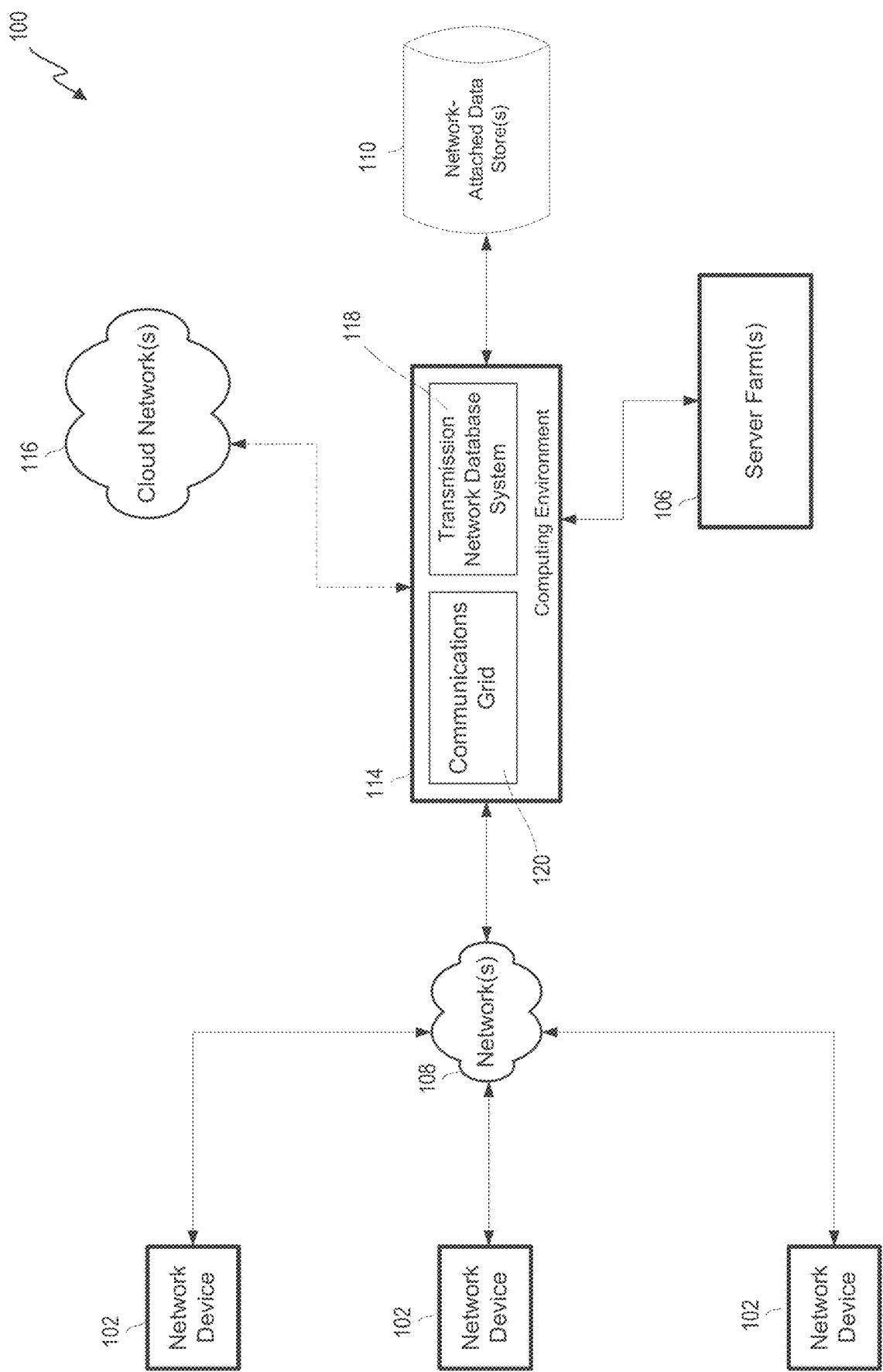
FIG. 1 illustrates a block diagram that provides an illustration of the hardware components of a computing system, according to some embodiments of the present technology.

Various embodiments are generally directed to techniques for improving the accuracy of speech-to-text conversion and efficacy of associated text analytics. More specifically, a framework for the derivation of insights into the content of pieces of speech audio may incorporate a chain of pre-processing, processing and post-processing operations that are selected to provide improved insights. During pre-processing, as an alternative to the commonplace approach of simply dividing speech audio into equal-length segments without regard to its content, a combination of techniques is used to identify likely sentence pauses to enable the division of the speech audio into speech segments at likely sentence pauses so that the resulting speech segments are more likely to contain the pronunciations of complete sentences. During speech-to-text processing, the derived probability distributions associated with the identification of more likely graphemes (e.g., text characters representing phonemes) and/or pauses by an acoustic model, as well as the probability distributions associated with the identification of more likely n-grams by a language model, are used in identifying the sentences spoken in the speech audio to generate a corresponding transcript. During text analytics post-processing, the corresponding transcript is analyzed to select words that are pertinent to identifying topics or sentiments about topics, and/or analyzed along with other transcripts to identify relationships between different pieces of speech audio.

Turning to the pre-processing operations, as will be familiar to those skilled in the art, many of the components employed in performing many of the processing operations of speech-to-text conversion (e.g., acoustic feature detection, acoustic models, language models, etc.) have capacity limits on how large a portion of speech audio is able to be accepted as input such that speech audio must be divided into segments that fit within such capacity limits. As part of an improved approach to dividing speech audio into such segments, a combination of multiple segmentation techniques is used to provide improved identification of pauses in the speech audio that are likely to be pauses between sentences to enable the division of the speech audio into segments at the midpoints within such likely sentence pauses. By dividing speech audio at midpoints within likely sentence pauses to form the segments, each segment is caused to include a higher proportion of complete pronunciations of whole phonemes, whole words, whole phrases and/or whole sentences, thereby enabling greater accuracy in the performance of subsequent processing operations. Also, with fewer phonemes and/or other speech parts being split across the divides between pairs of adjacent segments, there are fewer fragments of phonemes or other speech parts to potentially cause the errant identification of extra text characters and/or words that aren't actually present. Thus, such improvements in the identification of likely sentence pauses during pre-processing serves to enable corresponding improvements in subsequent processing operations to identify text characters, whole words, phrases and/or sentences.

As will be familiar to those skilled in the art, there are many linguistic characteristics that vary greatly among the wide variety of languages that are spoken around the world. By way of example, the manner in which combinations of tone, volume, generation of vowels versus consonants, etc., are used to form words may different greatly between languages. However, the manner in which the relative lengths of pauses are used to separate sounds within words, to separate words within sentences, and to separate sentences tend to be quite similar. More specifically, the relatively short lengths of pauses between sounds within words tend to arise more out of the time needed to reposition portions of the vocal tract when transitioning from producing one sound to producing another sound amidst pronouncing a word. In contrast, the somewhat longer lengths of pauses between words tend to be dictated more by linguistic rules that provide a mechanism to enable a listener to hear the pronunciations of individual words more easily. Similarly, the still longer lengths of pauses between sentences also tend to be dictated by linguistic rules that provide a mechanism to make clear where the speaking of one sentence ends, and the speaking of the next sentence begins. Thus, the ability to identify pauses and/or to distinguish among pauses within words, pauses between words and/or pauses between sentences may be used by each of the multiple segmentation techniques to identify likely sentence pauses at which speech audio may be divided into segments in a manner that may be independent of the language that is spoken.

In preparation for the performance of the multiple segmentation techniques, the speech audio may be initially divided into equal-length chunks. The full set of chunks of the speech audio may then be provided as an input to each of multiple segmentation techniques, which may be performed, at least partially in parallel, to each independently generate its corresponding data structure specifying its corresponding candidate set of what are deemed to be likely sentence pauses present within the speech audio.

In some embodiments, the multiple segmentation techniques may include an adaptive peak amplitude (APA) segmentation technique in which a peak amplitude is separately determined for each chunk of the speech audio, with a threshold amplitude being derived therefrom that is used to distinguish pauses from speech sounds. More precisely, the peak amplitude that occurs within each chunk is measured, and then a preselected percentile amplitude across all of peak amplitudes of all of the chunks is derived to become a threshold amplitude. With the threshold amplitude so derived, all of the chunks with a peak amplitude above the threshold amplitude are deemed to be speech chunks, while all of the chunks with a peak amplitude below the threshold amplitude are deemed to be pause chunks. In this way, the threshold amplitude used in distinguishing pauses from speech sounds is caused to be adaptive to provide some degree of resiliency in addressing differences in speech audio amplitude and/or in audio noise levels that may thwart the typical use of a fixed threshold amplitude to distinguish between pauses and speech sounds.

Another adaptive mechanism may then be used to distinguish a pause occurring between sentences from other shorter pauses occurring between words or occurring within words, as well as to distinguish from still other shorter pauses that may occur as a result of various anomalies in capturing the speech audio. Starting at the beginning of the speech audio, a window that covers a preselected quantity of temporally adjacent chunks may be shifted across the length of the speech audio, starting with the earliest chunk and proceeding through temporally adjacent chunks toward the temporally latest chunk. More specifically, with the window positioned to begin with the earliest chunk, measurements of the lengths of each identified pause within the window may be taken to identify the longest pause thereamong (i.e., the pause made up of the longest set of consecutive pause chunks). The longest pause that is so identified within the window may then be deemed likely to be a sentence pause. The window may then be shifted away from the earliest chunk and along the speech audio so as to cause the window to now begin with the chunk just after the just-identified likely sentence pause. With the window so repositioned, again, measurements of the lengths of each identified pause within the window may be taken to again identify the longest pause thereamong. Again, the longest pause that is so identified within the window may be deemed likely to be a sentence pause. This may be repeated until the window has been shifted along the entirety of the length of the speech audio to the temporally latest chunk.

Each of the pauses that has been deemed a likely sentence pause may be added to the candidate set of likely sentence pauses derived by the APA segmentation technique. The length of the window may be selected to ensure that there cannot be a distance between any adjacent pair of likely sentence pauses that is greater than a capacity limitation that may be present in subsequent processing. Alternatively or additionally, it may be that instances of any adjacent pair of likely sentence pauses that are closer to each other than a predetermined threshold period of time are not permitted. Wherever such a pair of all-too-close adjacent likely sentence pauses might occur, one or the other may be removed from (or not be permitted to be added to) the candidate set of likely sentence pauses.

Alternatively or additionally, in some embodiments, the multiple segmentation techniques may include the use of a connectionist temporal classification (CTC) segmentation technique in which instances of consecutive blank symbols (sometimes also referred to as "non-alphabetical symbols" or "artificial symbols") generated by a CTC output of a neural network trained to implement an acoustic model are used to identify likely sentence pauses. A neural network incorporating a CTC output and trained to implement an acoustic model would normally be used to identify likely graphemes, such as text characters representing likely phoneme(s), in speech audio based on various acoustic features that are identified as present therein. In such normal use, the CTC output serves to augment the probabilistic indications of such text characters (graphemes) that are generated by the neural network with blank symbols that serve to identify instances of consecutive occurrences of the same text character (e.g., the pair of "s" characters in the word "chess"), despite the absence of an acoustic feature that would specifically indicate such a situation (e.g., no acoustic feature in the pronunciation of the "s" sound in the word "chess" that indicates that there are two consecutive "s" characters therein). However, it has been observed through experimentation that the CTC output of such a trained neural network may also be useful in identifying sentence pauses, as it has been observed that the CTC output has a tendency to generate relatively long strings of consecutive blank symbols that tend to correspond to where sentence pauses occur.

In using such a trained neural network for the detection of sentence pauses, each chunk is provided to the neural network as an input, and the CTC output for that chunk is monitored for occurrences of strings of consecutive blank symbols, and the length of each such string is compared to a threshold blank string length. Each string of consecutive blank symbols that is at least as long as the threshold blank string length may be deemed to correspond to what is likely a sentence pause. In some embodiments, the threshold blank string length may be derived during training of the neural network to implement the acoustic model, and/or during testing of the results of that training. Portions of speech audio that are known to include pauses between sentences may be provided as input to the neural network and the lengths of the strings of consecutive blank symbols that are output may be monitored to determine what the threshold blank string length should be. Regardless of the exact manner in which the threshold blank string length is arrived at, each of the pauses that has been deemed a likely sentence pause may be added to the candidate set of likely sentence pauses derived by the CTC segmentation technique.

It should be noted that, in some embodiments, the same trained neural network with CTC output that is employed in the CTC segmentation technique during pre-processing may also be employed during the subsequent processing to perform the function for which it was trained. Specifically, that same trained neural network may be used to identify likely text characters from acoustic features detected in the speech audio, including using its CTC output to augment such probabilistic indications of text characters with blank symbols indicative of instances in which there are likely instances of consecutive occurrences of the same text character.

Following the completion of the performances of all of the multiple segmentation techniques, the resulting multiple candidate sets of likely sentence pauses may then be combined in any of a variety of ways to generate a single converged set of likely sentence pauses. In some embodiments, the manner in which multiple candidate sets of likely sentence pauses are combined to derive the converged set of likely sentence pauses may include the use of relative weighting factors that may be dynamically adjusted based on levels of audio noise detected as being present within the speech audio. This may be done in recognition of each of the different segmentation techniques being more or less susceptible than others to audio noise. More specifically, in some embodiments, as the speech audio is being divided into chunks and/or as peak amplitudes are being measured across all of the chunks, a minimum amplitude may also be measured across all of the chunks as part of determining a level of audio noise that is present in the speech audio. The audio noise level may then be used, as a basis for adjusting relative weighting factors assigned to each segmentation technique. Such relative weighting factors may then be used in combining the multiple candidate sets of likely sentence pauses generated by the different segmentation techniques as part of deriving the converged set of likely sentence pauses for each chunk. Regardless of the exact manner in which the converged set of likely sentence pauses is generated from the multiple candidate sets, upon completion of the pre-processing operations, there may be no further use made of the chunks into which the speech audio was initially divided.

With the converged set of likely sentence pauses having been generated, the speech audio may then be divided, again, to form speech segments, where each such division between two segments occurs at the midpoint of one of the likely sentence pauses indicated in the converged set of likely sentence pauses. Thus, unlike the earlier chunks of the speech audio, each of the speech segments is more likely to contain the pronunciation of an entire spoken sentence, thereby decreasing the likelihood that the pronunciations of words may be split across segments, and increasing the likelihood that the entire context of each word will be present within a single segment. In this way, each speech segment is more likely to contain a more complete set of the acoustic information needed to identify graphemes, phonemes, text characters, words, phrases, sentences etc. in the speech-to-text processing operations, thereby enabling greater accuracy in doing so.

Turning to the speech-to-text processing operations, each of the speech segments may be provided as input to a feature detector, in which the speech audio within each speech segment is searched for any instances of a pre-selected set of particular acoustic features. It may be that multiple instances of the feature detector are executed, at least partially in parallel, across multiple threads of execution within a single device, and/or across multiple node devices. As part of such feature detection, each speech segment may be divided into multiple speech frames that are each of an equal temporal length, and each speech frame of a speech segment may be provided, one at a time, as input to a feature detector. As each instance of an acoustic feature is identified within a speech frame, an indication of the type of acoustic feature identified and when it occurs within the span of time covered by the speech frame may be stored within the feature vector that corresponds to the speech frame. The feature vectors for each speech segment may then be used by a combination of acoustic and language models to identify spoken words and generate a transcript.

More precisely, the feature vectors for each speech segment may be provided as input to an acoustic model. The acoustic model may be implemented using any of a variety of technologies, including and not limited to, a neural network, a hidden Markov model, or a finite state machine. It may be that multiple instances of the acoustic model are instantiated and used, at least partially in parallel, across multiple threads of execution within a single device, and/or across multiple node devices. Based on the acoustic features that are identified by each feature vector as present within its corresponding speech frame, the acoustic model may generate probability distributions of the grapheme(s) that were spoken within each speech frame, and/or of the pauses that occurred within each speech frame.

Such probability distributions may then be grouped in temporal order to form sets of probability distributions that correspond to the speech segments, and each such set may then be provided as input to a decoder that is implemented using an n-gram language model. Using such a set of probability distributions, and using the contextual information inherently provided by their temporal ordering, the decoder may identify the most likely combinations of words spoken to form sentences (or at least phrases) within the corresponding speech segment. In this way, the decoder may derive a transcript of what was spoken in the speech audio, and such a transcript may be stored in a manner that is associated with the speech audio for future reference.

As will be familiar to those skilled in the art, it has become commonplace (at least in speech recognition systems having sufficient processing and storage resources) to employ a two-stage combination of an acoustic model and a language model to identify the words spoken in speech audio based on the identified acoustic features. In such speech recognition systems, the acoustic model is typically relied upon to perform a first pass at identifying words that are likely to be the ones that were spoken, and the language model is typically relied upon to perform the next and final pass by refining the identification of such spoken words such that the words identified by the language model are the ones from which a transcript is generated. Such a two-stage use of a combination of acoustic and language models has proven to be significantly more accurate in performing speech recognition than the earlier commonplace practice of applying an acoustic model, alone.

However, while the reduction in errors in speech recognition that has been achieved through using such a two-pass combination of acoustic and language models is significant, even this reduced error rate is still frequently undesirably high enough as to have merited further efforts over a number of years to further reduce it. A possible source of this still elevated error rate, at least in some situations, has been such reliance on using a language model to always perform the final pass to provide the final identification of each word spoken in speech audio. It should be remembered that a good language model is usually one that closely models a language as that language is used correctly. Thus, part of the still elevated error rate may arise from the fact that a person may make mistakes in vocabulary and/or syntax when speaking, while the language model may tend to fight against correctly identifying that person's words as actually spoken as it effectively attempts to enforce its model of what that person's words should have been.

As illustrated by at least this one example, there can be situations in which it may be desirable to rely more on an acoustic model, than on a language model, to correctly identify spoken words. It has long been recognized that an acoustic model can be highly accurate in identifying spoken words where the pronunciation of words is of sufficient clarity, and where the acoustic conditions associated with the reception of those spoken words are sufficiently favorable (e.g., sufficiently free of noise). As will be familiar to those skilled in the art, the longstanding practice of reliance on a language model to provide the final identification of words was largely influenced by a need to accommodate less ideal conditions in which the pronunciation of words may not be as clear and/or where the acoustic conditions may not be so favorable. In such situations, gaps may occur in the reception of spoken words, and on many of such occasions, a language model can compensate for such instances of missing acoustic information.

To further improve upon the error rate of such typical two-stage use of a combination of an acoustic model and a language model, some embodiments may dynamically vary the relative weighting assigned to each of the acoustic model and the language model per-word based on the degree of uncertainty in the per-grapheme probability distributions output by the acoustic model for each word. Stated differently, it may be that the probability distributions of graphemes that are output by the acoustic model for a single word are analyzed to derive a corresponding degree of perplexity for each probability distribution. Such a degree of perplexity may serve as an indication of the degree to which a probability distribution presents an indefinite indication of which utterance occurred during a corresponding portion of speech audio. Where the degree of perplexity of probability distributions for graphemes associated with a word are deemed to be lower than a pre-determined threshold, then greater weight may be dynamically assigned to the identification of that word based on those probability distributions such that the acoustic model is relied upon to identify that word. However, where the degree of perplexity of such probability distributions associated with a word are deemed to be higher than a pre-determined threshold, then greater weight may be dynamically assigned to the identification of that word based on the language model.

In some embodiments, both of the acoustic model and the language model may always be utilized in combination for each spoken word, regardless of whether the per-word determination is made in a manner that gives greater weight to relying more on the acoustic model or to the language model to identify a word. Thus, the beam searches associated with such use of a language model implemented with an n-gram corpus may always be performed regardless of such dynamic per-word assignment of relative weighting. In some of such embodiments, it may be that the probability (and/or another measure or statistic) associated with the word identified by the language model is used as an input to the dynamic per-word relative weighting in addition to the degree of perplexity derived for the probability distributions for the corresponding graphemes.

Alternatively, in other embodiments, it may be that the language model is not used to provide any input to the dynamic per-word relative weighting. In such other embodiments, such a situation may provide the opportunity to entirely refrain from consuming processing and/or storage resources to perform beam searches associated with using the language model if the results of the dynamic per-word relative weighting are such that the results of using the language model will not be used. In this way, use of the language model may be made contingent on such dynamic per-word relative weighting.

Regarding the use of a language model as part of the speech-to-text processing operations, as will be readily recognized by those skilled in the art, when using a language model based on a corpus of n-grams, it is generally accepted that a larger n-gram corpus is capable of achieving higher accuracies in speech-to-text operations than a smaller one. However, as will also be familiar to those skilled in the art, each increase of one word in the quantity of words that may be included in each n-gram can result in an exponential increase in the size of the n-gram corpus. As a result, it has become commonplace to limit the quantity of words that may be included in each n-gram to 4, 5 or 6 words to avoid so overtaxing available processing and/or storage resources of typical computing devices as to become impractical for use. To overcome such limitations, the processing and storage resources of multiple node devices may be employed in particular ways that make more efficient use of distributed processing to make the use of a larger n-gram corpus more practical.

More specifically, in preparation for performing beam searches of a relatively large n-gram corpus of an n-gram language model, complete copies of such a relatively large n-gram corpus may be distributed among the multiple node devices such that each is caused to locally store the complete n-gram corpus. Proceeding in temporal order through probability distributions of graphemes that may have been pronounced throughout speech segment, the control device may derive candidate sets of n-grams to be searched for within the n-gram corpus to retrieve their corresponding probabilities. As each such n-gram candidate set is derived, the control device may provide it to all of the node devices 2300 to which the n-gram corpus has been provided to enable beam searches for each of the different candidate n-grams to be searched for, at least partially in parallel.

As part of causing different ones of the n-grams to be searched for by different ones of the node devices, a modulo calculation may be used based on identifiers assigned to each of the node devices to enable each node device to independently determine which one(s) of the n-grams within the n-gram candidate set will be searched for therein. Alternatively, the n-gram searches may be distributed among multiple execution threads of processor(s) within a single device (e.g., the control device or a single node device). As each of the node devices completes the beam search(es) for its corresponding one(s) of the candidate n-grams, indications of the relative probabilities of occurrence for each n-gram may be provided to the control device to enable the control device to identify the next word that was most likely spoken in the speech segment, and accordingly, to identify the next word to be added to the transcript of what was spoken in the speech audio. Upon completion of the transcript, the transcript may be stored by the control device within the one or more storage devices as a text data set that may be subsequently retrieved and analyzed to derive various insights therefrom, as previously discussed.

In a further effort to make the use of a relatively large n-gram corpus more practical, the corpus data sets may be generated to employ a two-dimensional (2D) array data structure, instead of the more conventional ASCII text file data structure of the widely known and used "ARPA" text format originally introduced by Doug B. Paul of the Massachusetts Institute of Technology. Avoiding the use of such a relatively unstructured text format obviates the need to use text parsing routines that can greatly decrease the speed of access to individual n-grams, and/or individual words within individual n-grams. In this way, the speed with which the n-gram corpus is able to be generated, put through deduplication, and used in beam searches may be greatly increased.

Still further, in deriving probabilities for the occurrence of each n-gram, a novel technique may be used for deriving a backoff value that is relatively simple to perform, and that is better suited to the larger n-gram corpuses that may be made practical to use by way of the various approaches described herein.

Regardless of the exact manner in which each word spoken in speech audio is identified through use of an acoustic model and/or through the use of a language model, and regardless of the size and/or format of the n-gram corpus that may be used, the length of transcript(s) that are generated from speech audio may advantageously or adversely affect automated text analyses that may be subsequently performed in post-processing (e.g., analyses to identify topics, to identify sentiments of topics, and/or to identify other related pieces of speech audio and/or transcripts generated therefrom). From experimentation and observation, it has been found that, generally, many forms of automated text analyses are able to be more successfully used with longer transcripts.

More specifically, it has been found that shorter transcripts tend to cause an overemphasis on the more frequently used words in a language, even after removal of non-content stopwords, with the result that analyses to derive topics and/or other insights of a transcript tend to produce less useful results. To counteract this, in some embodiments, all of the text of speech audio on which speech-to-text processing has been performed may be stored and/or otherwise handled as a single transcript, thereby increasing the likelihood of generating longer transcripts. However, where the speech audio is sufficiently long as to include multiple presentations and/or conversations on unrelated subjects, automated text analyses performed on a single transcript encompassing such lengthy and varied speech audio may also produce less useful results. Thus, in some embodiments, rules concerning lengths of transcripts and/or acoustic features such as relatively lengthy pauses may be used to bring about the generation of lengths and/or quantities of transcripts for each piece of speech audio that are more amenable to providing useful results from automated text analyses.

Turning to the text analytics post-processing operations, the resulting one or more transcripts of the speech audio may be provided to one or more text analyzers to derive, based on such factors as the frequency with which each word was spoken, such insights as topic(s) spoken about, relative importance of topics, sentiments expressed concerning each topic, etc. It may be that each such stored transcript(s) may be accompanied in storage with metadata indicative of such insights. Alternatively or additionally, it may be that such insights are used to identify other transcript(s) generated from other pieces of speech audio that are deemed to be related.

In embodiments in which a distributed processing system is used that includes multiple node devices, various one(s) of the pre-processing, text-to-speech processing and/or post-processing operations within the framework may be performed in a manner that is distributed across those multiple node devices to improve the efficiency with which those operations are able to be performed. As will be explained in greater detail, such improvements in efficiency may also enable improvements in the handling of data such that greater use may be made of contextual information to provide improved results.

By way of example, each of the different segmentation techniques may be performed within a separate one of the node devices, at least partially in parallel, such that a different one of the corresponding candidate set of likely sentence pauses may be independently derived within each such node device.

Also by way of example, multiple instances of the feature detector may be executed across the multiple node devices, and the speech segments may be distributed thereamong to enable speech detection to be performed with multiple ones of the speech segments at least partially in parallel. Further, along with the multiple instances of the feature detector, multiple instances of the acoustic model may be instantiated across the multiple node devices, thereby enabling the feature vectors derived from a speech segment by an instance of the feature detector within a node device to be directly provided to the corresponding instance of the acoustic model within the node device to enable the derivation of the set of probability distributions that correspond to that speech segment.

Also by way of example, multiple copies of the n-gram corpus may be distributed among the multiple node devices to enable each beam search across multiple n-grams for each next word in a sentence to be performed in a distributed manner without need of communication among the node devices.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
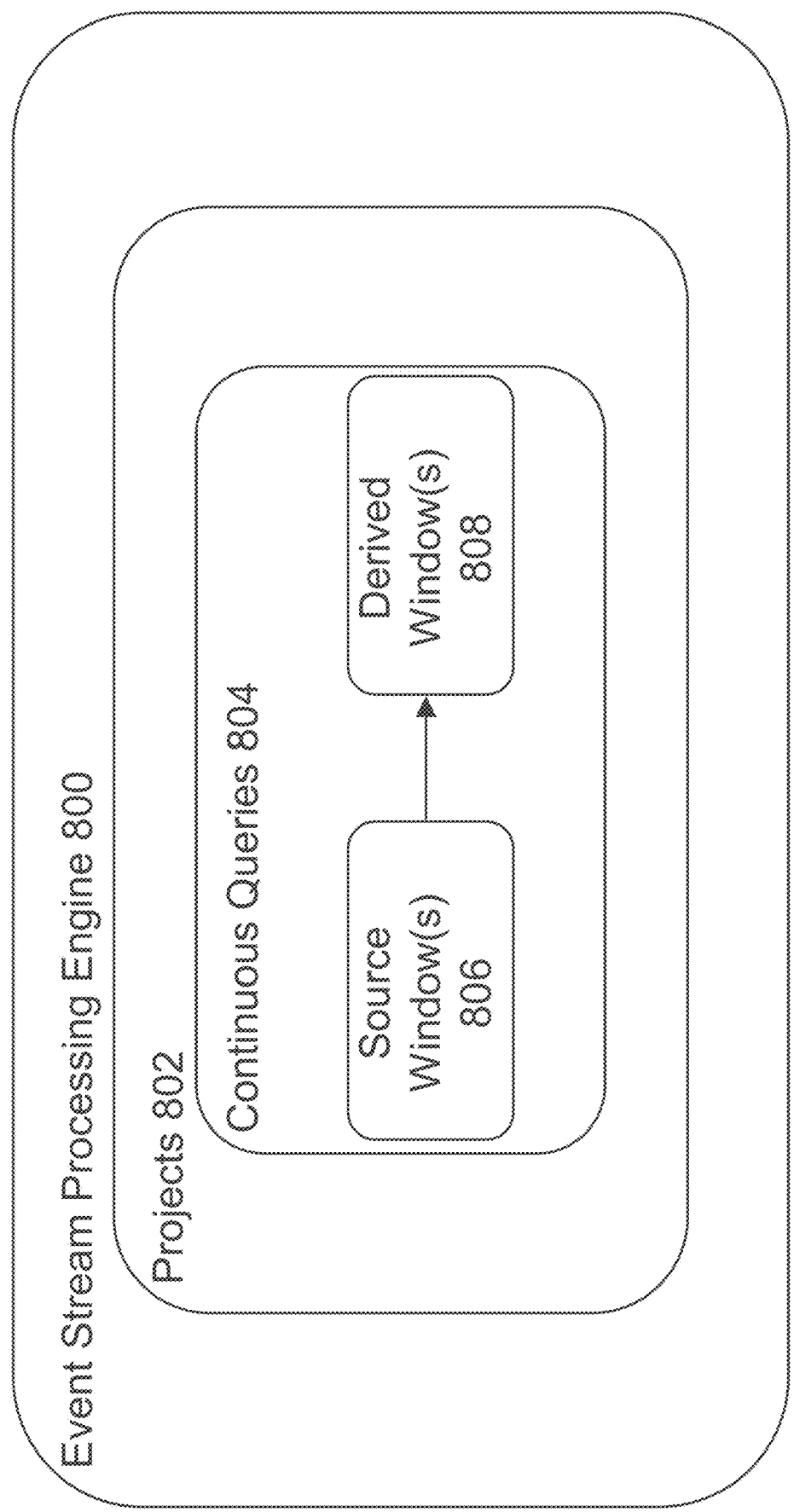
FIG. 8 illustrates a block diagram including components of an Event Stream Processing Engine (ESPE), according to embodiments of the present technology.
Figure 9:
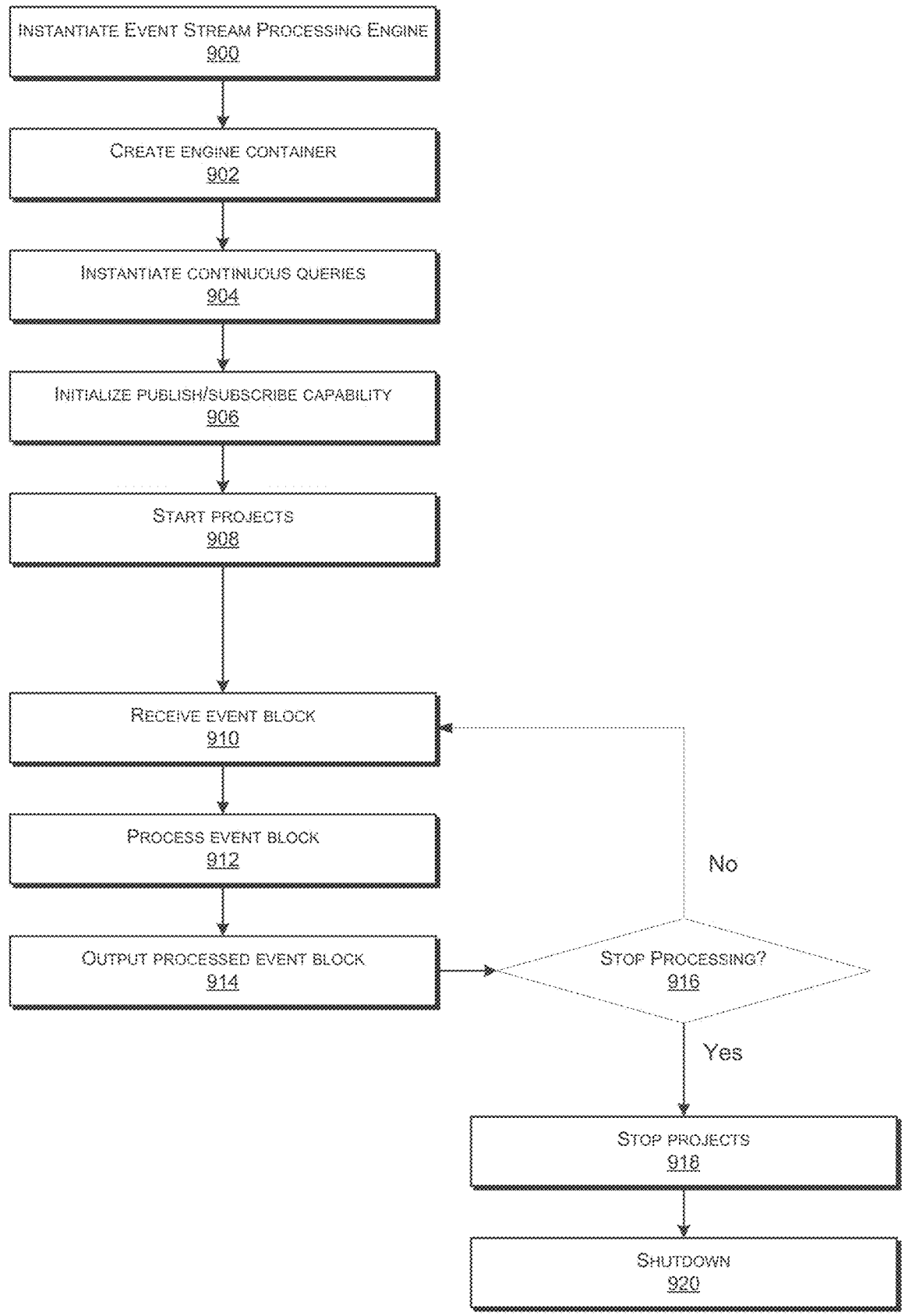
FIG. 9 illustrates a flow chart showing an example process including operations performed by an event stream processing engine, according to some embodiments of the present technology.
Figure 10:
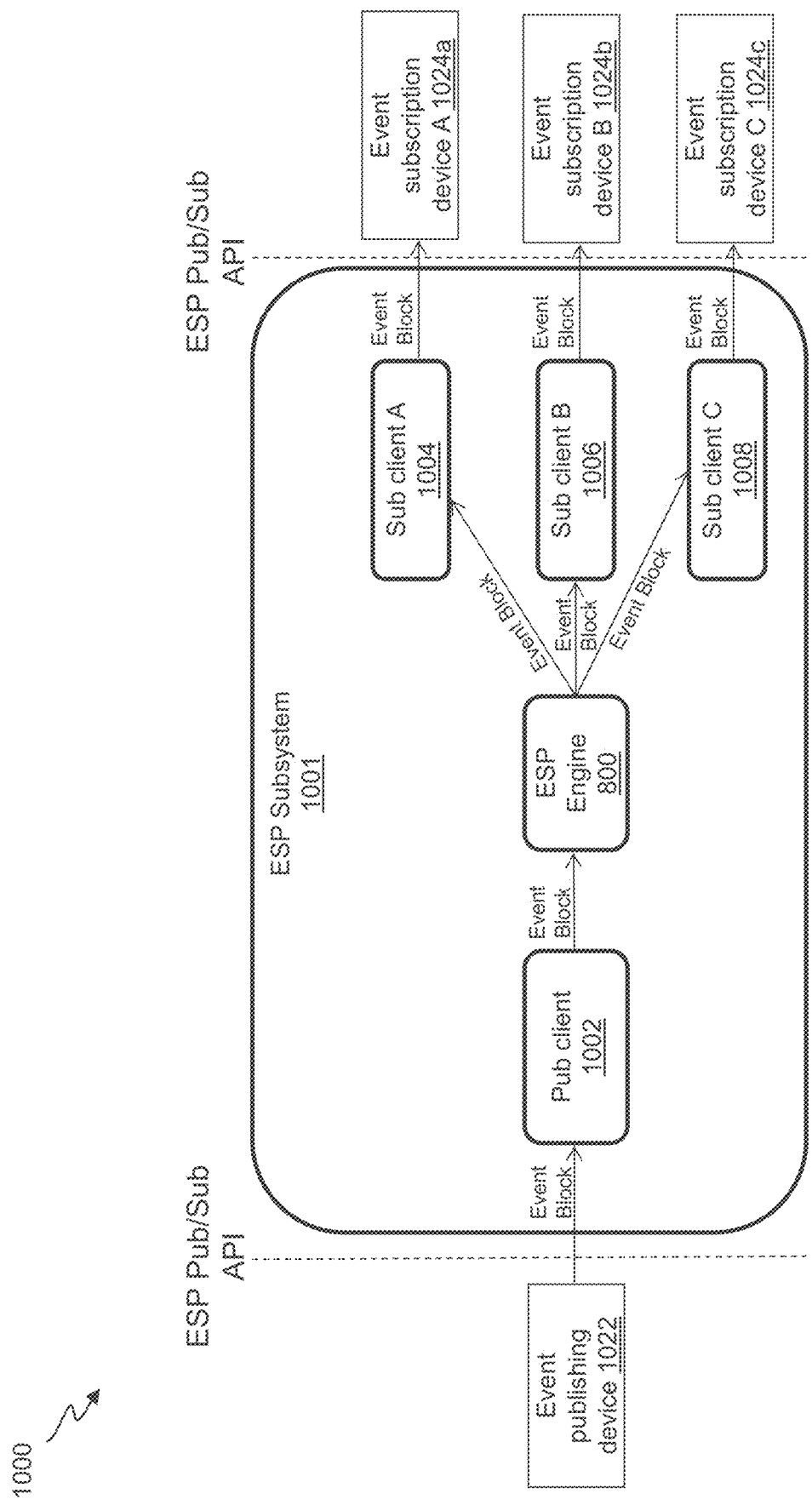
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
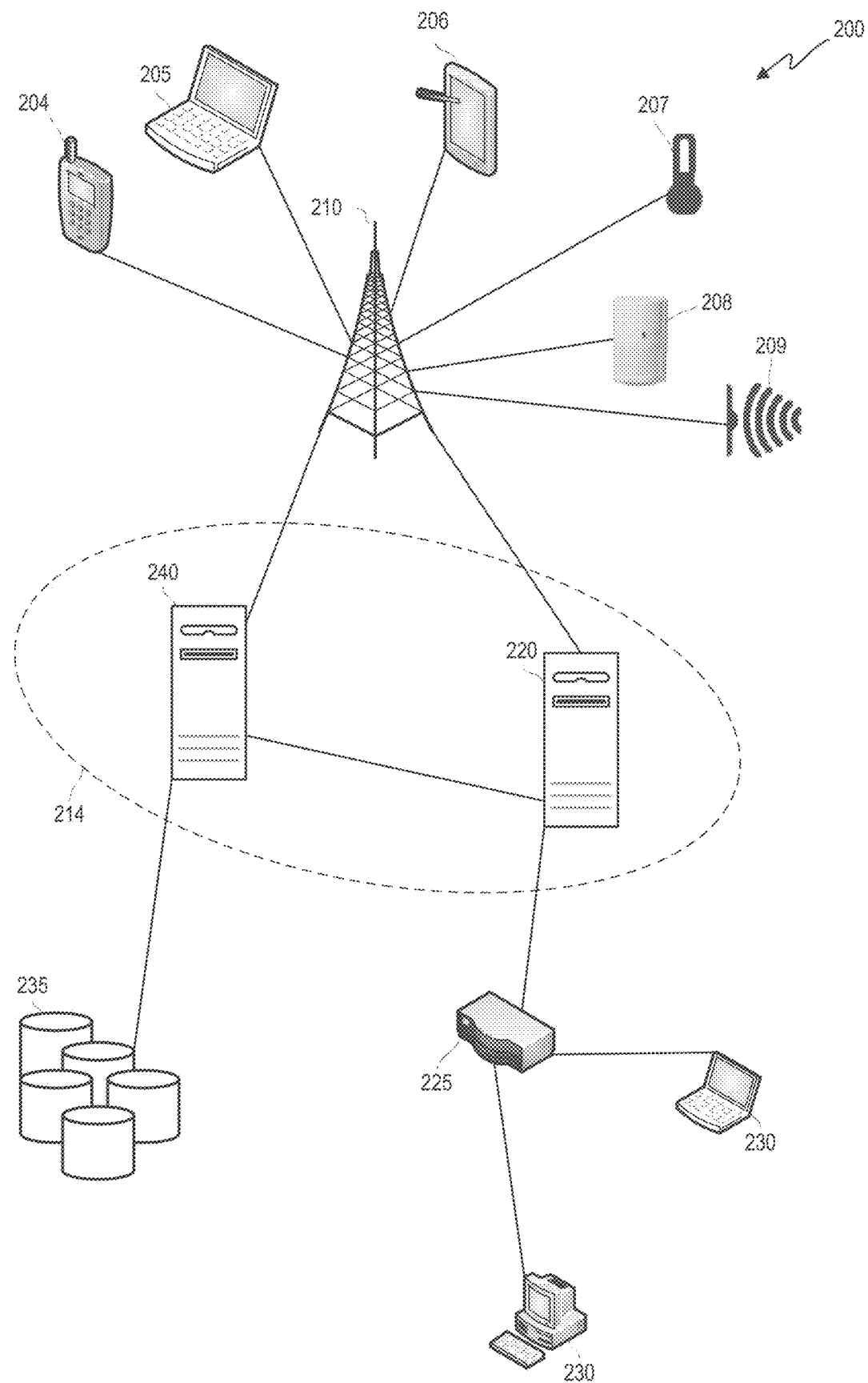
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
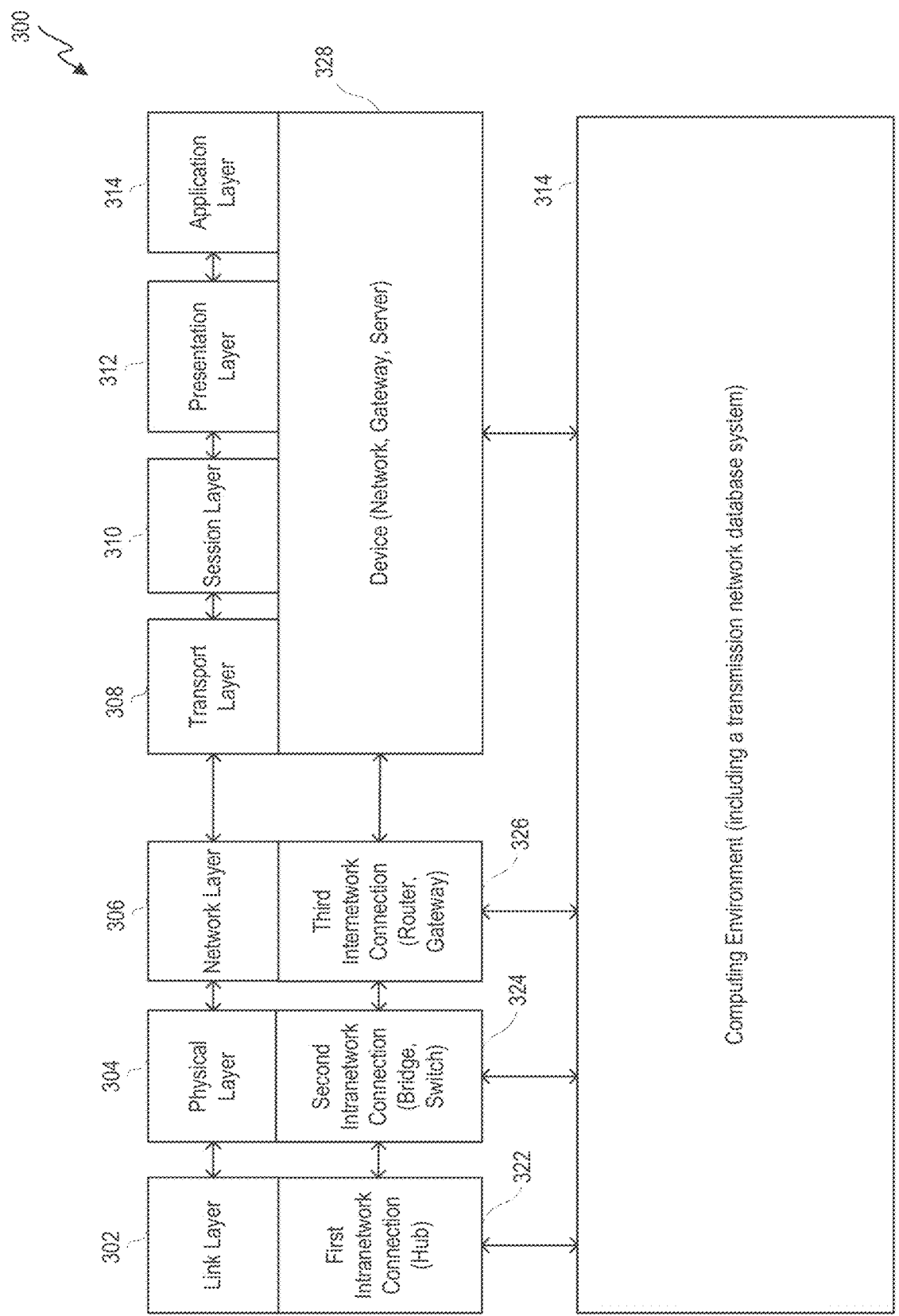
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
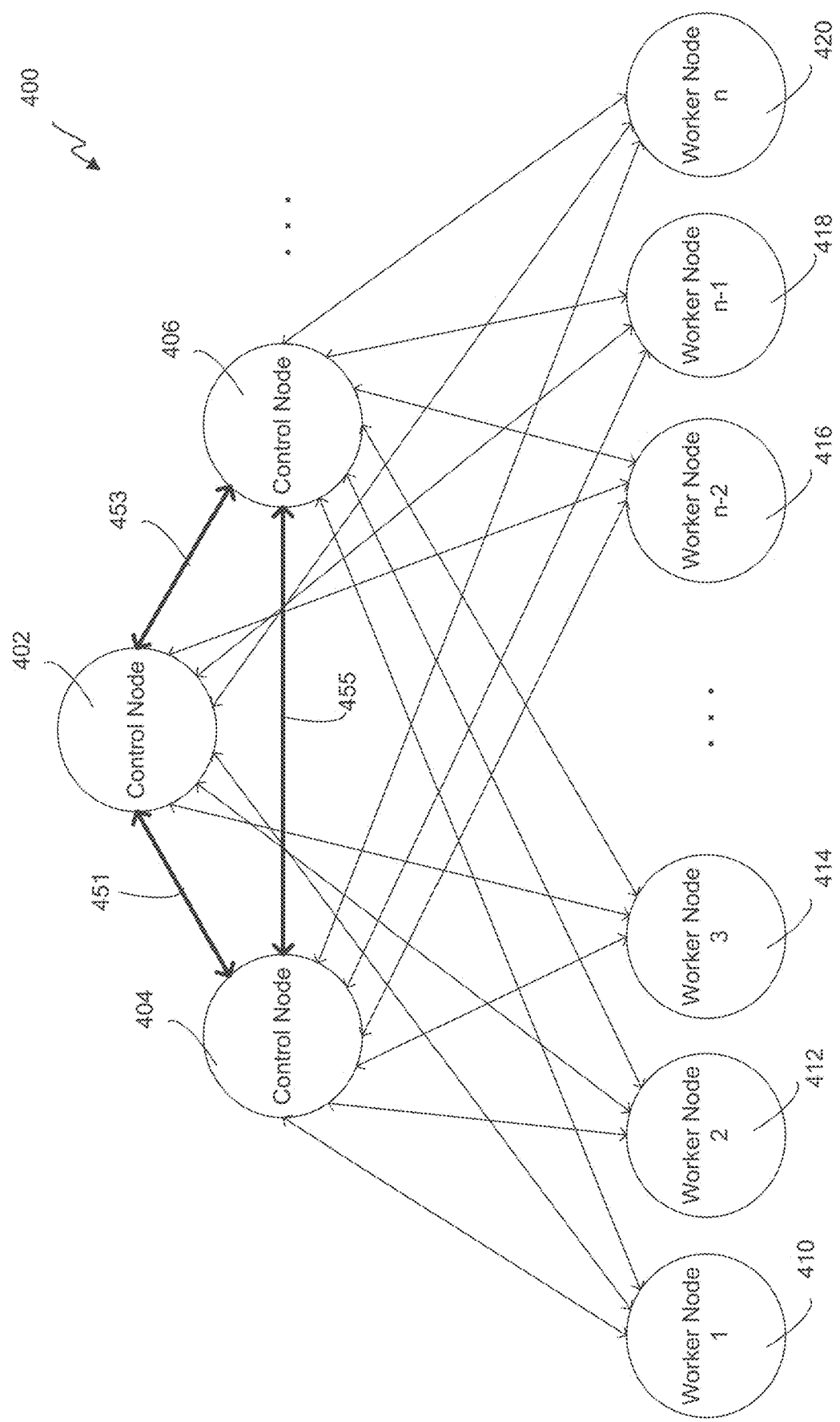
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® distributed file system, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
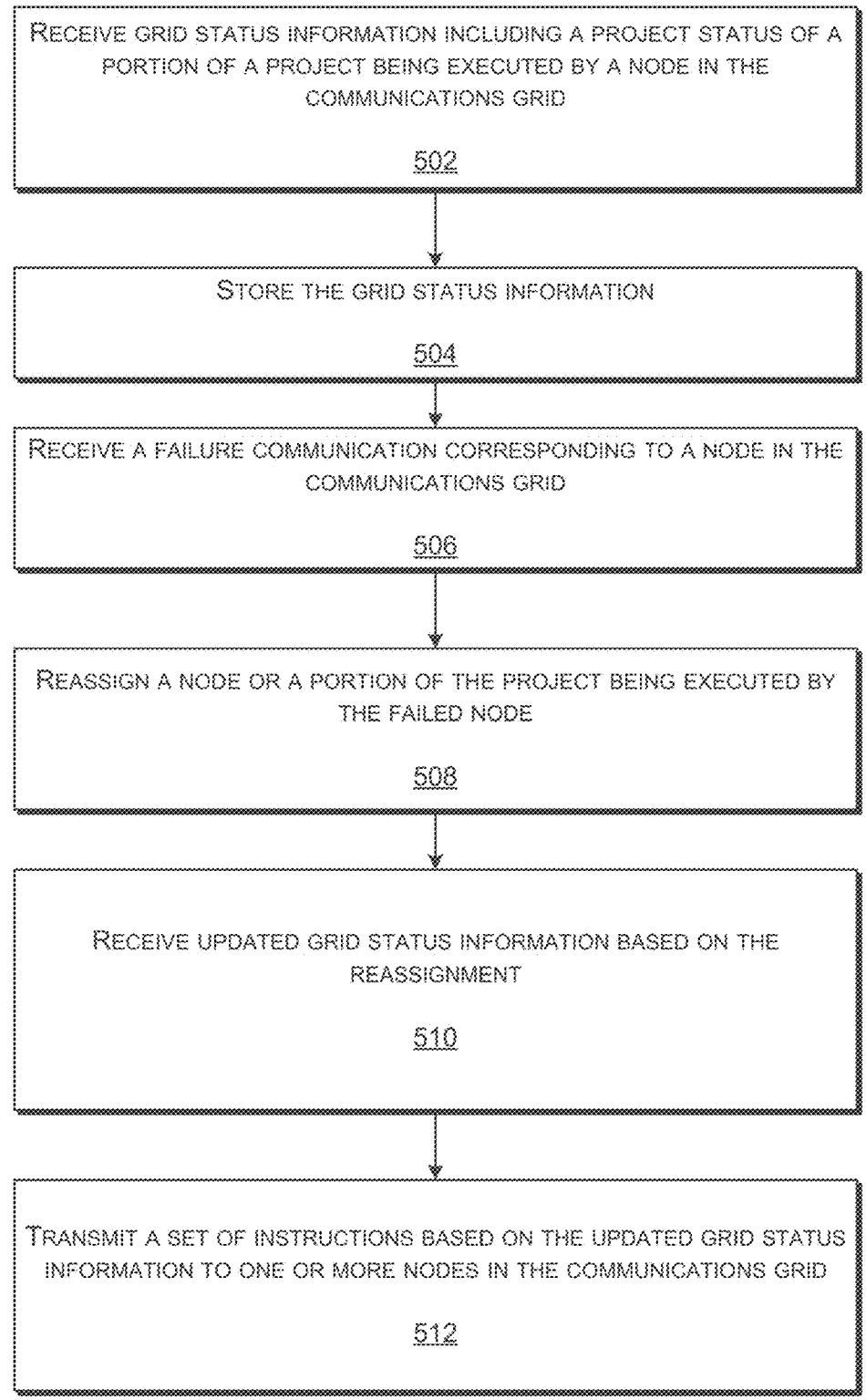
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
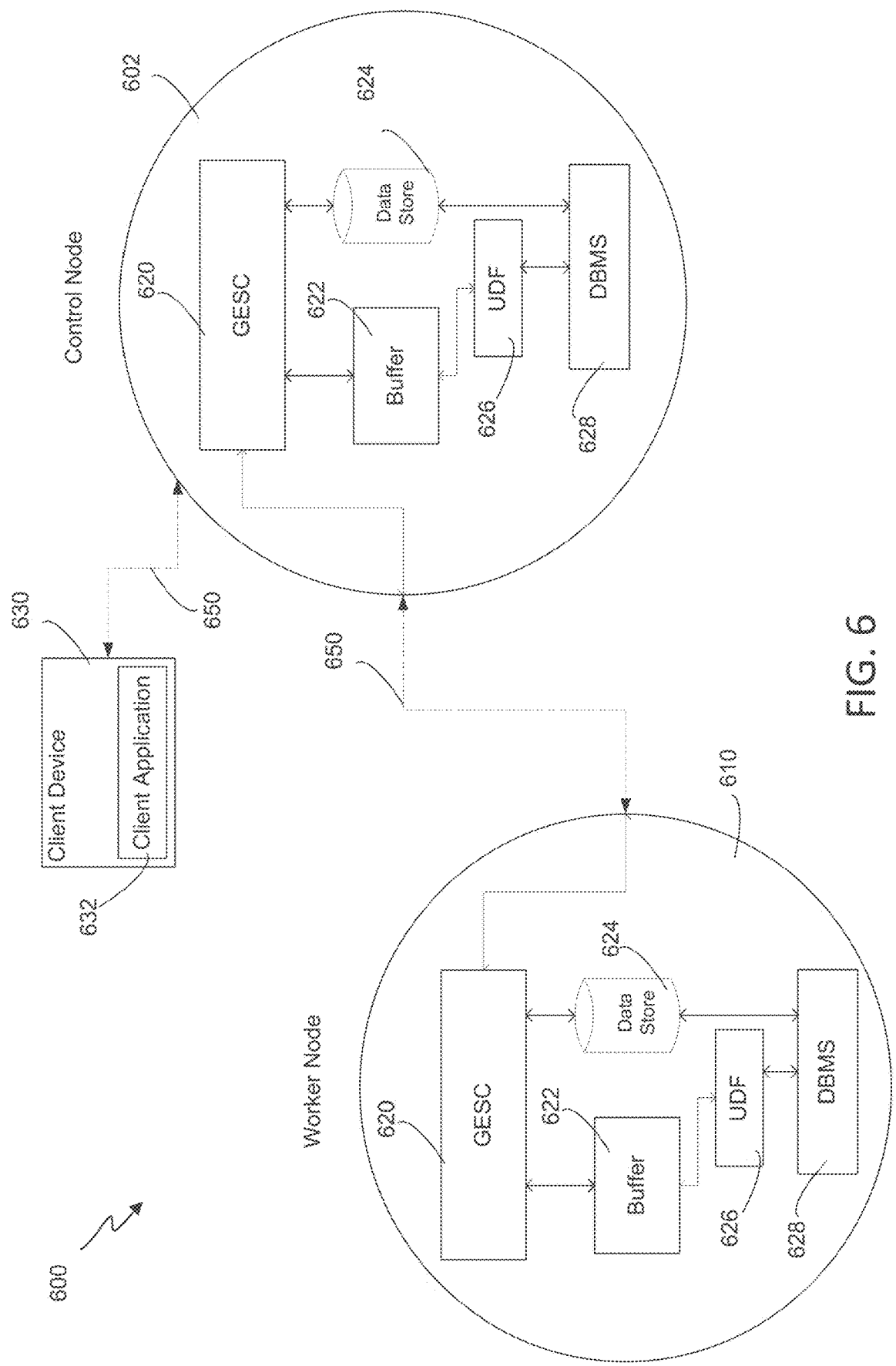
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
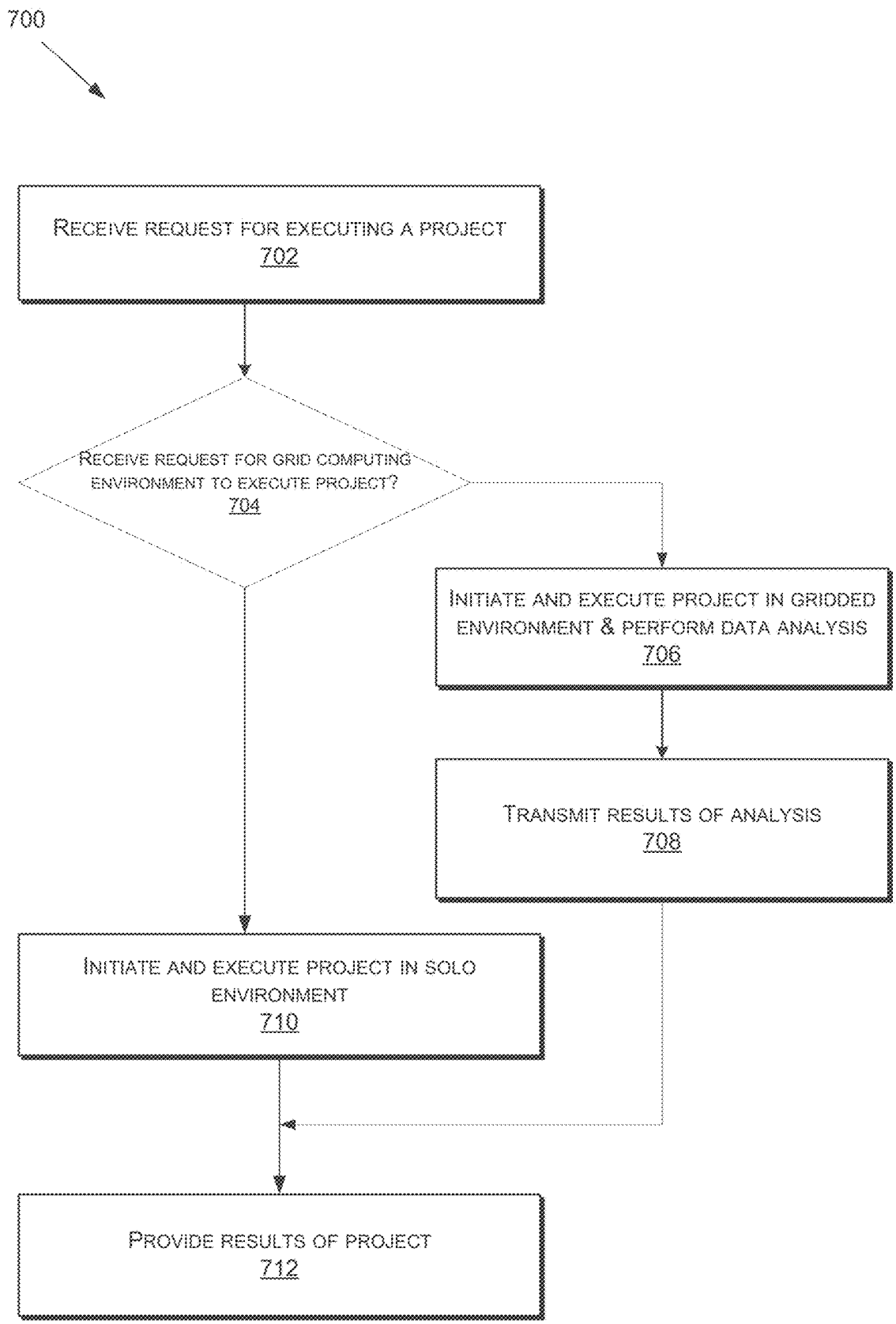
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
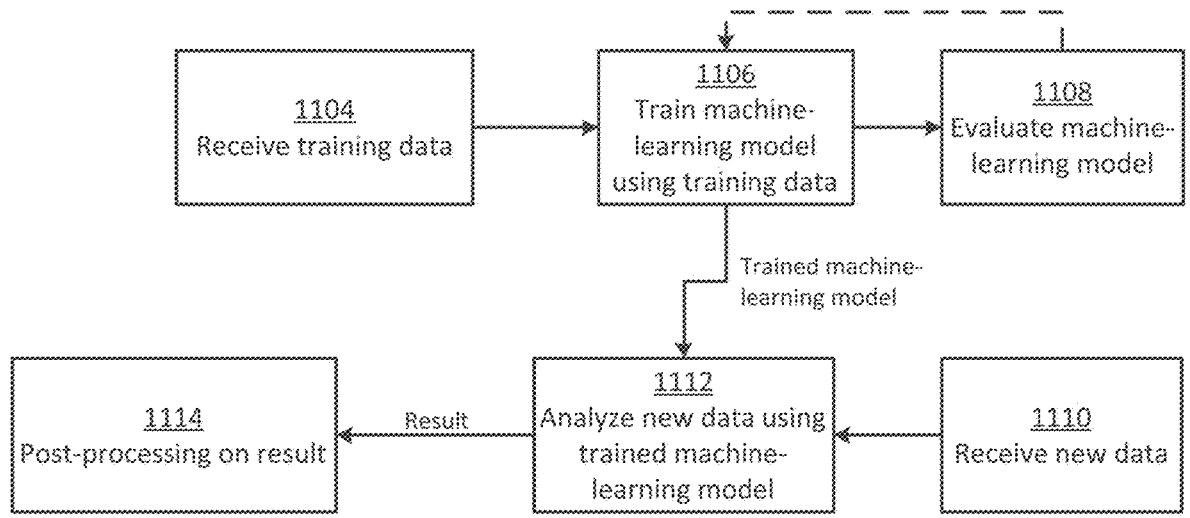
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
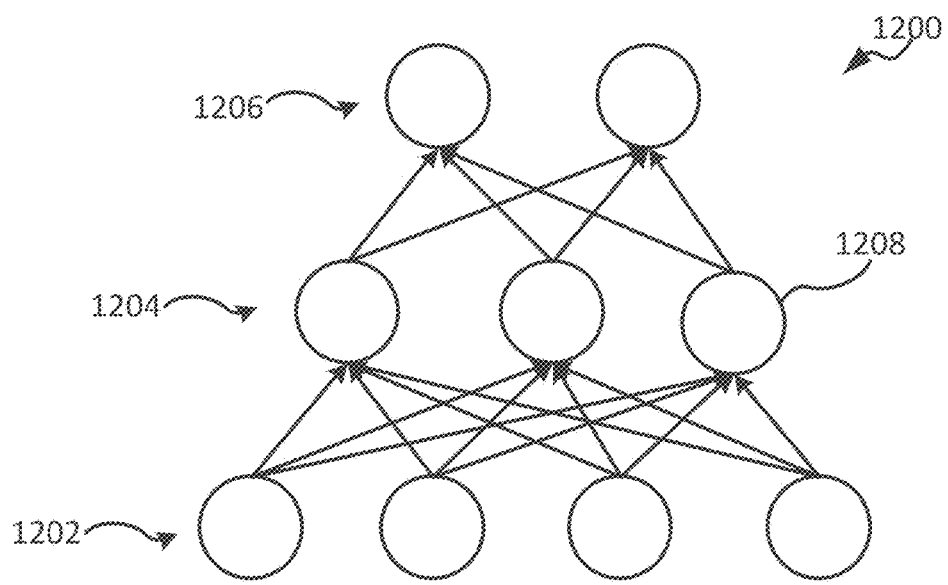
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13B:
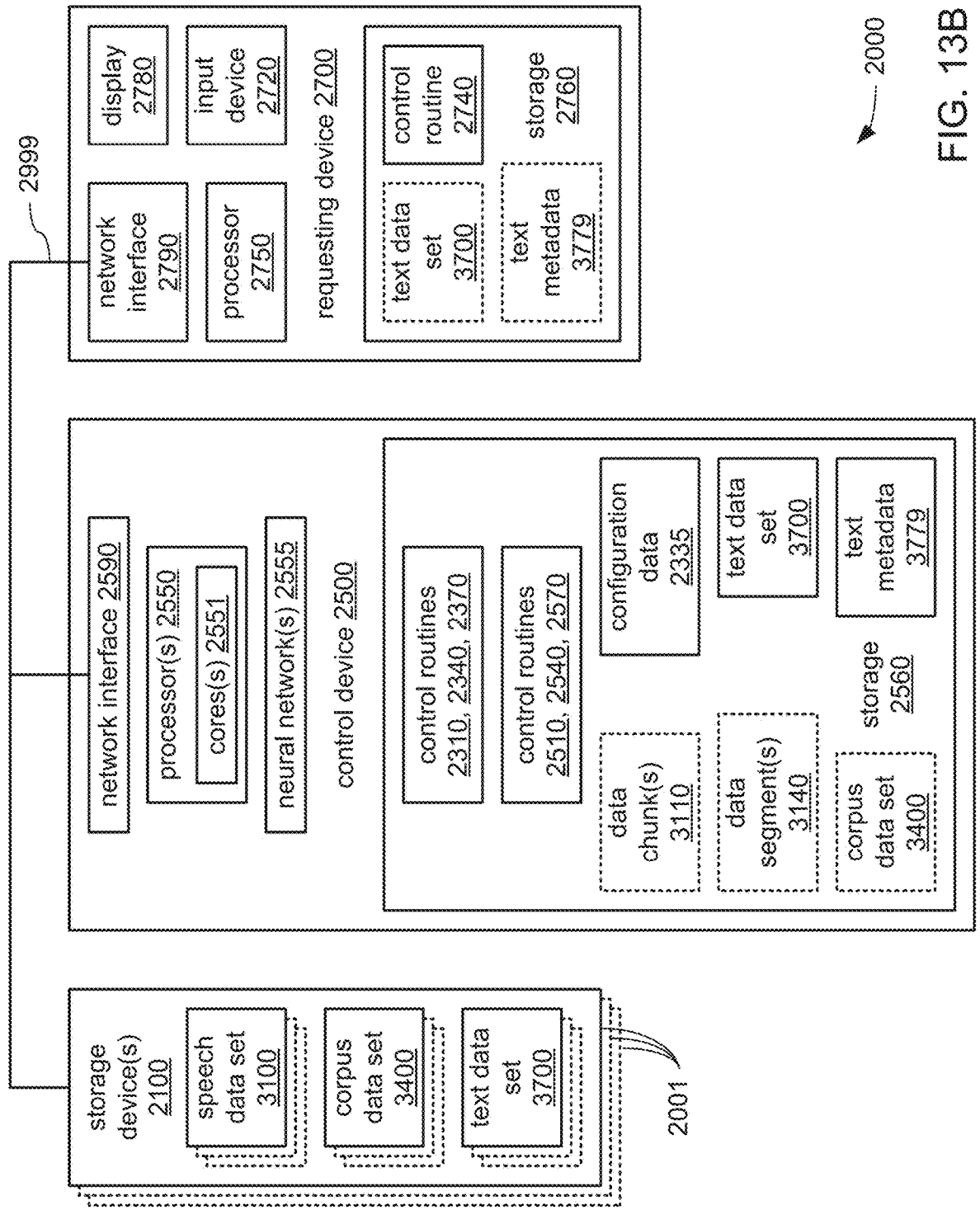
Figure 14:
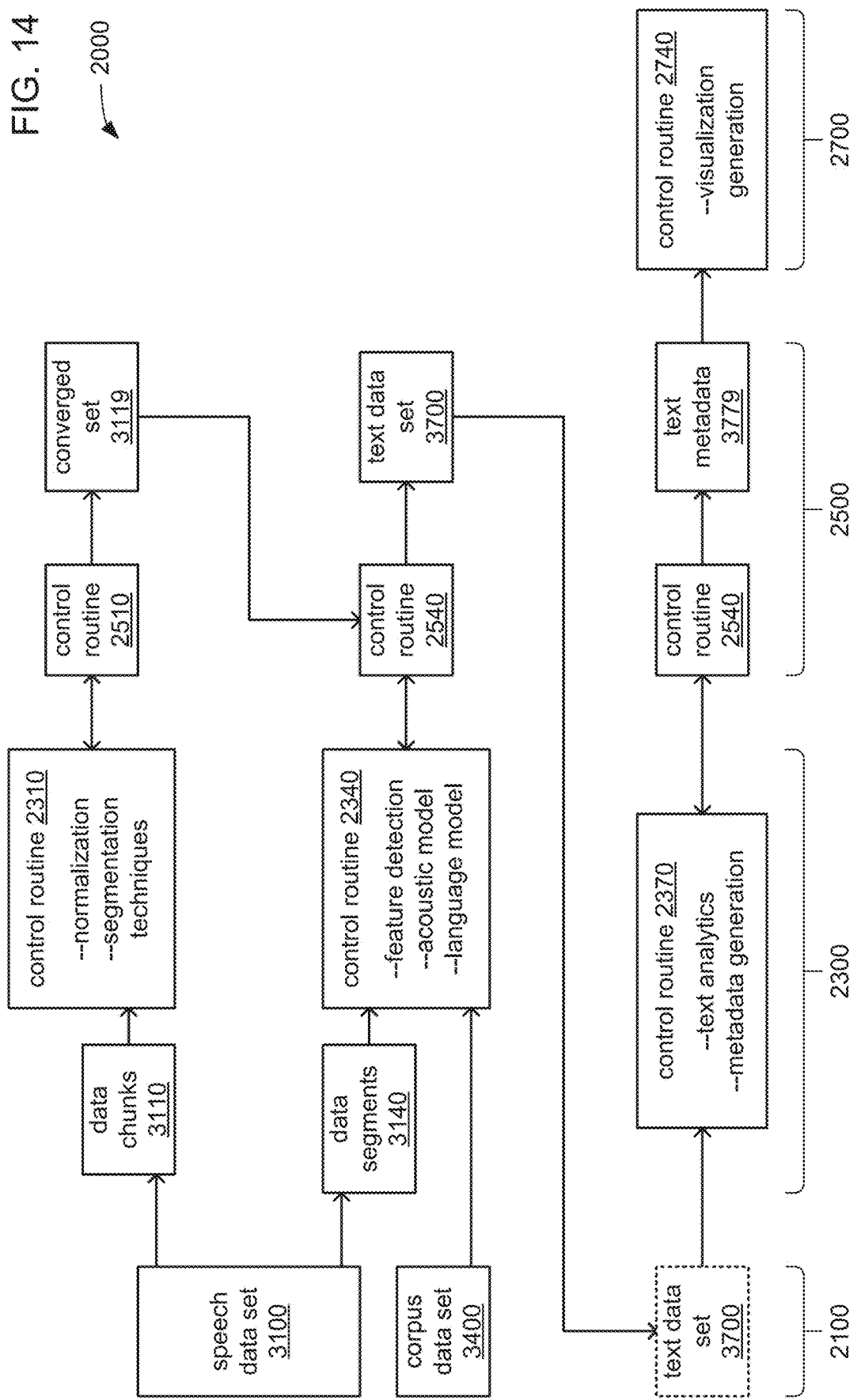
FIG. 14 illustrates an overview of an example performance of speech-to-text conversion using either of the example embodiments of a processing system of FIGS. 13A-B.

FIGS. 13A and 13B illustrate two different example embodiments of a processing system 2000, and FIG. 14 illustrates an example of the use of either of these embodiments of the processing system 2000 to implement a framework for the performance of operations to convert speech to text and/or to derive insights from such text. More specifically, FIG. 13A illustrates a block diagram of an example embodiment of a distributed processing system 2000 incorporating one or more storage devices 2100 that may form a storage grid 2001, one or more node devices 2300 that may form of a node device grid 2003, at least one control device 2500 and/or at least one requesting device 2700 coupled by a network 2999. FIG. 13B illustrates a block diagram of an alternate example embodiment of a non-distributed processing system 2000 in which the processing functionality of the one or more node devices 2300 is incorporated into the at least one control device 2500.

Turning to FIG. 13A, the storage device(s) 2100 may store one or more speech data sets 3100 in which speech audio may be stored in any of a variety of digital audio storage formats. Where there are multiple storage devices 2100, at least a subset of the one or more speech data sets 3100 may be stored in a distributed manner in which different portions thereof are stored within different ones of the storage devices 2100. Each of the one or more speech data sets 3100 may be so stored within or retrieved from the storage device(s) 2100 by the one or more node devices 2300 under the control of the control device 2500. More specifically, in support of a distributed performance of at least some of the pre-processing operations, speech-to-text processing operations and/or text analytics post-processing operations across multiple node devices 2300, a speech data set 3100 may be divided into data chunks 3110 that each represent a chunk of the speech audio of the speech data set 3100, and/or may be divided into data segments 3140 that each represent a speech segment of that speech audio. Those data chunks 3110 and/or data segments 3140 may then be distributed among, and/or otherwise provided to, multiple ones of the node devices 2300 from different ones of the storage devices 2100.

The storage device(s) 2100 may also store one or more corpus data sets 3400 that each represent a language model implemented as a corpus of a particular language, and/or one or more text data sets 3700 that each represent a transcript of speech audio that may be stored as a speech data set 3100. As with the one or more speech data sets 3100, where there are multiple storage devices 2100, at least a subset of the one or more corpus data sets 3400, and/or at least a subset of the one or more text data sets 3700, may be stored in a distributed manner in which different portions thereof are stored within different ones of the storage devices 2100. In support of distributed speech-to-text processing operations, and/or in support of distributed text analytics post-processing operations, multiple copies of the entirety of a corpus data set 3400 may be provided to each of multiple ones of the node devices 2300.

In support of such operations, the devices 2100, 2300, 2500 and/or 2700 may exchange such portions of a speech data set 3100, may exchange copies of a corpus data set 3400, and/or may exchange other information concerning speech audio pre-processing operations, speech-to-text conversion and/or text analyses through the network 2999. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

Each of the speech data sets 3100 may be any of a variety of types of digital data representation of any of a variety of types of speech audio. Such representations of speech audio may include a series of amplitude values of one or more audio channels of any of a variety of bit widths (e.g., 8-bit, 12-bit, 16-bit, 20-bit or 24-bit), captured at any of a variety of sampling rates (e.g., 41.1 kHz, 48 kHz, 88.2 kHz or 96 kHz), and stored in any of a variety of widely used compressed or uncompressed audio data formats (e.g., MP3 (Motion Picture Experts Group layer 3), WAV (Waveform Audio), PCM (Pulse-Code Modulation), FLAC (Free Lossless Audio Codec)), Dolby Digital or TrueHD of Dolby Laboratories of San Francisco, Calif., USA, or THX Ultra2 or Select2 of THX Ltd. of San Francisco, Calif., USA). In some embodiments, the speech data set 3100 may include other data beyond speech audio, such as corresponding video, corresponding still images (e.g., a corresponding slide show of still images), alternate corresponding speech audio in a different language, etc. In some of such embodiments, the speech data set 3100 may be any of a variety of types of "container" format or other data format that supports the provision of a multimedia or other combined audio and video presentation (e.g., MP4 of the International Organization for Standardization of Geneva, Switzerland).

The speech audio that is so represented within the speech data set 3100 may include any of a variety of types of speech, including and not limited to, telephone and/or radio conversations (e.g., telephone service calls, or air traffic control communications), telephone messages or other forms of voice mail, audio from in-person and/or remote conferences, lecture speech, podcasts, audio tracks from entertainment programs that include speech audio (e.g., audio from movies or from musical performances), verbal narrations of stories and/or of events in progress (e.g., narrations of sports events or other news events), and/or verbal commands to local electronic devices and/or to servers providing online services, etc.

At least a subset of the speech data sets 3100 stored by the one or more storage devices 2100 may each represent a stored recording of speech audio that was fully captured at an earlier time. Thus, such speech data set(s) 3100 may represent speech audio that may have been recorded either relatively recently (e.g., within recent minutes or hours), or long ago (e.g., weeks, months or years earlier). Alternatively or additionally, at least another subset of the speech data sets 3100 may each represent just a stored portion of speech audio that is still in the process of being captured. Thus, such speech data set(s) 3100 may serve, at least temporarily, as buffer(s) of portions of ongoing speech audio that have already been captured, with more portions thereof still in the process of being captured.

It is envisioned that at least a subset of the speech data sets 3100 may be sufficiently large in size such that storage and/or processing of the entirety thereof within a single device may be deemed to be at least impractical, if not impossible. Therefore, to facilitate storage and/or processing of such larger speech data sets 3100 in a distributed manner across multiple devices, each of such larger speech data sets 3100 may be divided into multiple portions that may be distributed among multiple storage devices 2100 and/or among multiple node devices 2300.

In some embodiments, multiple ones of the storage devices 2100 may be operated together (e.g., as a network-attached drive array, etc.) primarily for the purpose of persistently storing data, such as the one or more speech data sets 3100. In such embodiments, the multiple storage devices 2100 may be capable of exchanging the entirety of a relatively large speech data set 3100 with multiple node devices 2300 in a set of data transfers of portions thereof (e.g., data chunks 3110 thereof, or data segments 3140 thereof) performed at least partially in parallel through the network 2999, and such transfers may be coordinated by the control device 2500. In some embodiments, processor(s) of the one or more storage devices 2100 may each independently implement a local file system by which at least relatively small speech data sets 3100 may each be stored entirely within a single one of the storage devices 2100. Alternatively or additionally, multiple ones of the storage devices 2100 may cooperate through the network 2999 to implement a distributed file system to store larger speech data sets 3100 as multiple portions in a distributed manner across multiple ones of the storage devices 2100. As still another alternative, it may be that one or more of the storage devices 2100 store a combination of whole speech data sets 3100 that are of relatively small data size such that they are able to be stored entirely within a single storage device 2100, and a portion of at least one speech data set 3100 that is too large in data size to be able to be stored entirely within any single one of the storage devices 2100.

In various embodiments, each of the multiple node devices 2300 may incorporate one or more processors 2350, one or more neural networks 2355, a storage 2360, and/or a network interface 2390 to couple each of the node devices 2300 to the network 2999. The processor(s) 2350 may incorporate multiple processing cores 2351 and/or other features to support the execution of multiple executable routines and/or multiple instances of executable routine(s) across multiple execution threads. The storage 2360 may store control routines 2310, 2340 and/or 2370; one or more data chunks 3110; one or more data segments 3140; and/or a corpus data set 3400.

Each of the control routines 2310, 2340 and 2370 may incorporate a sequence of instructions operative on the processor(s) 2350 to implement logic to perform various functions. Referring briefly to FIG. 14 in addition to FIG. 13A, in executing the control routine 2310, the processor(s) 2350 of each of the node devices 2300 may be caused to perform various pre-processing operations, such as normalization of the digital audio storage format in which the chunk of speech audio within each data chunk 3110 is stored, and/or determining the manner in which a speech data set 3100 is to be divided into data segments 3140 thereof as input to speech-to-text processing operations. In executing the control routine 2340, the processor(s) 2350 of each of the node devices 2300 may be caused to perform various speech-to-text processing operations, such as feature detection to identify acoustic features within the speech segment of each data segment 3140, use multiple instances of an acoustic model to identify likely graphemes, and/or use multiple instances of an n-gram language model (stored as a corpus data set 3400) to assist in identifying likely words to generate a transcript of the speech audio of the speech data set 3100, which may then be stored within the one or more storage devices 2100 as a corresponding text data set 3700. In executing the control routine 2370, the processor(s) 2350 of each of the node devices 2300 may be caused to perform various post-processing operations, such as text analytics to derive various insights concerning the contents of speech audio stored as a speech data set 3100, and/or the generation of various visualizations for presenting such insights. Where such visualizations are generated by the node devices 2300 (and/or by the control device 2500), such visualizations may be stored as part of (or in a manner that accompanies) the text metadata 3779. However, where such visualizations are to be subsequently generated by the requesting device 2700, such generation of such visualizations may be based on the text metadata 3779.

Returning to FIG. 13A, as will be explained in greater detail, in performing at least a subset of pre-processing operations, at least a subset of text-to-speech processing operations and/or at least a subset of post-processing operations, the processor(s) 2350 of multiple ones of the node devices 2300 may be caused to perform such operations at least partially in parallel. As has been explained, this may be at least partially due to the size of speech data set 3100. Alternatively or additionally, this may be at least partially due to a need or desire to increase the speed and/or efficiency with which such operations are performed, regardless of the size of a speech data set 3100. Regardless of the motivation, such at least partially parallel performances of such operations may be coordinated by the control device 2500 through the network 2999.

In various embodiments, the control device 2500 may incorporate one or more processors 2550, one or more neural networks 2555, a storage 2560, and/or a network interface 2590 to couple the control device 2500 to the network 2999. The processor(s) 2550 may incorporate multiple processing cores 2551 and/or other features to support the execution of multiple executable routines and/or multiple instances of executable routine(s) across multiple execution threads. The storage 2560 may store control routines 2510, 2540 and/or 2570, configuration data 2335, a text data set 3700 and/or text metadata 3779.

Each of the control routines 2510, 2540 and 2570 may incorporate a sequence of instructions operative on the processor(s) 2550 to implement logic to perform various functions. Again, referring briefly to FIG. 14 in addition to FIG. 13A, in executing the control routine 2510, the processor(s) 2550 of the control device 2500 may be caused to operate the network interface 2590 to coordinate, via the network 2999, at least a subset of the pre-processing operations performed, at least partially in parallel, by processors 2350 of multiple ones of the node devices 2300 as a result of executing corresponding instances of the control routine 2310. More specifically, the processors 2550 may be caused to coordinate the performances of multiple segmentation techniques across multiple ones of the node devices 2300. Alternatively or additionally, as candidate sets of likely sentence pauses are derived from the performance of each segmentation technique, it may be that processor(s) 2550 of the control device 2500 are caused by the control routine 2510 to use the candidate sets received from multiple node devices 2300 to derive a converged set 3119 of likely sentence pauses.

In executing the control routine 2540, the processor(s) 2550 of the control device 2500 may be caused to operate the network interface 2590 to coordinate, via the network 2999, at least a subset of the speech-to-text processing operations performed, at least partially in parallel, by processors 2350 of multiple ones of the node device 2300 as a result of executing corresponding instances of the control routine 2340. More specifically, the processor(s) 2550 may be caused to coordinate the generation of data segments 3140 among the node devices 2300 based on the indications of likely sentence pauses within the converged set 3119 of likely sentence pauses that were derived earlier during pre-processing. Alternatively or additionally, the processor(s) 2550 may be caused to coordinate the detection of acoustic features within the speech segment of each of the data segments 3140, and/or to coordinate the use of multiple instances of an acoustic model to identify likely graphemes across multiple ones of the node devices 2300. Alternatively or additionally, as sets of probability distributions of likely graphemes are derived from such use of acoustic models, it may be that the processor(s) 2550 of the control device 2500 are caused by the control routine 2540 to use the sets of probability distributions received from multiple node devices 2300 as inputs to coordinate beam searches of multiple instances of an n-gram language model across multiple node devices 2300 to generate the transcript of the speech audio of the speech data set 3100.

In executing the control routine 2570, the processor(s) 2550 of the control device 2500 may be caused to operate the network interface 2590 to coordinate, via the network 2999, at least a subset of post-processing operations performed, at least partially in parallel, by processors 2350 of multiple ones of the node device 2300 as a result of executing corresponding instances of the control routine 2340. More specifically, the processors 2550 may be caused to coordinate the distributed use of various forms of text analytics among the node devices 2300 to derive insights concerning the speech audio of the speech data set 3100.

Returning to FIG. 13A, in various embodiments, the requesting device 2700 may incorporate one or more of a processor 2750, a storage 2760, an input device 2720, a display 2780, and a network interface 2790 to couple the requesting device 2700 to the network 2999. The storage 2760 may store a control routine 2740, a text data set 3700 and/or text metadata 3779.

The control routine 2740 may incorporate a sequence of instructions operative on the processor 2750 to implement logic to perform various functions. In executing the control routine 2740, the processor 2750 of the requesting device 2700 may be caused to operate the input device 2720 and/or the display 2780 to provide a user interface (UI) by which an operator of the requesting device 2700 may transmit a request to the control device 2500 to perform one or more operations that may include speech-to-text conversion of the speech audio represented by a specified one of the speech data sets 3100 and/or that include the provision of insights concerning the contents of speech audio stored as a specified one of the speech data sets 3100. The processor 2750 may be subsequently caused to similarly provide a UI by which the operator of the requesting device 2700 is able to view the text of that speech audio upon receipt of its transcript in the form of a text data set 3700 from the control device 2500, and/or is able to view various derived insights concerning the transcript. Again, in some embodiments, such visualizations may have been previously generated and then provided to the requesting device for presentation to convey such insights. Alternatively or additionally, the processor 2750 may be caused to generate such visualizations from information contained within the text metadata 3779.

Comparing FIGS. 13A and 13B, as an alternative to the distributed processing system 2000 of FIG. 13A including multiple node device(s) 2300 among which at least a subset of pre-processing, speech-to-text processing and/or post-operations may be performed at least partially in parallel in a distributed manner, it may instead be the case that such at least partially parallel performances are to be distributed across multiple processor cores 2551 of the processor(s) 2550 of the control device 2500, as depicted in the processing system 2000 of FIG. 13B. As also depicted in FIG. 13B, it may be that the processing system 2000 does include the one or more storage devices 2100 of FIG. 13A, and that it is the control device 2500 that exchanges portions of data speech sets 3100 directly with storage device(s) 2100 in lieu of their being separate and distinct node devices 2300 to do so. Alternatively or additionally (and not specifically depicted), it may be that the processing system 2000 of FIG. 13B does not include the one or more storage devices 2100 of FIG. 13A, and that the control device 2500 directly stores one or more speech data sets 3100, one or more corpus data sets 3400, and/or one or more text data sets 3700.

Figure 15B:
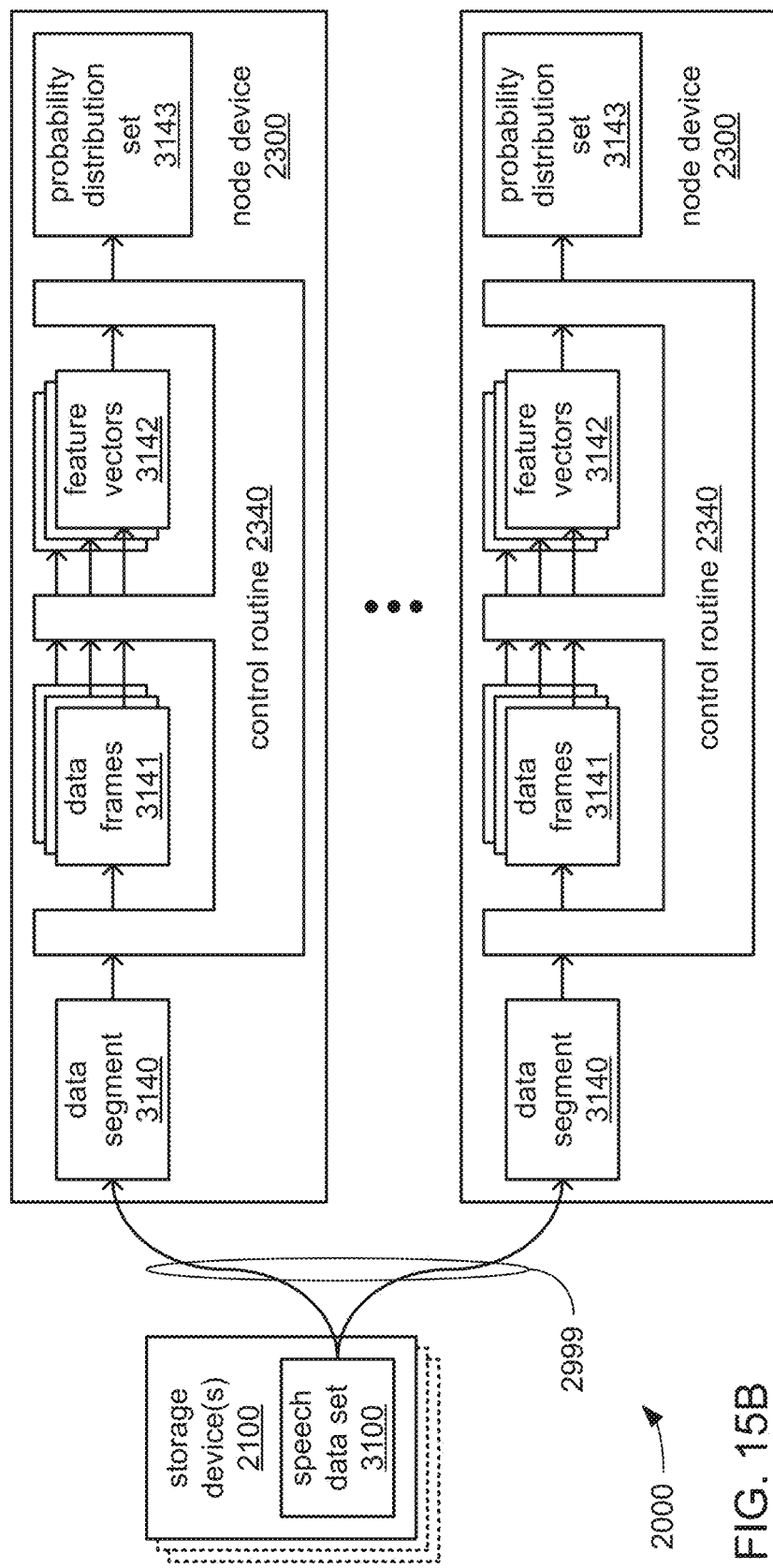
Figure 15C:
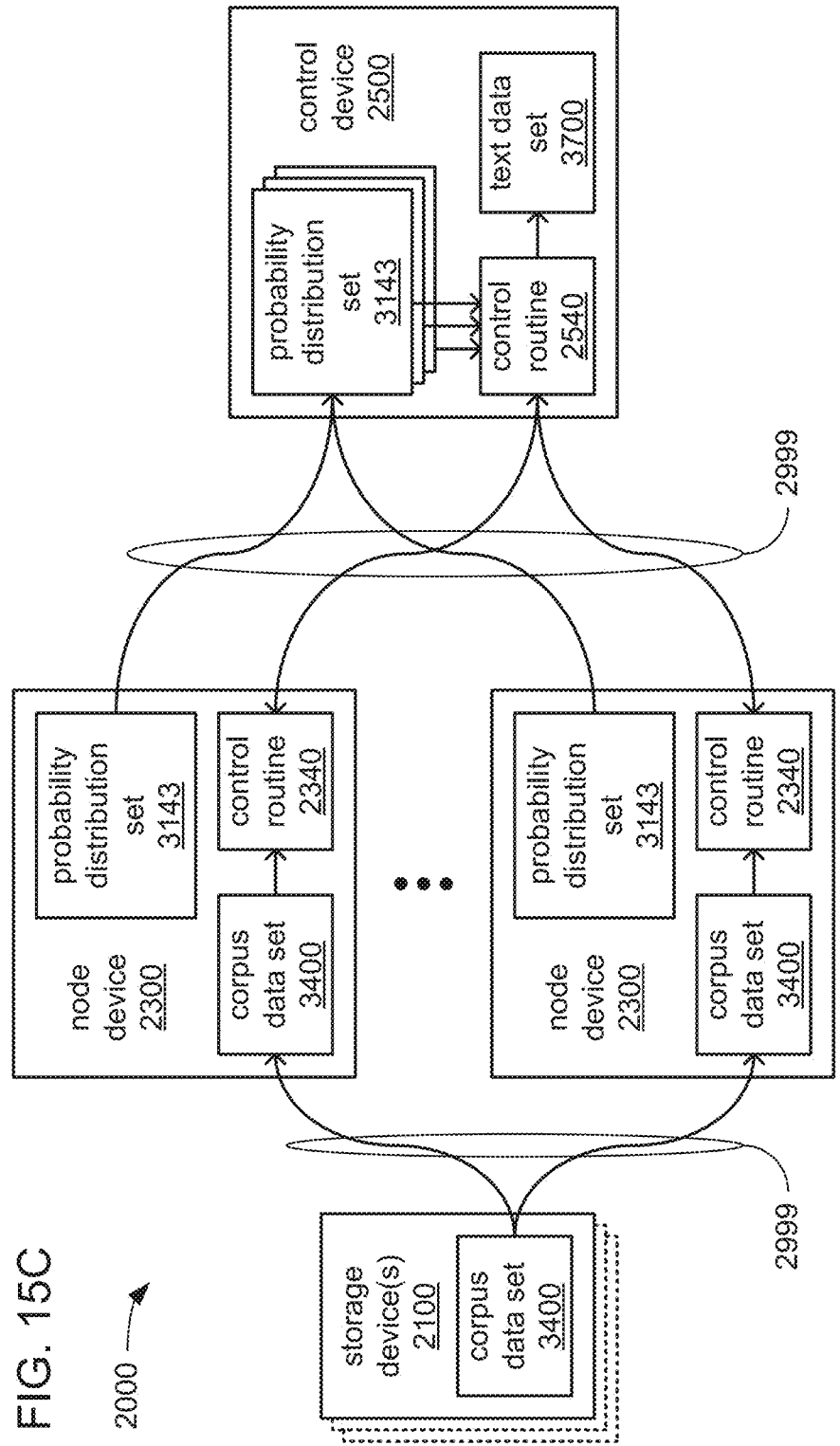
Figure 15D:
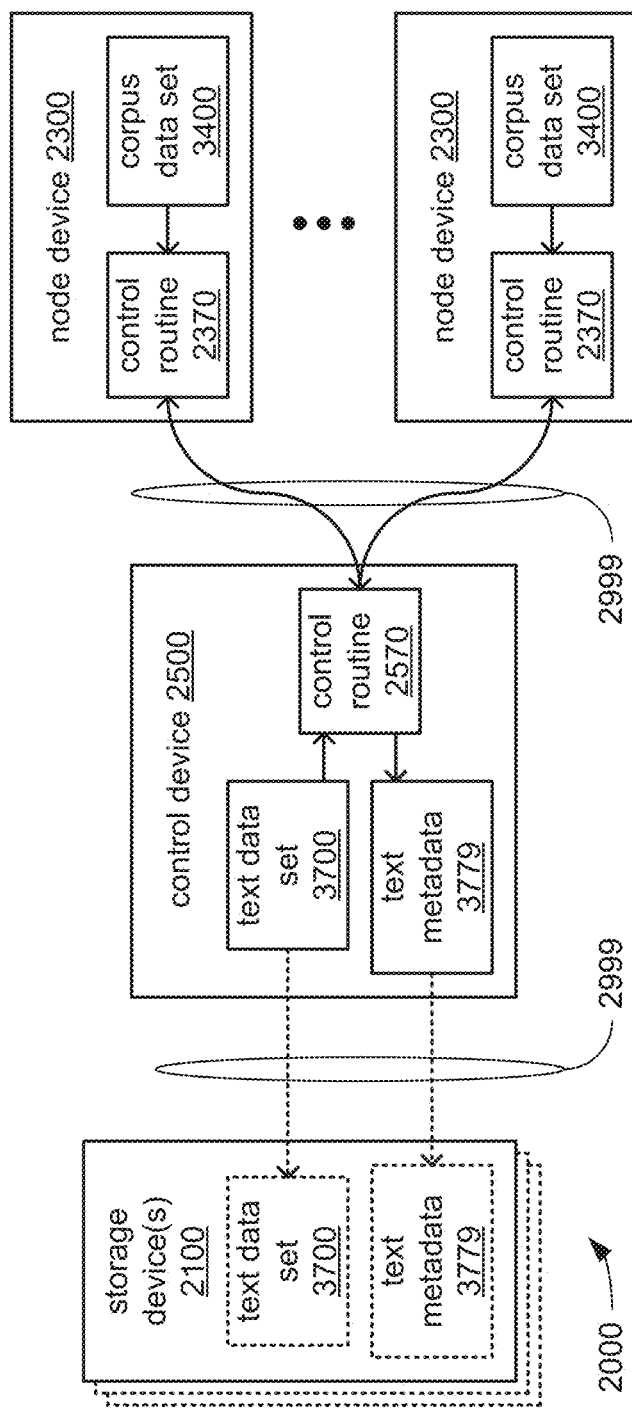
Figure 15E:
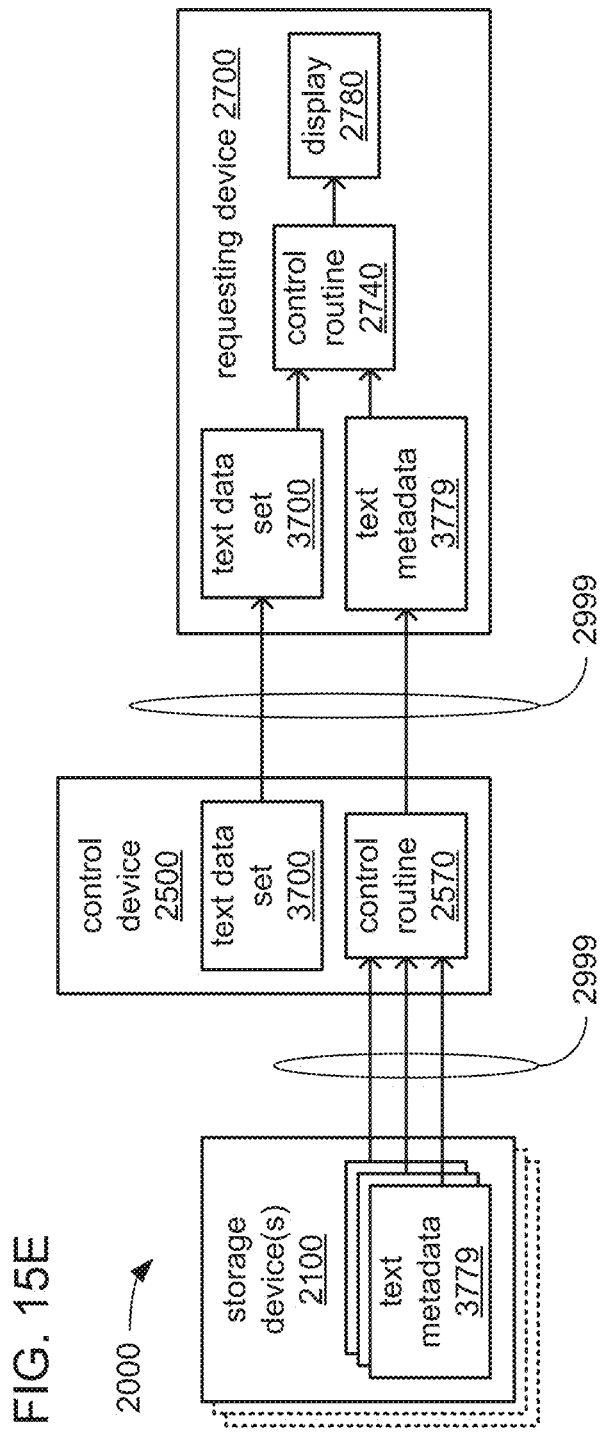

FIGS. 15A, 15B, 15C, 15D and 15E, taken together, illustrate, in greater detail, aspects of an end-to-end framework implemented within an embodiment of a distributed processing system 2000 to provide improved insights into the contents of speech audio. Within this end-to-end framework, various pieces of information concerning speech audio are routed through multiple processing operations in which data is analyzed and transformed in multiple ways to derive a transcript of the contents of the speech audio, and then to derive insights concerning those contents. FIG. 15A illustrates aspects of distributed pre-processing operations to determine the manner in which speech audio stored as a speech data set 3100 is to be divided into speech segments (represented as data segments 3140) for speech-to-text processing operations. FIGS. 15B-C illustrate aspects of distributed speech-to-text processing operations to generate a transcript (stored as a text data set 3700) of what was spoken in the speech audio, including the use of a corpus of a selected language (stored as a corpus data set 3400). FIGS. 15D-E illustrate aspects of distributed text analytics post-processing operations to derive insights (which may be stored as text metadata 3379) into the contents of the speech audio and/or to identify transcripts (stored as other text data sets 3700) of other related pieces of speech audio.

Turning to FIG. 15A, a speech data set 3100 representing speech audio spoken by one or more individuals in a digitally encoded form in storage may be divided into a set of multiple chunks of the speech audio of equal length, represented as a set of multiple data chunks 3110. The very same set of multiple data chunks 3110 may then be provided to each of multiple node devices 2300.

Within each of the multiple node devices 2300, a different segmentation technique may be performed to proceed through the multiple chunks of speech audio represented by the multiple data chunks 3110 to identify the longer pauses that typically occur between sentences. It should be noted that the division of the speech data set 3100 into the multiple data chunks 3110 may be necessary to accommodate input data size limitations imposed by one or more of the segmentation techniques. Different components of, and/or different versions of, the control routine 2310 may be executed within each of the multiple node devices 2300 to cause the performance of a different one of the multiple segmentation techniques within each of the multiple node devices 2300. In so doing, within each of the multiple node devices 2300, a corresponding different candidate set 3118 is generated of indications of where likely pauses between sentences have been identified as occurring throughout the entirety of the speech audio.

Each of the candidate sets 3118 of likely sentence pauses, following its generation within a different one of the multiple node devices 2300, may then be provided to the control device 2500. Within the control device 2500, execution of the control routine 2510 may cause the multiple candidate sets 3118 of likely sentence pauses to be combined in any of a variety of ways to derive the single converged set 3119 of likely sentence pauses.

Turning to FIG. 15B, following such pre-processing operations as are described just above, the same speech data set 3100 representing the same speech audio may be divided, again, but now into a set of multiple speech segments 3140. Unlike the division into multiple chunks of speech audio that did not in any way take into account the content of the speech audio, the division of the speech audio into multiple speech segments may be based on the indications of where sentence pauses have been deemed to be likely to be present within the speech audio, as indicated by the converged set 3119 of likely sentence pauses.

Also unlike the provision of the same full set of multiple data chunks 3110 to each of the multiple node devices 2300 in which a different segmentation technique was performed, each of multiple node devices 2300 may be provided with one or more different ones of the data segments 3140. Within each of the multiple node devices 2300 that are provided with at least one of the data segments 3140, execution of the control routine 2340 may cause each such provided data segment 3140 to be divided into multiple data frames 3141 of equal length. In so doing, the speech segment represented by each of such data segments 3140 is divided into multiple speech frames that are each represented by one of the data frames 3141. It should be noted that, since each of the data segments 3140 are likely to be of a different size (as a result of each of the speech segments represented thereby likely being of a different temporal length), the division of each data segment 3140 into multiple data frames 3141 may result in different quantities of data frames 3141 being generated from each data segment 3140.

Following the division of a data segment 3140 into multiple data frames 3141 within each of the multiple node devices 2300, each of those data frames 3141 may then be subjected to feature detection in which the speech frame represented by each is analyzed to identify any occurrences of one or more selected acoustic features therein. For each data frame 3141, a corresponding feature vector 3142 may be generated that includes indications of when each identified acoustic feature was found to have occurred within the corresponding speech frame. Each feature vector 3142 of the resulting set of feature vectors 3142 corresponding to the set of data frames 3141 of a single segment 3140 may then be provided as an input to an acoustic model that is caused to be implemented within each of the multiple node devices 2300 by further execution of the control routine 2340. The acoustic model may map each occurrence of a particular acoustic feature, or each occurrence of a particular sequence of acoustic features, to one or more graphemes that may have been pronounced and/or to a pause that may have occurred. More specifically, for each feature vector 3142, the acoustic model may generate one or more probability distributions of one or more graphemes (which may correspond to one or more phonemes that may be represented by corresponding text character(s)) that were pronounced, and/ or one or more pauses that occurred within the corresponding speech frame. The probability distributions so derived from all of the feature vectors that correspond to a single speech segment may be assembled together in temporal order to form a single probability distribution set 3143 that corresponds to that single speech segment.

Turning to FIG. 15C, each of the probability distribution sets 3143, following its generation within a different one of the multiple node devices 2300, may then be provided to the control device 2500. Also, each of the multiple node devices 2300 may be provided with a complete copy of a corpus data set 3400 that includes an n-gram language model.

Within the control device 2500, execution of the control routine 2540 may cause the probability distributions of graphemes and/or of pauses within each of the probability distribution sets 3143 to be analyzed in temporal order to derive a set of up to a pre-selected quantity of candidate words that are each among the words that are each more likely to be the next word that was spoken. Each word of this set of candidate words may then be combined with up to a pre-selected quantity of earlier-identified preceding words to form a corresponding set of candidate n-grams that are to be searched for within the corpus data set 3400. The set of candidate n-grams may then be provided to the multiple node devices 2300 to enable the performance of a beam search through the corpus of the corpus data set 3400 in a distributed manner across the multiple node devices 2300, as will be explained in greater detail.

Within each of the multiple node devices 2300, in executing the control routine 2340, a different subset of the set of candidate n-grams is searched for within the corpus represented by the corpus data set 3400, as will also be explained in greater detail. Within each of the multiple node devices 2300, as the probability for each candidate n-gram of the subset is retrieved from the corpus of the corpus data set 3400 as a result of the search, indications of those probabilities may be transmitted back to the control device 2500.

Within the control device 2500, following the receipt of the probabilities for all of the candidate n-grams within the set of candidate n-grams from the node devices 2300, the one candidate n-gram within the set that has the highest probability may be identified. In so doing, the corresponding candidate word out of the set of candidate words is selected as being the word that was mostly likely the next word spoken. That word may then be added to the transcript of the speech audio of speech data set 3100, which may be stored within the control device 2500 as a text data set 3700.

Turning to FIG. 15D, following the generation of a complete transcript of what was said in the speech audio of the speech data set 3100, the transcript may be stored within the one or more storage devices 2100 as the corresponding text data set 3700. The text data set 3700 may include an identifier of the speech data set 3100 from which the transcript of the text data set 3700 was derived.

Within the control device 2500, in executing the control routine 2570, various post-processing analyses may be performed of the text within the transcript to identify such features as the one or more topics that were spoken about, the relative importance of each topic, indications of sentiments, etc. More specifically, using the transcript of the text data set 3700 as an input, one or more terms within the transcript (each including one or more words) may be identified as having one or more quantifiable characteristics (e.g., counts of occurrences of each term and/or aggregate counts of multiple terms, degree of relevance of a term within the transcript, degree of strength of positive or negative sentiment about a term, etc.), and/or relational characteristics (e.g., semantic and/or grammatical relationships among terms, whether detected sentiment about a term is positive or negative, etc.)

In some embodiments, the entirety of the transcript may be provided to each of multiple ones of the node devices to enable each to perform a different post-processing analysis on the entirety of the transcript. As part of one or more of such analyses, sets of n-grams from the transcript may be provided to the multiple node devices 2300 to be searched for within the corpus data set 3400 as part of using n-gram probabilities in identifying topics, indications of sentiments about topics, etc. Regardless of the exact types of text analyses that are performed, and regardless of the exact manner in which each text analysis is performed, the various insights that may be derived from such analyses may be assembled as corresponding text metadata 3779 that may also be stored within the one or more storage devices 2100.

Turning to FIG. 15E, following the derivation of the text metadata 3779 corresponding to the text data set 3700, further execution of the control routine 2570 may cause the retrieval of text metadata 3779 corresponding to other text data sets 3700 that correspond to other speech data sets 3100. Such other text metadata 3779 may be analyzed to identify relationships among words, text chunks, utterances, topics, etc. that may lead to the identification of other text data sets 3700 generated from other speech data sets 3100 that may be deemed to be related.

In further executing the control routine 2570, the control device 2500 may be cause to provide the text data set 3700, the corresponding text metadata 3779, and/or text metadata 3779 of other related speech data set(s) 3100 and/or text data set(s) 3700 to the requesting device 2700. It may be that the request to provide various insights into what was spoken in the speech audio of the speech data set 3100 was received by the control device 2500 from the requesting device 2700. In executing the control routine 2740, images of the transcript of the text data set 3700, various visualizations of aspects of the contents thereof indicated in the corresponding text metadata 3779, and/or visualizations of identified relationships to other transcripts of other speech audio may be presented to an operator of the requesting device 2700.

Figure 16A:
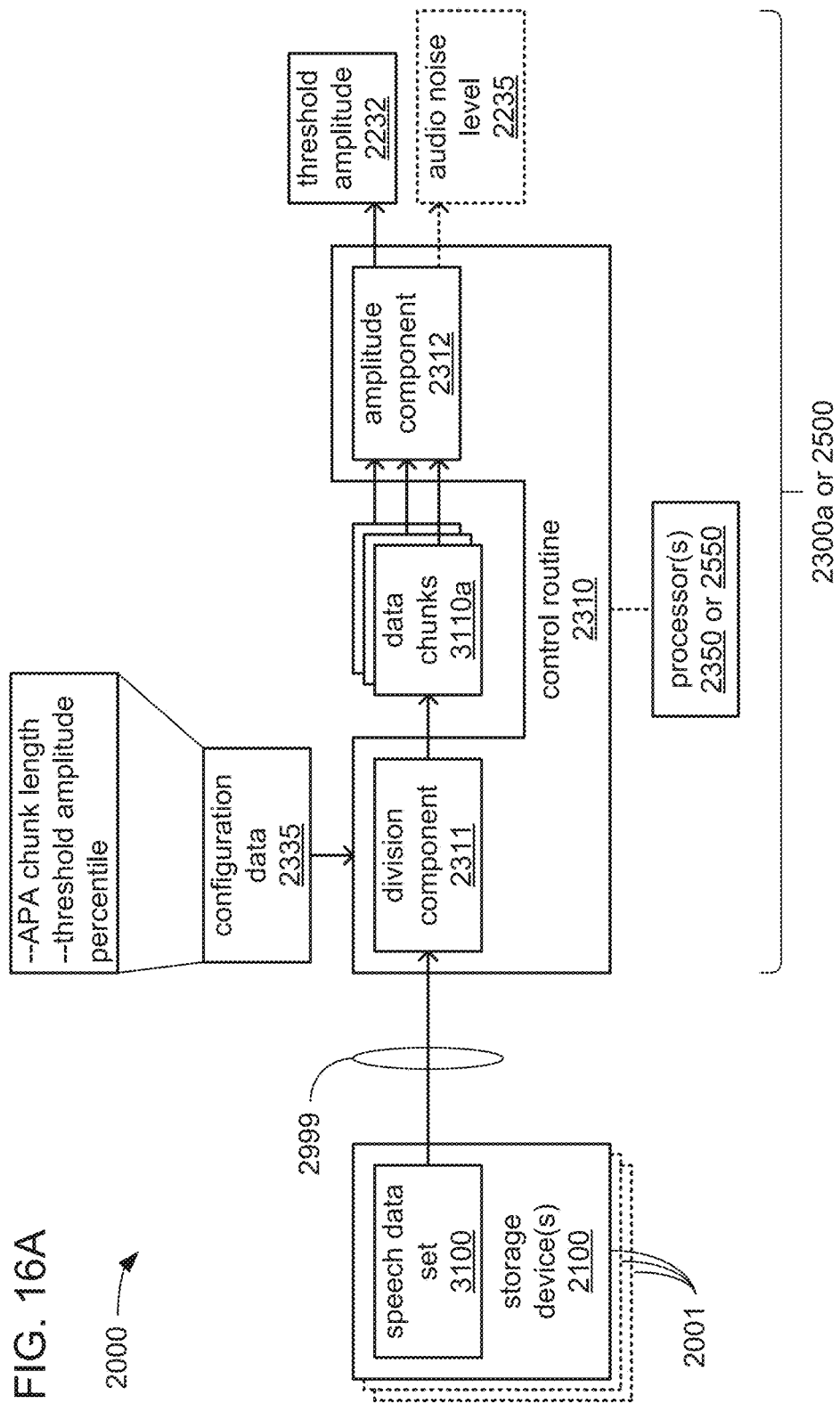
FIGS. 16A, 16B and 16C, together, illustrate an example of employing an APA segmentation technique to derive a candidate set of indications of likely sentence pauses within the speech audio of a speech data set.
Figure 16B:
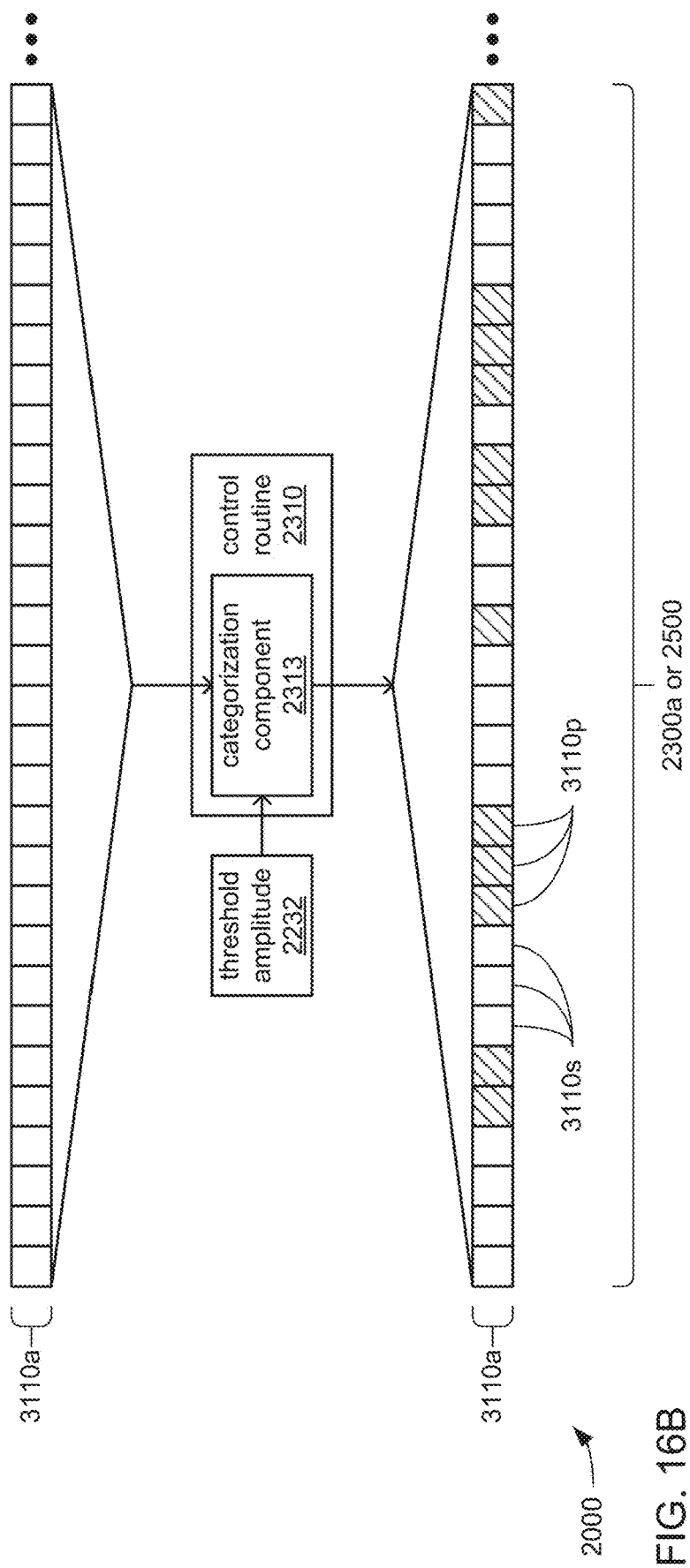
Figure 16C:
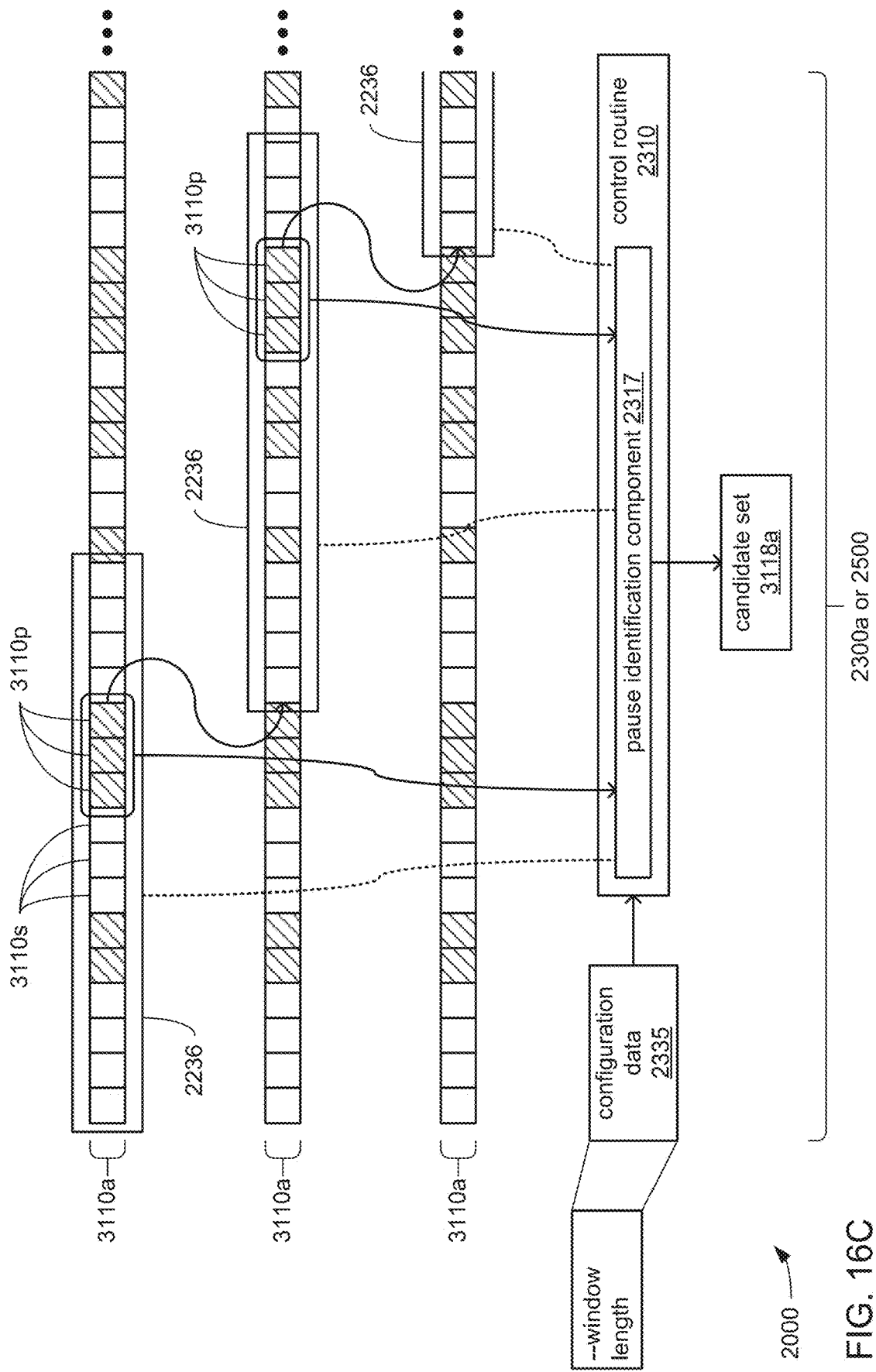

FIGS. 16A, 16B and 16C, taken together, illustrate an example of use of an adaptive peak amplitude (APA) segmentation technique during pre-processing to enable the division of the speech audio of a speech data set 3100 into segments (each represented in storage by a data segment 3140), where the divisions into segments occur at the midpoints of sentence pauses. FIG. 16A illustrates the initial division of the speech data set 3100 into data chunks 3110a that each represent a chunk of the speech audio of the speech data set 3100, and the measurement of peak amplitude levels to derive a threshold amplitude 2232. FIG. 16B illustrates the categorization of each of the chunks as either a speech chunk or a pause chunk. FIG. 16C illustrates the identification of a candidate set 3118a of likely sentence pauses within the speech audio of the speech data set 3100.

As previously discussed, in the distributed processing system 2000 depicted in FIG. 13A (or in another similar distributed processing system), it may be that each of the multiple segmentation techniques is assigned to be performed by a different one of the node devices 2300. Thus, each one of such assigned node devices 2300 derives a different candidate set 3118 of likely sentence pauses for subsequent use within the control device 2500 to derive a converged set 3119 of likely sentence pauses to be used as the basis for dividing the speech audio of the speech data set 3100. However, as also previously discussed, in the non-distributed processing system 2000 depicted in FIG. 13B (or in another similar processing system), it may be that each of the multiple segmentation techniques is assigned to be performed within a separate one of multiple execution threads supported by multiple cores 2551 of the processor(s) 2550 within the control device 2500. Thus, each of the multiple candidate sets 3118 of likely sentence pauses would be derived on a different one of those assigned execution threads within the control device 2500, before being used to derive the converged set 3119 on what may be yet another execution thread within the control device 2500.

Turning to FIG. 16A, in executing a division component 2311 of the control routine 2310, either core(s) 2351 of a processor 2350 of a node device 2300a, or core(s) 2551 of a processor 2550 of the control device 2500 may be caused to divide a speech data set 3100 into multiple data chunks 3110a. In so doing, an indication of the length of the speech audio that is to be represented by each data chunk 3110a may be retrieved from the configuration data 2335.

It should be noted that, in some embodiments, the pre-processing of speech audio as part of speech-to-text conversion may also include normalizing the digital format in which the speech audio is stored as a speech data set 3100. Thus, it may be, that prior to or as part of dividing the speech audio into chunks, the digital format in which the speech audio is stored as the speech data set 3100 may be changed to a pre-selected format that specifies one or more of a particular sampling frequency, data width and/or type of data value per sample, a particular type of compression (or no compression), etc. It may be that such a pre-selected format is necessitated for sake of compatibility with one or more components for performing one or more of the pre-processing operations, and/or one or more of the processing operations of the speech-to-text conversion.

In executing an amplitude component 2312 of the control routine 2310, core(s) of the processor 2350 or 2550 may be caused to analyze each of the data chunks 3110a to measure the peak amplitude of the chunk of speech audio present within each. With all of the peak amplitudes across all of the data chunks 3110a so measured, a level of amplitude of a preselected percentile of all of the peak amplitudes may be derived and used as a threshold amplitude 2232. In so doing, an indication of the preselected percentile may be retrieved from the configuration data 2335.

As previously discussed, it may be that the multiple segmentation techniques are assigned relative weighting factors that are used in combining the resulting multiple candidate sets 3118 of likely sentence pauses to derive the converged set 3119 of likely sentence pauses, and it may be that the relative weighting factors are adjusted based on the level of audio noise that is present across the chunks of the speech audio. In such embodiments, and as depicted, it may be that execution of the amplitude component 2312 also causes the measurement of the level of audio noise in the chunk of speech audio within each of the data chunks 3110a, and causes the derivation of an audio noise level 2235 that is in some way representative of the level of audio noise present within the entire speech audio. In various embodiments, the audio noise level 2235 may be indicative of the minimum level of audio noise measured across all of the data chunks 3110a, an average thereof, and/or of any of a variety of other characteristics of audio noise.

Turning to FIG. 16B, in executing a categorization component 2313 of the control routine 2310, core(s) of the processor 2350 or 2550 may be caused to use the threshold amplitude 2232 to categorize each of the data chunks 3110a as either a speech data chunk 3110s or a pause data chunk 3110p. More specifically, all of the data chunks 3110a that each represent a chunk of speech audio with a measured peak amplitude above the threshold amplitude are deemed to be speech data chunks 3110s that each represent a speech chunk, while all of the data chunks 3110a that each represent a chunk of speech audio with a measured peak amplitude below the threshold amplitude are deemed to be pause data chunks 3110p that each represent a pause chunk. Data chunks 3110a that each represent a chunk of speech audio with a measured peak amplitude equal to the threshold amplitude may be deemed to be speech data chunks 3110s or pause data chunks 3110p, depending on implementation details in various embodiments.

Turning to FIG. 16C, in executing a pause identification component 2317 of the control routine 2310, core(s) of the processor 2350 or 2550 may be caused to adaptively identify longer pauses defined by larger quantities of consecutive pause data chunks 3110p as likely sentence pauses. More specifically, and starting with the data chunk 3110a that represents the temporally earliest chunk of the speech audio of the speech data set 3100, a window 2236 that covers a preselected quantity of temporally consecutive ones of the data chunks 3110a may be shifted across the length of the speech audio, starting with the temporally earliest data chunk 3110*a* and proceeding throughout all of the data chunks 3110*a* in temporal order toward the temporally last data chunk 3110*a*. Thus, with the window 2236 positioned to begin with the earliest data chunk 3110*a* (regardless of whether it is a pause data chunk 3110*p* or a speech data chunk 3110*s*), measurements of the lengths of each pause represented by multiple consecutive pause data chunks 3110*p* within the window 2236 (if there are any pauses represented by multiple consecutive pause data chunks 3110*p* within the window 2236) may be taken to identify the longest pause thereamong. The longest pause that is so identified within the window 2236 (i.e., the pause represented by the greatest quantity of consecutive pause chunks 3110*p*) may then be deemed likely to be a sentence pause.

The window 2236 may then be shifted away from the earliest data chunk 3110*a* and along the data chunks 3110 of the speech audio in temporal order so as to cause the window 2236 to next begin either amidst the just-identified likely sentence pause (e.g., beginning at the midpoint thereof) of just after the just-identified likely sentence pause (e.g., as depicted, immediately after the temporally last chunk of the consecutive pause chunks 3110*p* that define the just-identified likely sentence pause). With the window 2236 so repositioned, again, measurements of the lengths of each pause represented by multiple consecutive pause data chunks 3110*p* within the window 2236 may be taken to again identify the longest pause thereamong. Again, the longest pause that is so identified within the window (i.e., the pause represented by the greatest quantity of consecutive pause chunks 3110*p*) may be deemed likely to be a sentence pause. As depicted, this may be repeated until the window 2236 has been shifted along the entirety of the length of the speech audio (i.e., from the temporally earliest data chunk 3110*a* to the temporally latest data chunk 3110*a*).

Each of the pauses that has been deemed a likely sentence pause within the speech audio 3100 may form part of the candidate set 3118*a* of likely sentence pauses derived using the APA segmentation technique. More precisely, indications of where each likely sentence pause starts and ends within the speech audio may be stored within the candidate set 3118*a*, and/or indications of where the midpoint of each likely sentence pause is located within the speech audio and/or its length may be so stored. The manner in which such locations within the speech audio are described may be as amounts of time from the beginning of the speech audio represented by the speech data set 3100.

In so identifying likely sentence pauses through such use of the window 2236, it may be that an indication of what the length of the window 2236 should be (i.e., how many consecutive data chunks 3110*a* it should span) may be retrieved from the configuration data 2335. The length of the window 2236 may be selected to ensure that there cannot be a distance between the midpoints of any adjacent pair of likely sentence pauses that is greater than a capacity limitation that may be present in subsequent processing operations of the speech-to-text conversion. Alternatively or additionally, the length of the window 2236 may be selected to increase the likelihood that a sentence pause will be identified each time the window 2236 is re-positioned, based on the typical length of sentences in whichever language is used for the speech audio.

Further, in some embodiments, it may be that any instances of an adjacent pair of likely sentence pauses that are closer to each other than a predetermined threshold period of time are not permitted. An indication of the length of the predetermined threshold period of time (which may also be expressed as a quantity of consecutive data chunks 3110*a*) may also be retrieved from the configuration data 2335. It may be that, wherever such a pair of likely sentence pauses might occur, one of the two likely sentence pauses may be dropped from those that are included in the candidate set 3118*a* of likely sentence pauses. The selection of which of two such likely sentence pauses is the one to be dropped may be based on which is shorter than the other, and/or may be based on a requirement that the dropping of one or the other should not be allowed to create a distance between any of two of the remaining likely sentence pauses that is greater than the length of the window 2236, which may be treated as an upper limit on the distance between any two of the likely sentence pauses.

Figure 17A:
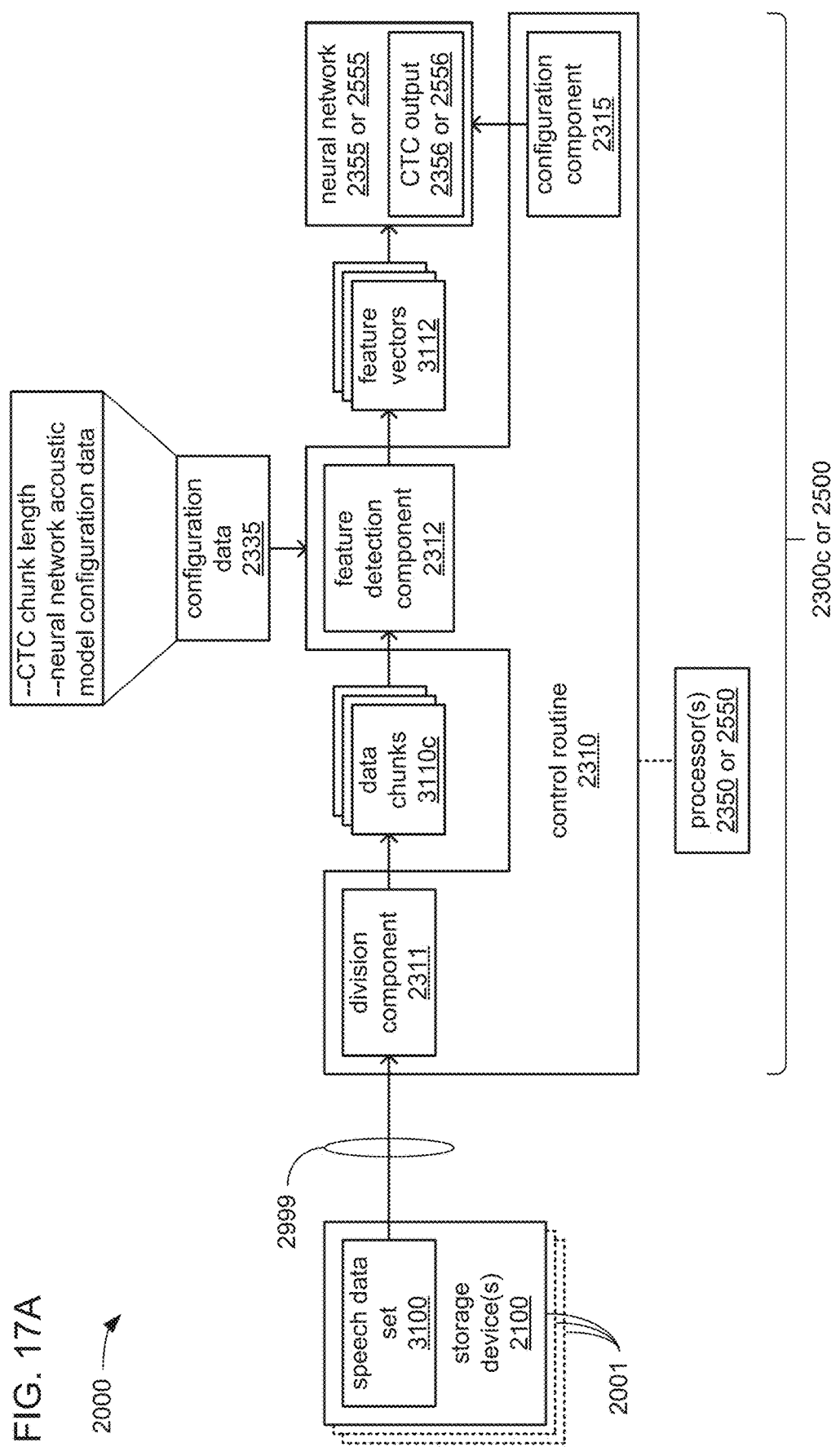
FIGS. 17A and 17B, together, illustrate an example of employing a CTC segmentation technique to derive another candidate set of indications of likely sentence pauses within the same speech audio of the same speech data set of FIGS. 16A-C.
Figure 17B:
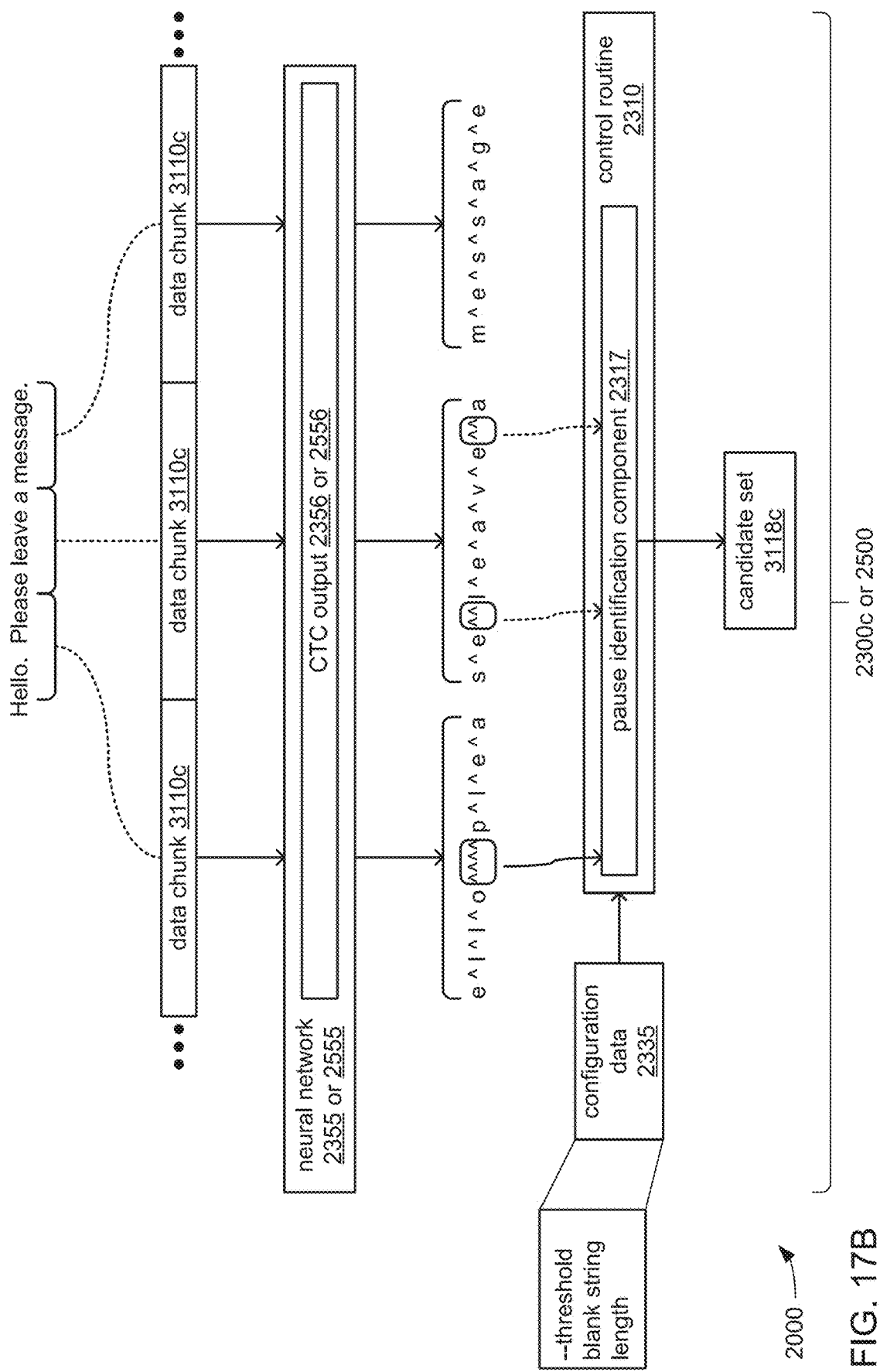

FIGS. 17A and 17B, taken together, illustrate an example of use of a connectionist temporal classification (CTC) segmentation technique during pre-processing to also enable the division of the same speech data set 3100 into segments. FIG. 17A illustrates the initial division of the speech data set 3100 into data chunks 3110*c* that each represent a chunk of the speech audio of the speech data set 3100, and the provision of those data chunks 3110*c* as an input to a neural network 2355 of one of the node devices 2300, or as an input to a neural network 2555 of the control device 2500. FIG. 17B illustrates the use of such a neural network, which has been configured to implement an acoustic model, to identify likely sentence pauses for inclusion in a candidate set 3118*c* of likely sentence pauses within the speech audio.

Again, in the distributed processing system 2000 depicted in FIG. 13A (or in another similar distributed processing system), it may be that each of the multiple segmentation techniques is assigned to be performed by a different one of the node devices 2300. However, again, in the non-distributed processing system 2000 depicted in FIG. 13B (or in another similar processing system), it may be that each of the multiple segmentation techniques is assigned to be performed within a separate one of multiple execution threads supported by multiple cores 2551 of the processor(s) 2550 within the control device 2500. Therefore, and by way of example, it may be that the APA segmentation technique described in detail above in reference to FIGS. 16A-C may be performed within the node device 2300*a* to derive the candidate set 3118*a* of likely sentence pauses, while the CTC segmentation technique that is about to described in reference to FIGS. 17A-B may be performed, at least partially in parallel, within another node device 2300*c* to derive the corresponding candidate set 3118*c* of likely sentence pauses. Then, at least these two candidate sets 3118*a* and 3118*c* of likely sentence pauses may be combined within the control device 2500 to generate the converged set 3119 on an execution thread within the control device 2500.

Turning to FIG. 17A, in executing the division component 2311 of the control routine 2310, either core(s) 2351 of a processor 2350 of a node device 2300*c*, or core(s) 2551 of a processor 2550 of the control device 2500 may be caused to divide the same speech data set 3100 as was featured in FIGS. 16A-C into multiple data chunks 3110*c*. In so doing, an indication of the length of the speech audio that is to be represented by each data chunk 3110*c* may be retrieved from the configuration data 2335. It should be noted that the data chunks 3110*c* of this CTC segmentation technique may not represent the same length of the speech audio as are represented by the data chunks 3110*a* of the APA segmentation technique of FIGS. 16A-C. Indeed, it is envisioned that the data chunks 3110*c* are each likely to represent a greater length of speech audio such that the speech audio represented by a single one of the data chunks 3110c may match the length of the speech audio represented by multiple ones of the data chunks 3110a.

Again, in some embodiments, the pre-processing of speech audio as part of speech-to-text conversion may include normalizing the digital format in which the speech audio is stored as a speech data set 3100. Thus, it may again be that, prior to or as part of dividing the speech audio into chunks, the digital format in which the speech audio is stored may be changed to a pre-selected format that specifies one or more of a particular sampling frequency, data width and/or type of data value per sample, a particular type of compression (or no compression), etc.

As will be familiar to those skilled in the art, at least some acoustic models implemented using neural networks (and/or other technologies) may accept indications of detected audio features as input, instead of accepting audio data (e.g., the data chunks 3110c) directly as input. To accommodate the use of such implementations of an acoustic model, execution of the control routine 2310 may entail execution of a feature detection component 2312 to analyze the portion of speech audio represented by each data chunk 3110c to identify instances of each of a pre-selected set of acoustic features. In so doing, either core(s) 2351 of a processor 2350 of a node device 2300c, or core(s) 2551 of a processor 2550 of the control device 2500 may be caused to generate a corresponding feature vector 3112 from each data chunk 3110c that is analyzed. Each feature vector 3112 may include indications of each acoustic feature that is identified and when it occurred within the speech audio of the corresponding data chunk 3110c.

In executing a configuration component 2315, core(s) 2351 of the processor 2350 of the node device 2300c may be caused to configure a neural network 2355 therein to implement an acoustic model, or core(s) 2551 of the processor 2550 of the control device 2500 may be caused to so configure a neural network 2555 therein. As previously discussed, and as depicted, the neural network 2355 or 2555 incorporates a CTC output 2356 or 2556, respectively, thereby augmenting the output of text characters with the output of blank symbols.

As previously discussed, a neural network incorporating a CTC output, and that has been trained to implement an acoustic model, is normally used to accept indications of acoustic features detected within speech audio, and to output indications of the probabilities of which one or more text characters are likely to correspond to those acoustic features (e.g., probability distributions for text characters). With the addition of the CTC output, the probabilistic indications of likely text characters are augmented with blank symbols that are intended to identify instances where there are likely to be consecutive occurrences of the same text character (e.g., the pair of "1" characters in the word "bell"), despite the absence of an acoustic feature that would specifically indicate such a situation (e.g., no acoustic feature in the pronunciation of the "1" sound in the word "bell" that indicates that there are two consecutive "1" characters therein).

Broadly, CTC outputs have been used to aid in temporally aligning a sequence of indications of features that have been observed (e.g., acoustic features in speech sounds, or visual features in handwriting), with a sequence of labels (e.g., text characters, phonemes and/or graphemes) where there may be differences between the density of input observations over a period of time and the density of labels that are output for that same period of time. Such a CTC output has been used to generate blank symbols that may be used as a guide in performing such an alignment, including blank symbols that indicate where there may be multiple ones of the same label that are consecutively output that might otherwise be mistakenly merged into a single instance of that label (as in the above-described situation of a pair of "1" text characters that should not be merged). In this way, such multiple consecutive instances of a label (e.g., of a text character) are able to be associated with what may be a single observation, or a single set of observations, that might otherwise be associated with only one instance of that label, thereby aiding in the proper aligning of the input and output sequences.

However, it has been observed (and then confirmed by experimentation) that such a trained neural network with a CTC output may also be useful in identifying sentence pauses. More specifically, it has been observed that, in addition to outputting single blank symbols for such consecutive instances of a text character, the CTC output also has a tendency to generate relatively long strings of consecutive blank symbols that correspond quite well to where sentence pauses occur.

Turning to FIG. 17B, in so using the neural network 2355 or 2555 for the detection of sentence pauses, each data chunk 3110c is provided to the neural network 2355 or 2555 as an input. In executing the pause identification component 2317, core(s) of the processor 2350 or 2550 are caused to monitor the corresponding CTC output for occurrences of strings of consecutive blank symbols. FIG. 17B depicts an example of three consecutive data chunks 3110c that each represent a different depicted portion of speech audio in which the words "Hello" and "Please leave a message" are spoken as two separate sentences.

Turning to the provision of the first of the three data chunks 3110c that represents the speech sounds for portions of the words "Hello" and "Please" as an input, the output includes the letters therefor, accompanied by instances of the blank symbol (indicated in FIG. 17B using the """ character) separating the corresponding characters. As shown, a single instance of the blank symbol may be output between the two consecutive instances of the "1" character from the word "Hello", thereby exemplifying the aforedescribed function for which the CTC output is typically relied upon to perform. However, as also shown, an instance of a relatively long string of consecutive blank symbols is also output that corresponds with the sentence pause that occurs between these two words.

Turning to the provision of the second of the three data chunks 3110c that represents the speech sounds for another portion of the word "Please" and the entirety of each of the two words "leave" and "a" as input, the output includes the letters therefor, also accompanied by instances of the blank symbol separating the corresponding characters. As shown, two instances of a relatively short string of consecutive blank symbols are also output that each correspond with one of the two pauses that occur between adjacent pairs of these three words.

Turning to the provision of the third of the three data chunks 3110c that represents the speech sounds for just the word "message" as input, the output includes the letters therefor, also accompanied by instances of the blank symbol separating the corresponding characters. As shown, a single instance of the blank symbol may be output between the two consecutive instances of the "s" character from this word, thereby again exemplifying the aforedescribed function for which the CTC output is typically relied upon to perform.

As each of these outputs are provided by the neural network 2355 or 2555, the length of each string of consecutive blank symbols that may be present therein is compared to a threshold blank string length. Where a string of consecutive blank symbols in such an output is at least as long as the threshold blank string length (e.g., the string of blank symbols corresponding to the pause between the words "Hello" and "Please"), such a string of blank symbols may be deemed likely to correspond to a sentence pause. However, where a string of consecutive symbols in such an output is not at least as long as the threshold blank string (e.g., the strings of blank symbols between the words "Please" and "leave", and between the words "leave" and "a"), such a string of blank symbols may be deemed to not correspond to a sentence pause. Thus, in the example depicted in FIG. 17B, the pause between the words "Hello" and "Please" may be deemed to be a likely sentence pause, and an indication thereof may be included in the candidate set 3118c of likely sentence pauses.

In performing such comparisons of the lengths of strings of consecutive blank symbols to the threshold blank string length, an indication of the threshold blank string length may be retrieved from the configuration data 2335. In some embodiments, the threshold blank string length may have been previously derived during neural network training and/or testing to develop the neural network acoustic model configuration data included in the configuration data 2335 for use in configuring the neural network 2355 or 2555 to implement an acoustic model. During such training, it may be that portions of speech audio that are known to include pauses between sentences may be used, and the lengths of the resulting strings of blank symbols that correspond to those sentence pauses may be measured to determine what the threshold blank string length should be to enable its use in distinguishing pauses between sentences from at least pauses between words.

Figure 18A:
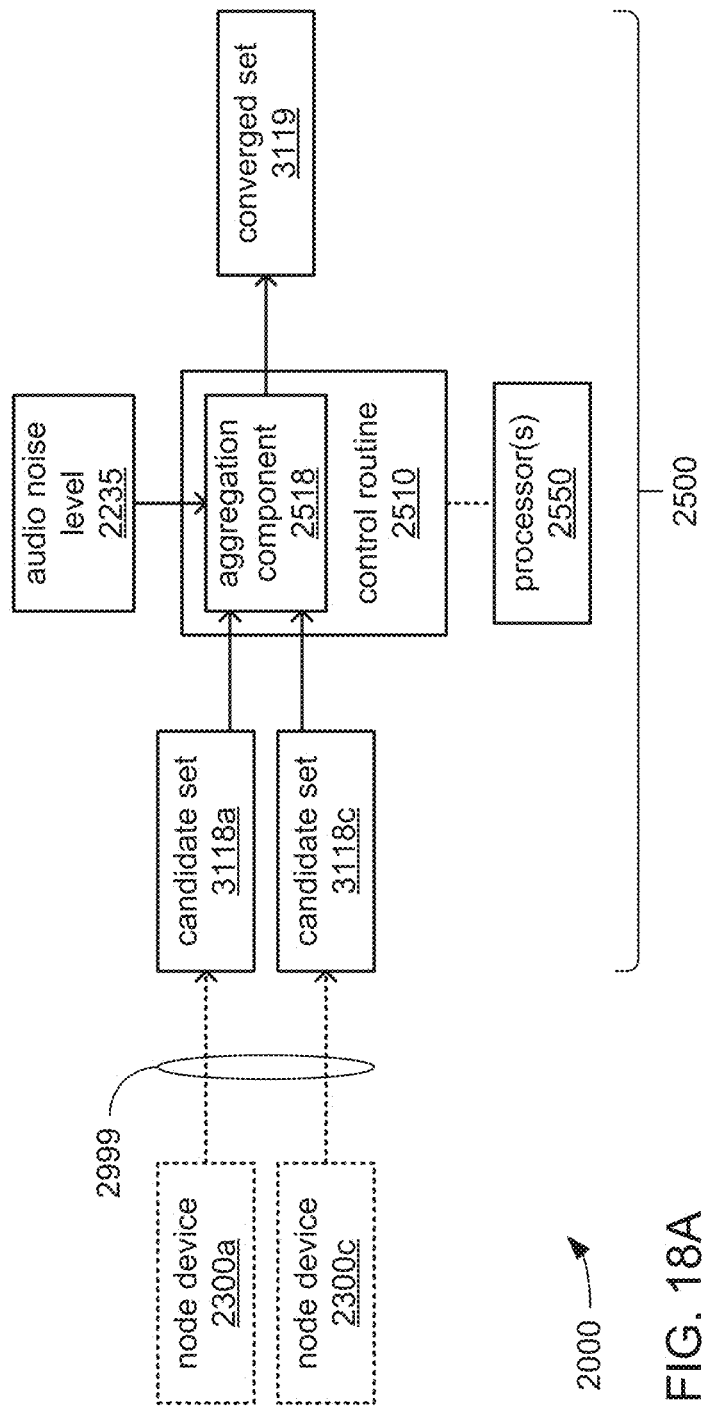
FIGS. 18A and 18B, together, illustrate an example of combining the candidate sets of indications of likely speech pauses generated in FIGS. 16A-C and in FIGS. 17A-B to generate a single converged set of indications of likely sentence pauses.
Figure 18B:
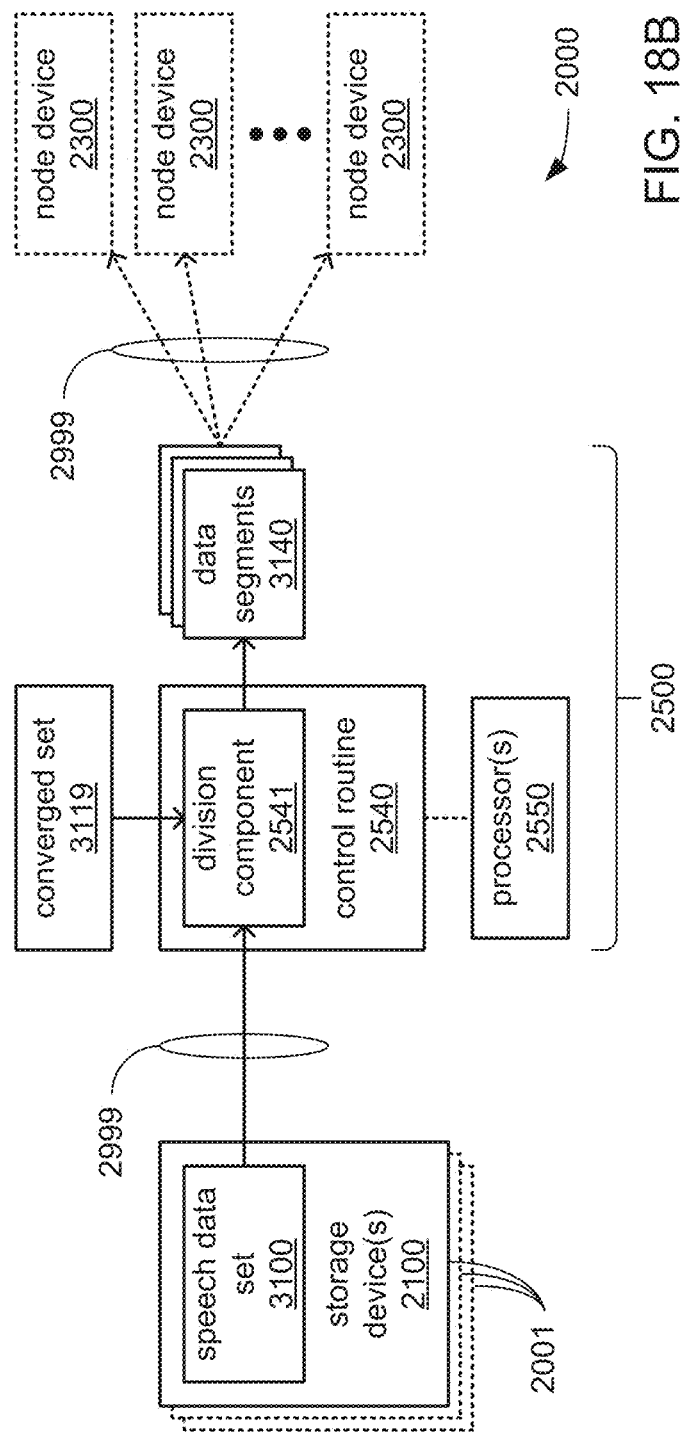

FIGS. 18A and 18B, taken together, illustrate an example of generating the converged set 3119 of likely sentence pauses. FIG. 18A illustrates the combining of multiple candidate sets 3118 of likely sentence pauses to generate the converged set 3119. FIG. 18B illustrates the use of the converged set 3119 in dividing the speech data set 3100 into data segments 3140 representing segments of the speech audio of the speech data set 3100.

As has been discussed in reference to FIGS. 16A-C and in reference to FIGS. 17A-B, it may be that, during pre-processing to divide speech audio represented by a speech data set 3100 into segments, multiple segmentation techniques may be used at least partially in parallel. As was also discussed, such parallelized performances may be distributed across multiple ones of the node devices (e.g., the node devices 2300a and 2300c of FIGS. 16A-C and FIGS. 17A-B, respectively), or across multiple execution threads associated with multiple processor cores 2551 of processor(s) 2550 of the control device 2500. Regardless of the exact manner in which the parallelized performances of multiple segmentation techniques is effectuated, the resulting multiple candidate sets 3118 of likely sentence pauses (e.g., the candidate sets 3118a and 3118c) may then be combined to generate the single converged set 3119 of likely sentence pauses that is used as the basis for effectuating the segmentation of the speech data set 3100 into data segments 3140.

Turning to FIG. 18A, in executing an aggregation component 2518 of the control routine 2510, core(s) of a processor 2550 of the control device 2500 may be caused to combine the candidate set 3118a of likely sentence pauses generated using the APA segmentation technique of FIGS. 16A-C, and the candidate set 3118c of likely sentence pauses generated using the CTC segmentation technique of FIGS. 17A-B, to generate the converged set 3119 of likely sentence pauses. As has been discussed, and as depicted with dotted lines, each of such multiple segmentation techniques may, in some embodiments, be performed within a different node device 2300 (e.g., the depicted node devices 2300a and 2300c).

As previously discussed, a variety of different approaches may be used in performing such a combining of multiple candidate sets 3118, including approaches to combining in which different segmentation techniques may be assigned relative weighting factors. As depicted, and as also previously discussed, such relative weight factors may be made dynamically adjustable based on one or more characteristics of the speech audio represented by the speech data set 3100. As further previously discussed in connection with the APA segmentation technique of FIGS. 16A-C, it may be that measurement(s) are made of audio noise level together with the measurements of peak amplitude that are performed as part of the APA segmentation technique.

Regardless of the exact manner in which the indication of audio noise level 2235 is generated, as depicted in FIG. 18A, such an indication may be used as an input for dynamically adjusting such relative weighting factors to take into account the relative degrees of susceptibility of each segmentation technique to being adversely affected by audio noise present in the speech audio. By way of example, it may be that the CTC segmentation technique is less susceptible to audio noise than the APA segmentation technique such that the presence of a higher level of audio noise in the speech audio may cause the candidate set 3118c generated via the CTC segmentation technique to be given a greater relative weight compared to the candidate set 3118a generated via the APA segmentation technique.

Turning to FIG. 18B, in executing a division component 2541 of the control routine 2540, core(s) of processor(s) 2550 of the control device 2500 may be caused to divide the speech data set 3100 into data segments 3140 based on the converged set 3119 of likely sentence pauses. In so doing, the speech audio represented by the speech data set 3100 may be divided into segments where the divisions between each adjacent pair of segments is caused to occur at the midpoints of each of the likely sentence pauses indicated in the converged set 3119. As a result, each of the segments of speech audio should be at least more likely to start and end with portions of sentence pauses, thereby serving to increase the likelihood that the entirety of the pronunciation of each letter, of each word, and/or of each sentence is fully contained within a single one of the segments, instead of being split across the divide between two segments. In this way, the accuracy of subsequent processing operations to detect acoustic features, to identify letters, and then to identify whole words, may be improved.

As also depicted, in embodiments that include the multiple node devices 2300 (e.g., the distributed processing system 2000 of FIG. 13A), the speed of such subsequent processing may be enhanced by distributing the data segments 3140 among the node device 2300 to enable at least partially parallel performances of such subsequent processing operations across multiple node devices 2300. Alternatively (and not specifically shown), it may be that such a similar enhancement in such processing may be achieved by distributing the data segments 3140 across multiple threads of execution of multiple cores 2551 of processor(s) 2550 of the control device 2500.

Figure 19A:
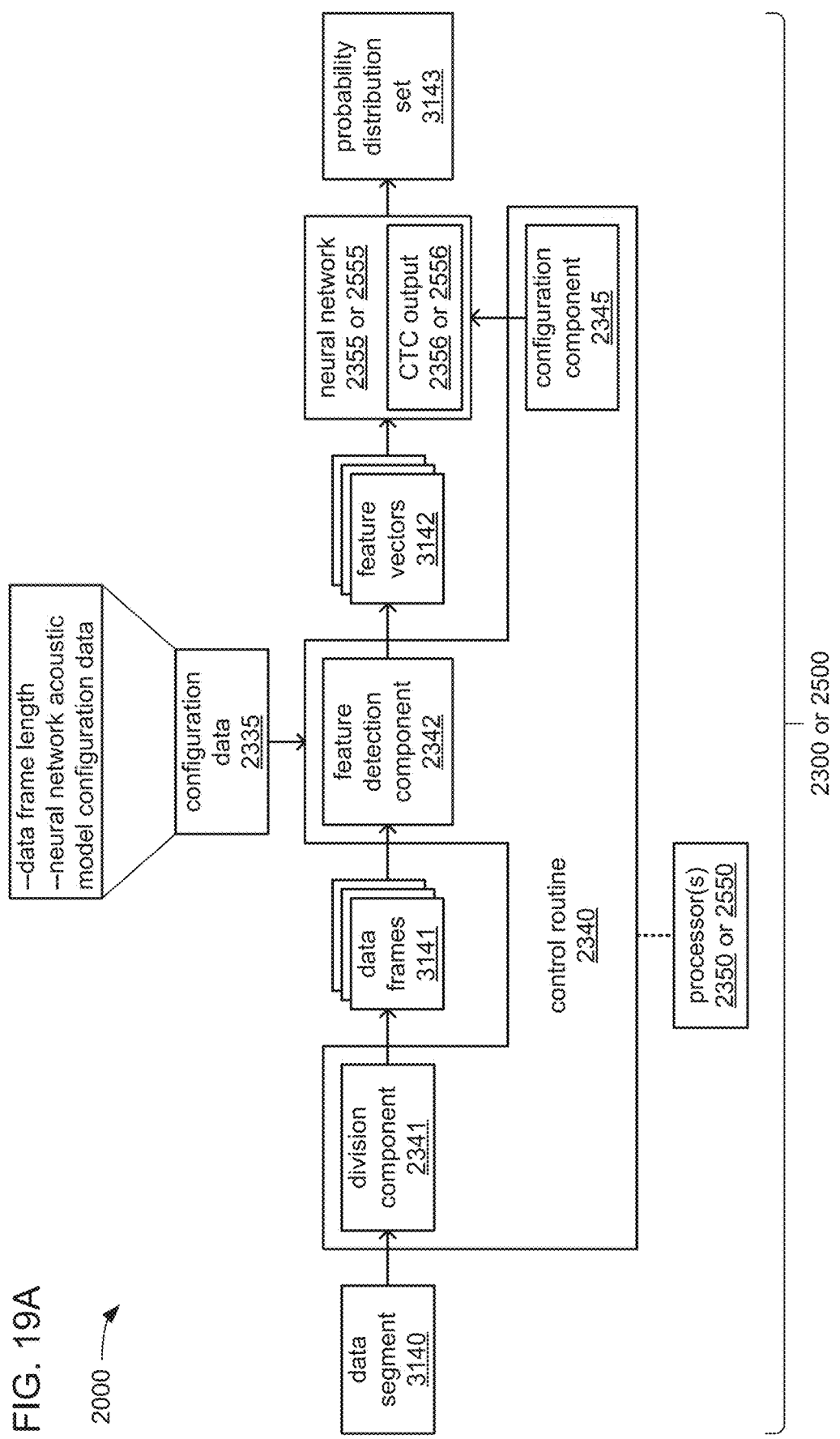
FIGS. 19A, 19B, 19C and 19D, taken together, illustrate an example of using the data segments generated in FIGS. 18A-B and an acoustic model to generate candidate sets of words and sets of candidate n-grams.
Figure 19B:
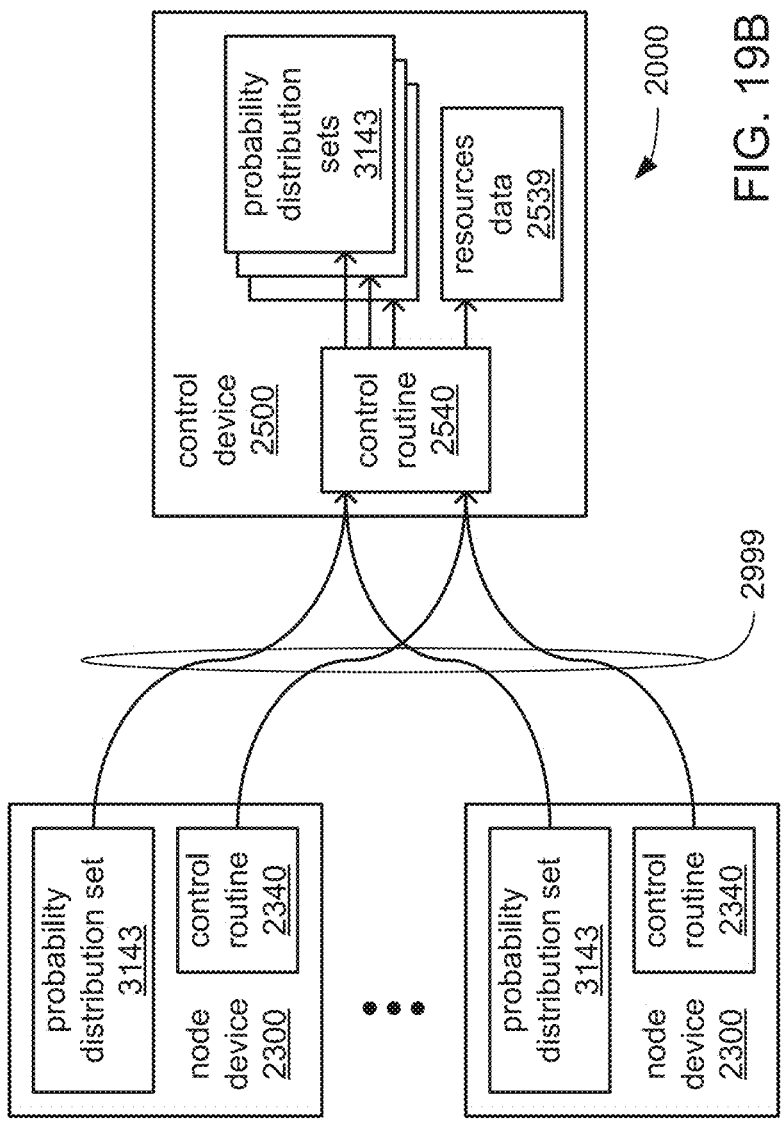
Figure 19C:
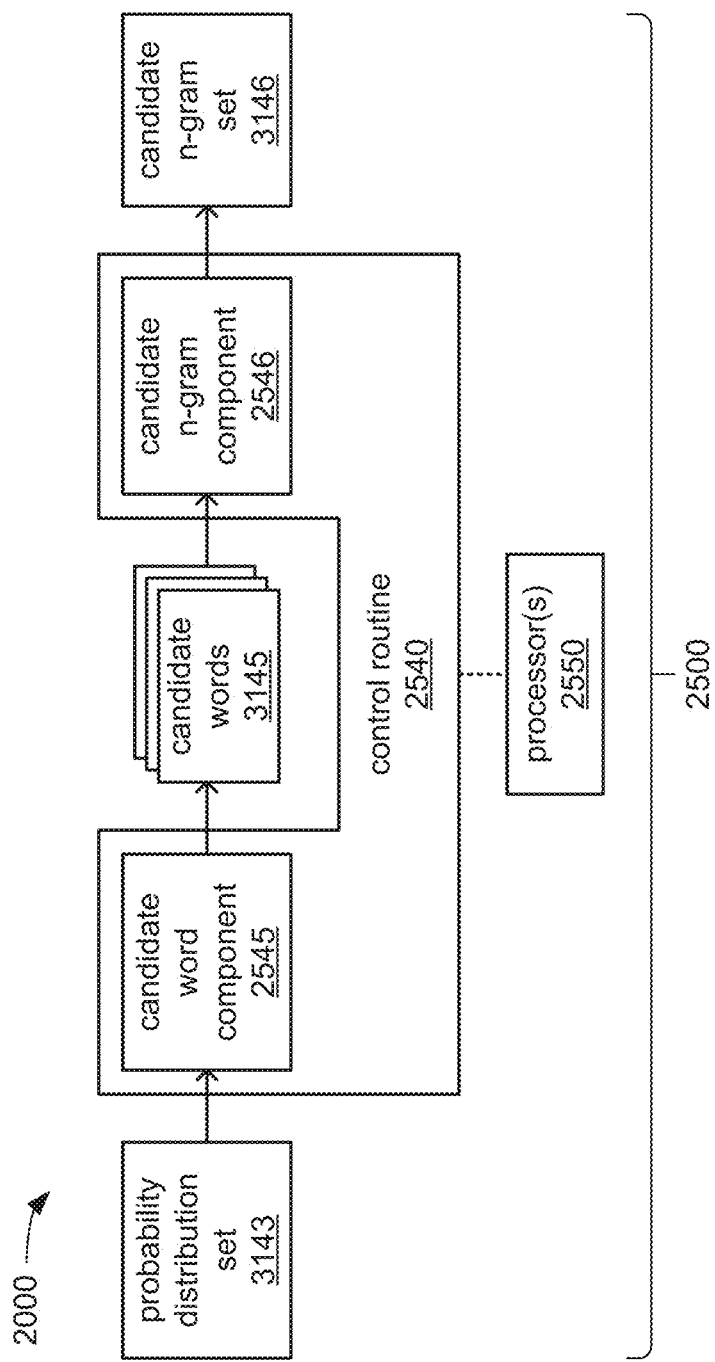
Figure 19D:
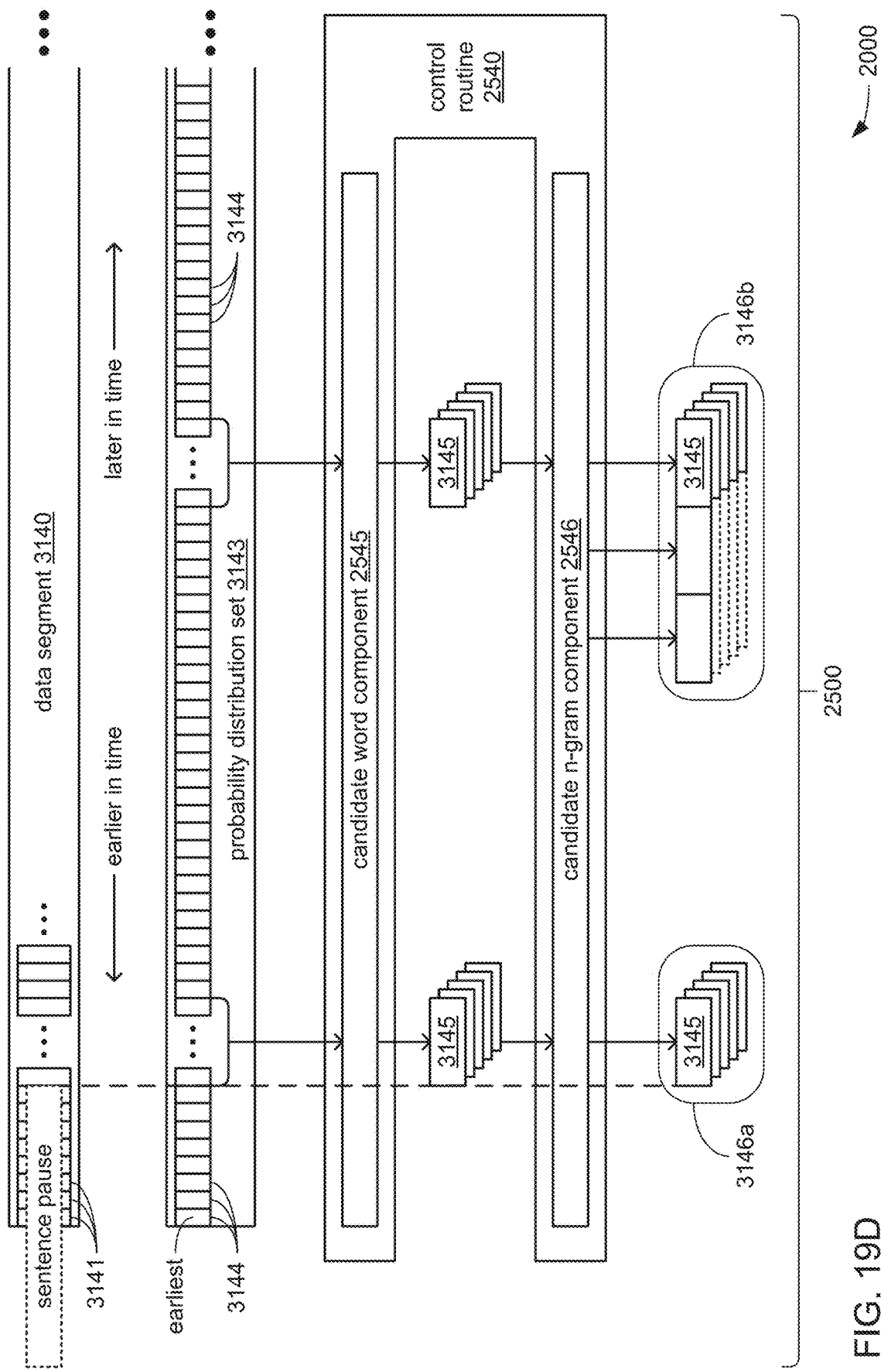

FIGS. 19A, 19B, 19C and 19D, taken together, illustrate an example of using the data segments 3140 into which the speech data set 3100 was divided to perform an initial subset of speech-to-text processing operations. FIG. 19A illustrates the use of feature detection and an acoustic model to generate sets of probability distributions that are indicative of relative probabilities of the use of various graphemes, and FIG. 19B illustrates the collection of those probability distribution sets 3143 for use by the control device 2500. FIGS. 19C-D, taken together, illustrate the use of the probability distribution sets 3143 to generate sets of candidate words 3145, and then to generate sets 3146 of candidate n-grams for use by a language model.

Turning to FIG. 19A, in executing a division component 2341 of the control routine 2340, one or more cores of one or more processors may be caused to divide a data segment 3140 into multiple data frames 3141. In embodiments of the processing system 2000 that include multiple ones of the node devices 2300 (as depicted in FIG. 13A), it may be that multiple data segments 3140 of a speech data set 3100 are distributed among multiple node devices 2300 (as depicted in FIG. 17B), and thus, it may be that one or more processor cores 2351 of one or more processors 2350 within each node device 2300 are caused to execute an instance of the division component 2341 that has been distributed to that node device 2300. Alternatively, in embodiments of the processing system 2000 that do not include multiple ones of the node devices 2300 (as depicted in FIG. 13B), it may be that all of the data segments 3140 of a single speech data set 3100 are provided to the control device 2500, and thus, it may be that one or more processor cores 2551 of one or more processors 2550 within the control device 2500 are caused to execute the division component 2341. Regardless of what processor(s) execute the division component 2341 within what device(s), an indication of the length of the speech audio that is to be represented by each data frame 3141 may be caused to be retrieved from the configuration data 2335 and used to control the division of each data segment 3140 into multiple data frames 3141.

Comparing FIG. 19A to FIG. 17A, it may be that both feature detection and use of an acoustic model may be repeated. Indeed, in comparing FIG. 19A to FIG. 17A, it becomes evident that the very same acoustic model based on a neural network (e.g., the neural network 2355 or 2555 incorporating the CTC output 2356 or 2556, respectively) may be used, again, in some embodiments. However, it should be noted that other embodiments are possible in which different acoustic models based on differing types of neural network may be used, and/or in which different acoustic models based on entirely different technologies may be used. In embodiments in which a neural network 2355 or 2555 is used, execution of a configuration component 2345 may cause core(s) 2351 of processor(s) 2350 or core(s) 2551 of processor(s) 2550 to so configure the neural network 2355 or 2555, respectively, to implement an acoustic model.

Regardless of whether the acoustic models of FIGS. 17A and 19A are identical, there are significant differences in the manner in which they are used in FIGS. 17A and 19A. Unlike the use of an acoustic model in FIG. 17A to perform part of the aforedescribed CTC-based segmentation technique, the acoustic model in FIG. 19A is used to used to perform part of speech-to-text processing operations. More specifically, the acoustic model is now used to generate, from a speech segment represented by a data segment 3140, a probability distribution set 3143. Each of the probability distributions within the set 3143 specifies, for a particular time within the segment, the relative probabilities for each of a pre-selected set of graphemes.

As will be familiar to those skilled in the art, over time, a number of different systems of notation have been devised for describing speech sounds for one or more languages using graphemes. In many of such notation systems, the graphemes may be text characters and/or similar visual symbols (e.g., text characters modified to include various accent markings). In different ones of such notation systems, at least some of the graphemes may each correspond to one or more phonemes, and/or at least some of the graphemes must be used in various combinations that each correspond to one or more phonemes. Thus, in specifying relative probabilities of a pre-selected set of graphemes, each probability distribution may specify the relative probabilities that each of a pre-selected set of speech sounds was uttered at a particular time within a speech segment.

Turning to FIG. 19B, in embodiments of the processing system 2000 that include multiple ones of the node devices 2300, and where the data segments 3140 of a single speech data set 3100 are distributed among multiple node devices 2300 such that the corresponding probability distribution sets 3143 are generated in a distributed manner thereamong, the probability distribution sets 3143 associated with a single speech data set 3100 may be collected from those multiple node devices 2300 and provided to the control device 2500 through the network 2999. Such provision of those multiple probability distribution sets 3143 to the control device 2500 may occur as they are generated, at least partially in parallel, within the multiple node devices 2300. Within the control device 2500, execution of the control routine 2540 may cause processors 2550 of the control device 2500 to organize the probability distribution sets 3143 in temporal order in preparation for being used to identify words for inclusion in a transcript of the contents of the speech audio. Alternatively, in embodiments of the processing system 2000 that don't include multiple ones of the node devices 2300, such that the probability distribution sets 3143 may have been generated within the control device 2500, such a collection of the probability distribution sets 3143 and provision thereof to the control device 2500 via the network 2999 may not occur.

Regardless of whether such a collection and provision of probability distribution sets 3143 via the network 2999 takes place, as also depicted, each of the node devices 2300 of the processing system 2000 (whether engaged in generating probability distribution sets 3143, or not) may also provide the control device 2500 with indications of the availability of their processing, storage and/or other resources. Such indications may be used to augment and/or update resources data 2539.

Turning to FIG. 19C, regardless of whether the probability distribution sets 3143 corresponding to a single speech data set 3100 were generated across multiple node devices 2300 or were generated within the control device 2500, in executing a candidate word component 2545 of the control routine 2540, core(s) 2551 of processor(s) 2550 of the control device 2500 may be caused to generate sets of one or more candidate words 3145 from each probability distribution set 3143. Then, in executing a candidate n-gram component 2546 of the control routine 2540, core(s) 2551 of processor(s) 2550 of the control device 2500 may be caused to generate corresponding one or more candidate n-gram sets 3146 from the one or more candidate words 3145 that are generated for each probability distribution set 3143.

More specifically, as previously discussed, and turning to FIG. 19D, each speech segment (each of which is represented in storage by a corresponding data segment 3140) may be formed by dividing the speech audio of a speech data set 3100 at midpoints amidst what are determined to be likely sentence pauses. As a result, each speech segment may begin with a portion of a sentence pause and end with a portion of another sentence pause. Each speech segment may then be further divided into frames (each of which is represented in storage by a corresponding data frame 3141), which are kept in temporal order. Thus, as depicted in FIG. 19D, the speech segment (again, represented by a data segment 3140) that corresponds to the depicted probability distribution set 3143 may begin with a first few consecutive speech frames (each of which is represented by a corresponding data frame 3141) in which there may be no speech sounds, as would be expected within a likely sentence pause. As a result, each of the corresponding first few consecutive probability distributions 3144 (including the earliest thereof) may indicate that a grapheme (e.g., a text character and/or a blank symbol) for an empty space has the highest probability of having occurred within the corresponding speech frame.

Following such consecutive probability distributions 3144 associated with the likely sentence pause at the start of the speech segment, there may then be the first of multiple consecutive probability distributions 3144 that may be associated with the pronunciation of the letters of the first word of a sentence (the transition from probability distributions 3144 associated with a likely sentence pause to probability distributions 3144 that may be associated with pronouncing the first word is marked by vertical dashed line). In executing the candidate word component 2545, processor(s) 2550 of the control device 2500 may, based on those multiple consecutive probability distributions 3144, derive a pre-selected quantity of candidate words 3145 that are each among the most likely to be the first word that was spoken throughout the corresponding multiple consecutive speech frames. The processor(s) 2550 may then be caused by execution of the candidate n-gram component 2546 to convert the set of candidate words 3145 into a candidate n-gram set 3146a by adding up to a pre-selected quantity of words that were previously identified as the immediately preceding words in what may be a sentence that corresponds to the probability distribution set 3143. However, since each of the candidate words 3145 is preceded by what is deemed to be a likely sentence pause, there may be no such preceding words to be added such that the resulting candidate n-gram set 3146a contains a set of uni-grams that are each just one of the candidate words 3145.

FIG. 19D also depicts another example set of candidate words 3145 being derived from multiple consecutive probability distributions 3144 at a temporally later location within the same probability distribution set 3143 that may be associated with pronouncing another word at a later time within the same speech segment. Again, in executing the candidate word component 2545, processor(s) 2550 of the control device 2500 may, based on those multiple consecutive probability distributions 3144, derive another pre-selected quantity of candidate words 3145 that are each among the most likely to be the word that was spoken throughout these other corresponding multiple consecutive speech frames. The processor(s) 2550 may then be caused by execution of the candidate n-gram component 2546 to convert this other set of candidate words 3145 into another candidate n-gram set 3146b by adding up to the pre-selected quantity of words that were previously identified as the immediately preceding words in what may be a sentence that corresponds to the probability distribution set 3143. Unlike the previously discussed set of candidate words 3145, there may be multiple immediately preceding words that were spoken up to the point at which one of the candidate words 3145 within this other set of candidate words 3145. Therefore, the other candidate n-gram set 3146b may include up to the pre-selected quantity of words.

Figure 20B:
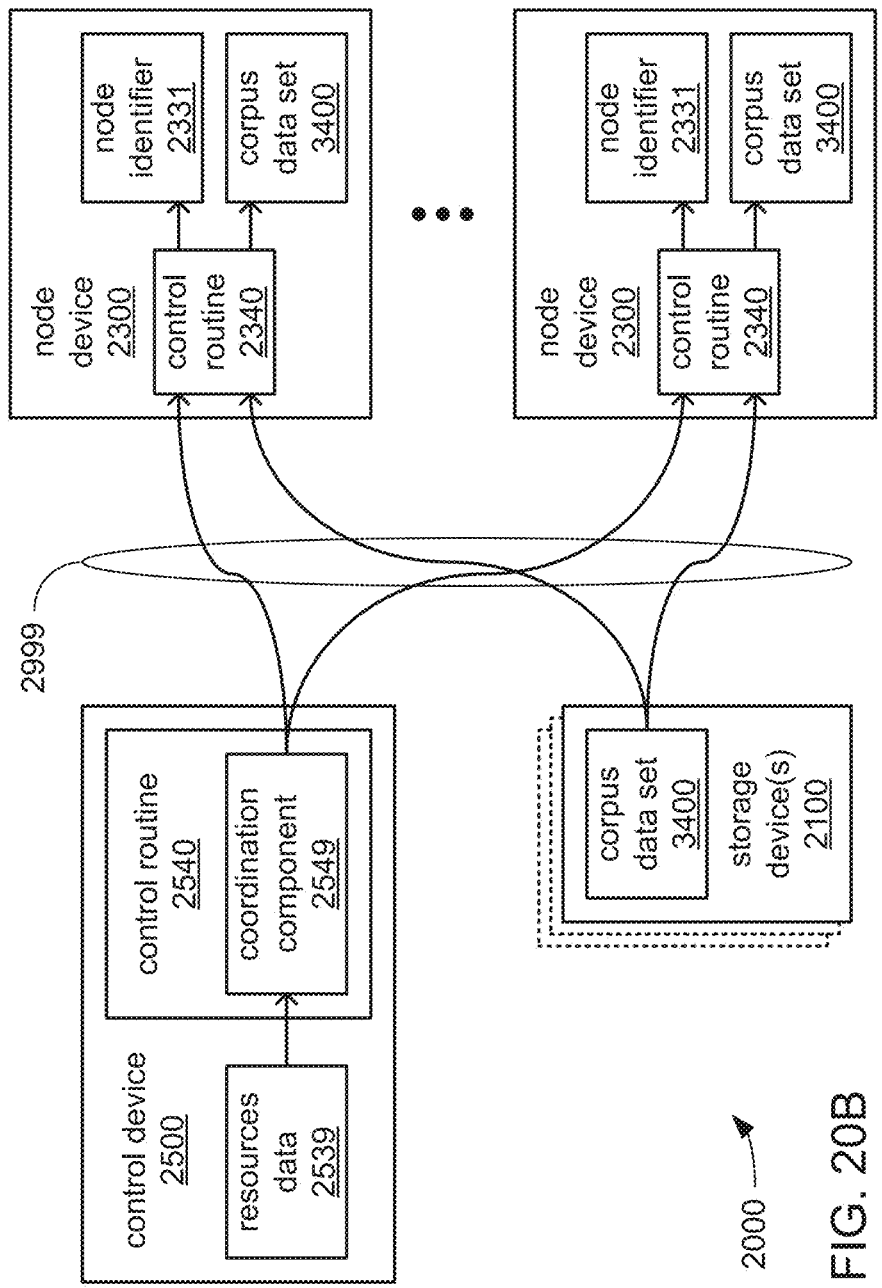
Figure 20C:
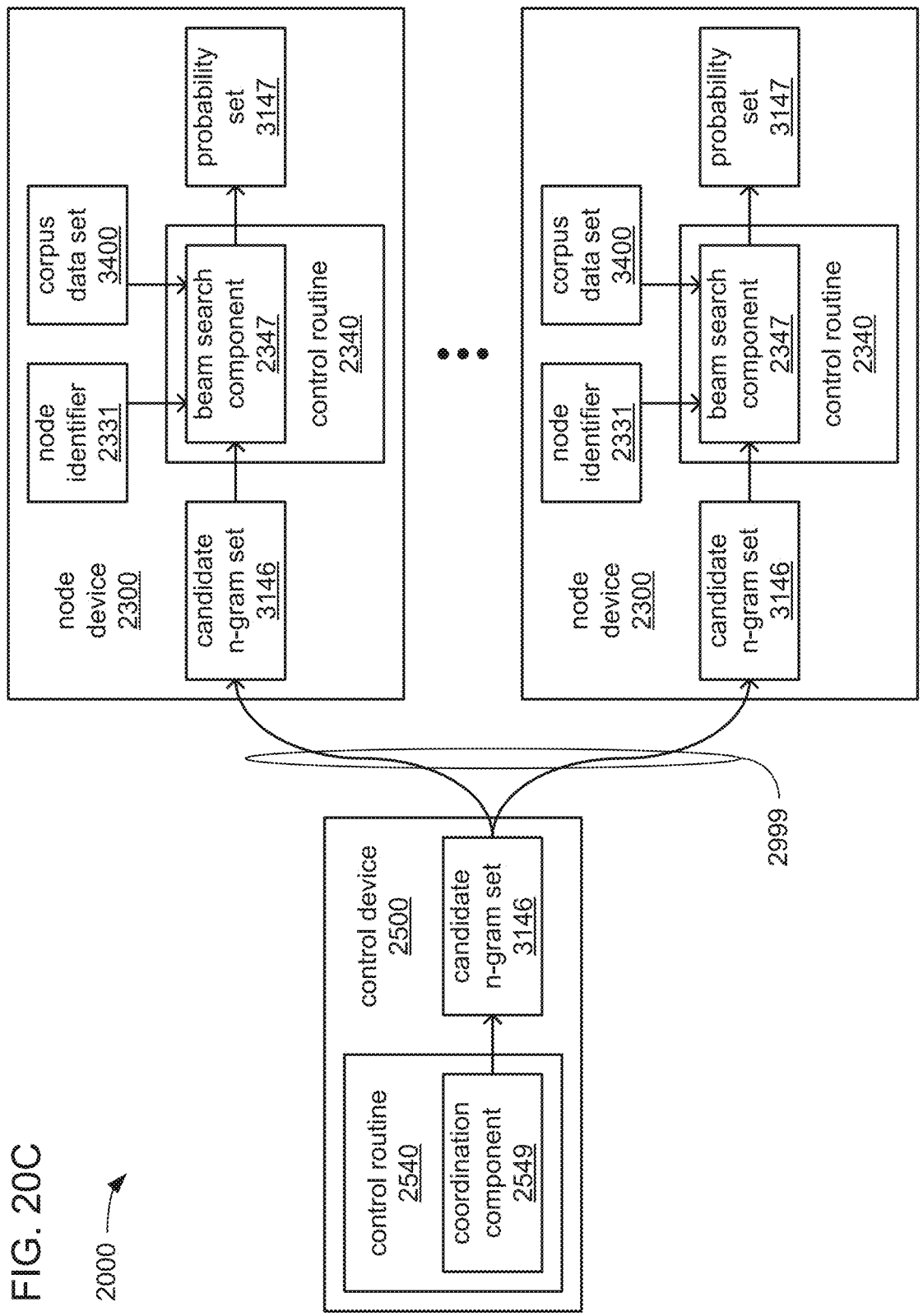
Figure 20D:
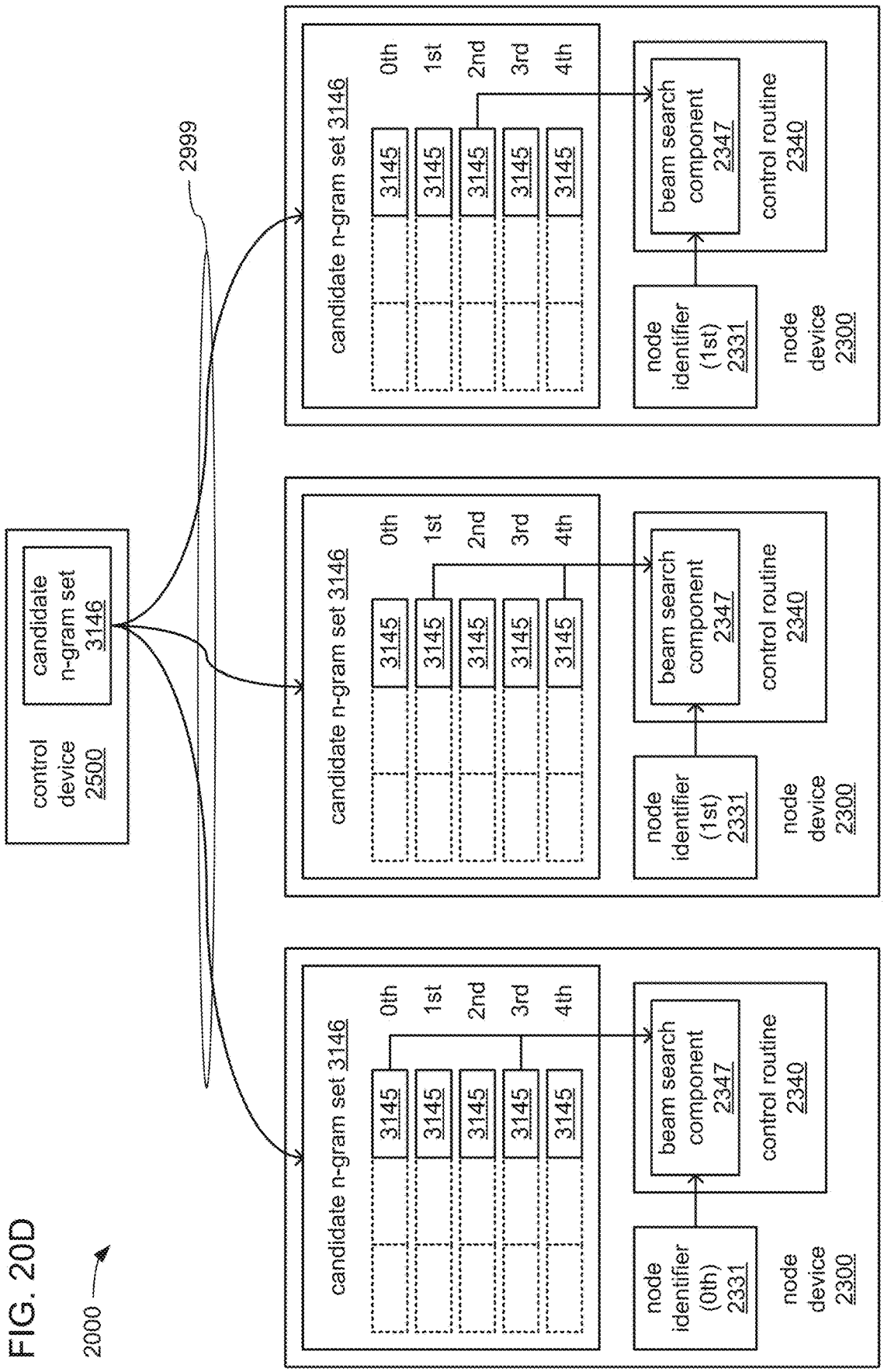
Figure 20E:
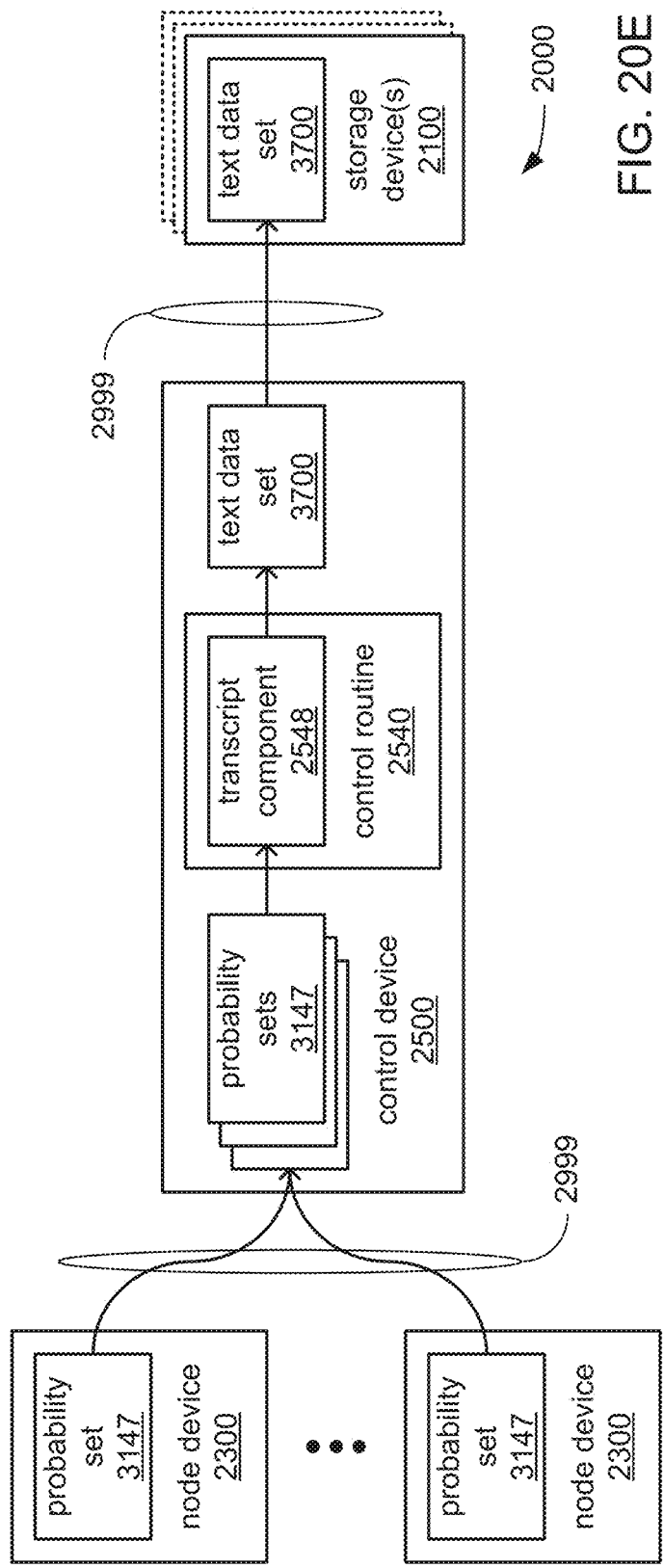

FIGS. 20A, 20B, 20C, 20D and 20E, taken together, illustrate an example of using the outputs of the initial subset of speech-to-text processing operations of FIGS. 19A-D to perform a further subset of such operations. FIG. 20A provides an overall illustration of using sets of candidate words 3145 and candidate n-gram sets 3146 as an input to the further subset of speech-to-text processing operations to generate a text data set 3700 representing transcript(s) of the words spoken in speech data set 3100. FIG. 20B illustrates the distribution of a large corpus 3400 representing a language model, along with individual node identifiers 2311, to each one of multiple selected node devices 2300 in preparation for using the language model in a distributed manner. FIGS. 20C-D illustrate aspects of the performance of a distributed beam search within the corpus data set 3400 among the multiple selected node devices 2300 to derive probability sets 3147 indicative of relative probabilities of use of n-grams within the candidate n-gram sets 3146. FIG. 20E illustrates aspects of the collection and use of probability sets 3147 to determine another word to add to a transcript stored as a text data set 3700.

As will be familiar to those skilled in the art, the use of an n-gram language model has become commonplace in speech-to-text processing. Such use of an n-gram language model is often based on an assumption that the next word in a transcript of speech audio is able to be identified with a relatively high degree of accuracy based on what word or words immediately preceded it. Also, it has also be found that the accuracy of the identification of the next word is able to be increased by increasing the quantity of immediately preceding words that are used as the basis for that identification. Unfortunately, as will also be familiar to those skilled in the art, each increase in the quantity of immediately preceding words by a single word can result in an exponential increase in the size of the corpus of n-grams that must be used. As a result, although there have been experimental implementations of speech-to-text processing that have used an n-gram language model supporting up to as many as 10 immediately preceding words, the amount of time, storage and processing resources required often make such an implementation impractical. Therefore, it is more commonplace to employ a quantity 3, 4 or 5 immediately preceding words.

However, FIGS. 20A-E depict aspects of implementing and using an n-gram language model within an embodiment of the distributed processing system 2000 that is able to practically support the use of a higher quantity of immediately preceding words. More specifically, and as will shortly be explained, the processing, storage and/or other resources of multiple computing devices may be employed in a cooperative manner to make the use of a higher quantity of immediately preceding words in an n-gram language model in speech-to-text processing significantly more practical.

As previously discussed in conjunction with FIG. 2B, among the speech-to-text processing operations that may be performed may be the use of an acoustic model to generate probability distributions of what graphemes (which again, may correspond to one or more phonemes represented by text character(s)) may have been pronounced during each of multiple speech frames within a speech segment. As also discussed, for each such speech segment, the probability distributions derived from the corresponding multiple speech frames may be assembled into a single probability distribution set 3143 that corresponds to that speech segment. Again, such operations may be performed, at least partially in parallel, across multiple ones of the node devices 2300.

Turning to FIG. 20A, regardless of whether the n-grams within a candidate n-gram set 3146 generated within the control device 2500 include any immediately preceding words ahead of the candidate words 3145 thereof, in executing a beam search component 2347 of the control routine 2340, core(s) 2351 of processor(s) 2350 or core(s) 2551 of processor(s) 2550 may be caused to perform a beam search within the corpus data set 3400 for one or more of the n-grams present within the candidate n-gram set 3146. As will be familiar to those skilled in the art of n-gram language models, each n-gram within an n-gram corpus may be accompanied therein with an indication of the relative frequency of its occurrence and/or its relative probability of occurrence within texts of a particular language (based on the sample texts of the particular language used in generating the n-gram corpus). As each n-gram is found within the corpus data set 3400, an indication of the relative probability of that n-gram occurring may be stored within a probability set 3147 generated for all of the candidate n-grams in the candidate n-gram set 3146.

Following generation of each probability set 3147, execution of a transcript component 2548 of the control routine 2540 may cause processor(s) 2550 of the control device 2500 to, based on the indications of the relative probabilities in the probability set 3147 for each n-gram within the candidate n-gram set 3146, identify a candidate word 3145 among the corresponding set of candidate words 3145 as the word that was most likely the next word to be spoken. The identified most likely spoken word may then be added to the transcript of the speech audio represented as a text data set 3700.

Turning to FIG. 20B, in embodiments of the processing system 2000 that include multiple ones of the node devices 2300 (as depicted in FIG. 13A), it may be that execution of a coordination component 2549 causes processor(s) 2550 of the control device 2500 to use indications of node devices 2300 with sufficient available processing and/or storage resources as a basis for selecting particular ones of node devices 2300 that are to be employed in performing beam searches of a corpus data set 3400 in a distributed manner. With such selections made, unique node identifiers 2331 may be transmitted to each of the selected node devices 2300 via the network 2999. The node identifiers 2331 may be a continuous series of positive integers of increasing value, starting with 0, and incremented by 1. The processor(s) 2550 of the control device 2500 may also be caused to cooperate with processors 2350 of the node devices 2300 to coordinate communications through the network 2999 to cause the provision of complete copies of the corpus data set 3400 for a pre-selected language from the one or more storage devices 2100 to each of the selected node devices 2300.

Turning to FIG. 20C, regardless of whether the n-grams within a candidate n-gram set 3146 generated within the control device 2500 include any immediately preceding words ahead of the candidate words 3145 thereof, in further executing the coordination component 2549, the processor(s) 2550 of the control device 2500 may be caused to provide complete copies of each of the candidate n-gram sets 3146, in temporal order, to all of the selected node devices 2300. Within each of the selected node devices 2300, execution of the beam search component 2347 of the control routine 2340 may cause the processor(s) 2350 thereof to perform a beam search within the corpus data set 3400 for one or more of the n-grams present within the candidate n-gram set 3146. As will be familiar to those skilled in the art of n-gram language models, each n-gram within an n-gram corpus may be accompanied therein with an indication of the relative frequency of its occurrence and/or its relative probability of occurrence within texts of a particular language (based on the sample texts of the particular language used in generating the n-gram corpus).

Referring to FIG. 20D, in addition to FIG. 20C, it should be noted that each of selected node devices 2300 is caused to perform a beam search for different one(s) of the n-grams within the candidate n-gram set 3146, such that no two of the selected node devices 2300 are caused to perform a beam search for the same n-gram. In some embodiments, this may be effected through the use of modulo calculations in which, within each of the selected node devices 2300, the numerical designation of the position occupied by each n-gram within the candidate n-gram set 3146 is divided by the quantity of the selected node devices 2300 to derive a modulo value for each n-gram within the candidate n-gram set 3146. The modulo value calculated for each n-gram is then compared to the unique node identifier 2331 that was earlier assigned to the selected node device 2300. The n-gram(s) that are searched for within each of the selected node devices 2300 are the one(s) for which the modulo value matches the unique node identifier 2331 for that node device 2300.

Thus, as depicted (in the deliberately simplified example in FIG. 20D in which there are only three selected node devices 2300), within the selected node device 2300 that has been assigned the "0" node identifier 2331, the n-grams at the "0th" and "3rd" positions within the candidate n-gram set 3146 are searched for within the corpus data set 3400 stored therein. Correspondingly, within the selected node device 2300 that has been assigned the "1" node identifier 2331, the n-grams at the "1st" and "4th" positions within the candidate n-gram set 3146 are searched for within the corpus data set 3400 stored therein. Also correspondingly, within the selected node device 2300 that has been assigned the "2" node identifier 2331, the n-gram at the "2nd" position within the candidate n-gram set 3146 is searched for within the corpus data set 3400 stored therein. In this way, a relatively even distribution of n-grams to be searched for within the corpus data set 3400 across the multiple selected node devices 2300 is achieved with relatively minimal communication across the network 2999.

Also, by providing each of the selected node devices 2300 with a complete copy of the entire corpus data set 3400, all processing operations for the beam search for each n-gram are performed entirely within a single node device 2300 without need for communications with any other device through the network 2999. This entirely eliminates the need for network communications among the selected node devices 2300 to carry out any of the beam searches, thereby reducing consumption of network bandwidth and eliminating the expenditure of time that would occur while such communications take place.

Further, such distribution of beam searches among multiple computing devices enables the corpus data set 3400 to be of considerably larger size versus the maximum size that would be practical and/or possible were just a single computing device used. As will be familiar to those skilled in the art, the ability to more efficiently perform a greater quantity of beam searches in less time, thereby enabling the use of a larger corpus, may advantageously permit a corpus to include more lower frequency n-grams (i.e., n-grams that have a relatively low probability of occurring within texts of a particular language) and/or to include n-grams with a greater quantity of words per n-gram.

Focusing again more specifically on FIG. 20C, within each of the selected node devices 2300, as each n-gram is found within the corpus data set 3400, an indication of the relative probability of that n-gram occurring may be stored within a probability set 3147 generated for all of the n-grams for which a beam search is performed within that selected node device 2300. In some embodiments, where a particular n-gram is not found within the corpus data set 3400, an indication of default value for the relative probability of the occurrence of an "unknown" n-gram may be stored within the probability set 3147.

Turning to FIG. 20E, each of the probability sets 3147 may be provided to the control device 2500 through the network 2999 as they are generated, at least partially in parallel, within multiple node devices 2300. Within the control device 2500, execution of a transcript component 2548 may cause processor(s) 2550 of the control device 2500 to, based on the indications of the relative probabilities retrieved for each n-gram within the candidate n-gram set 3146, identify the word that was most likely spoken. The identified most likely spoken word may then be added to the transcript of the speech audio. Upon completion of the generation of the transcript, the control device 2500 may provide it to the one or more storage devices 2100 to be persistently stored therein as a text data set 3700.

Figure 21A:
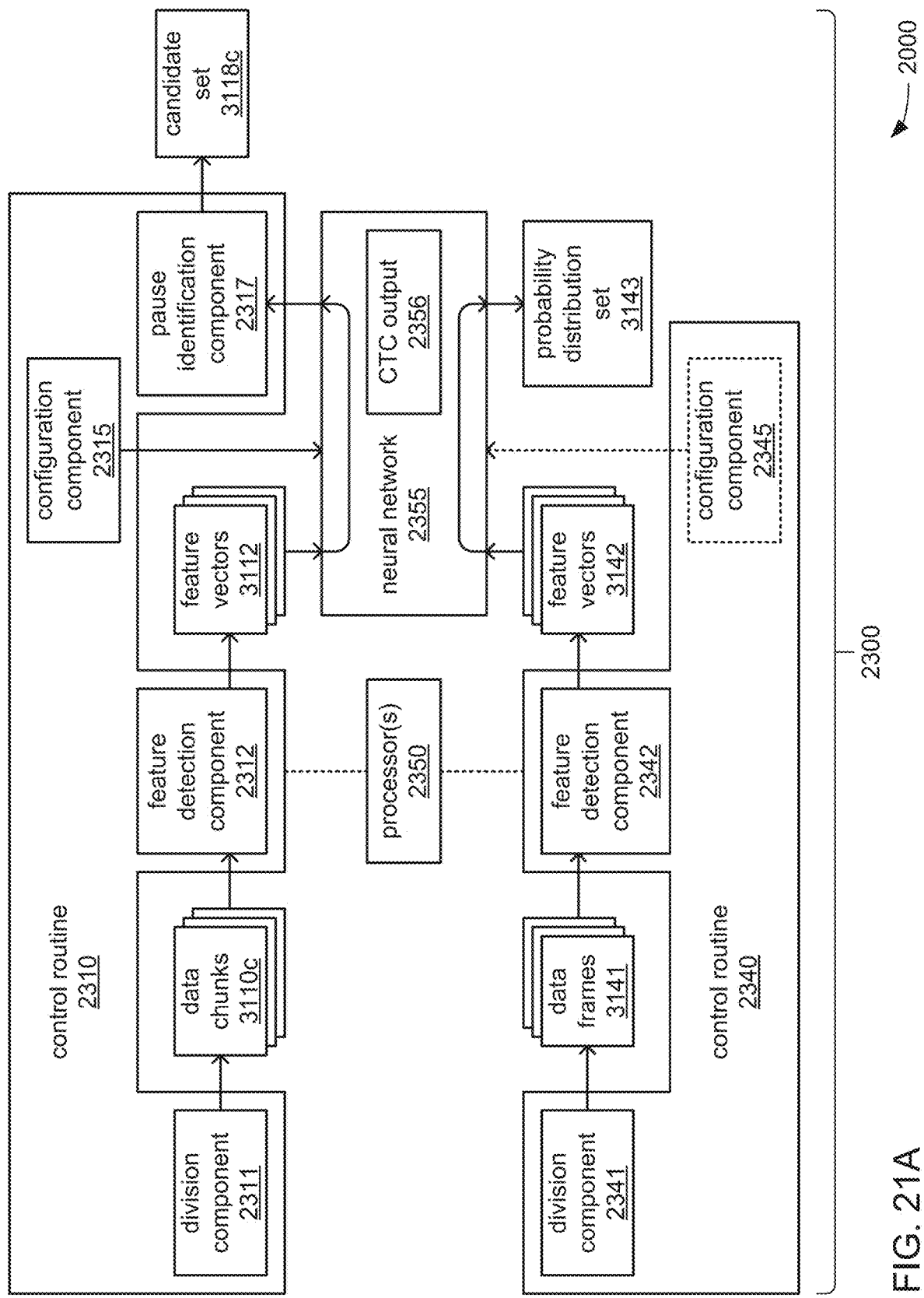
FIGS. 21A, 21B and 21C each illustrate examples of additional enhancements to the speech-to-text processing operations of FIGS. 19A-D and 20A-E.
Figure 21B:
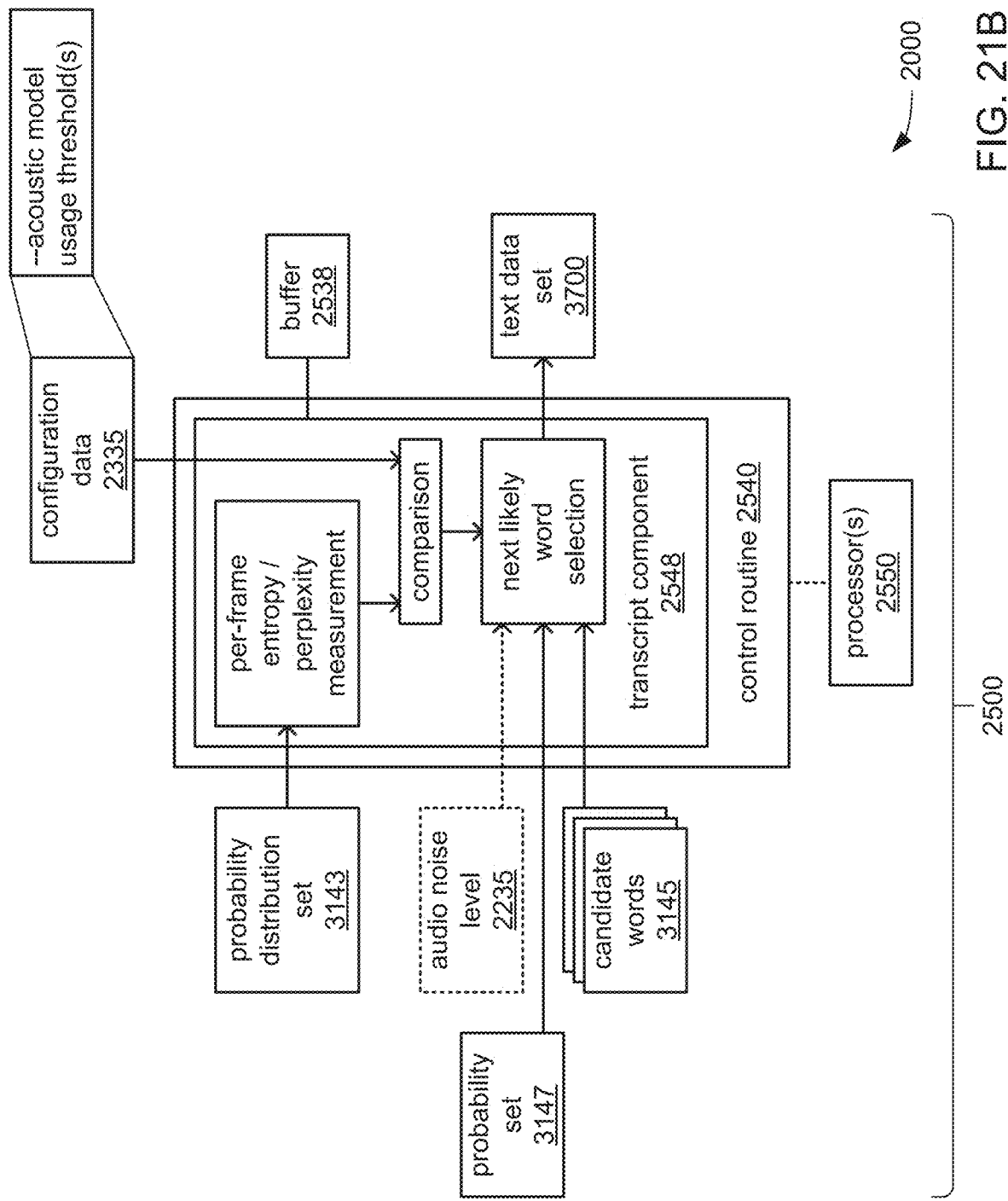
Figure 21C:
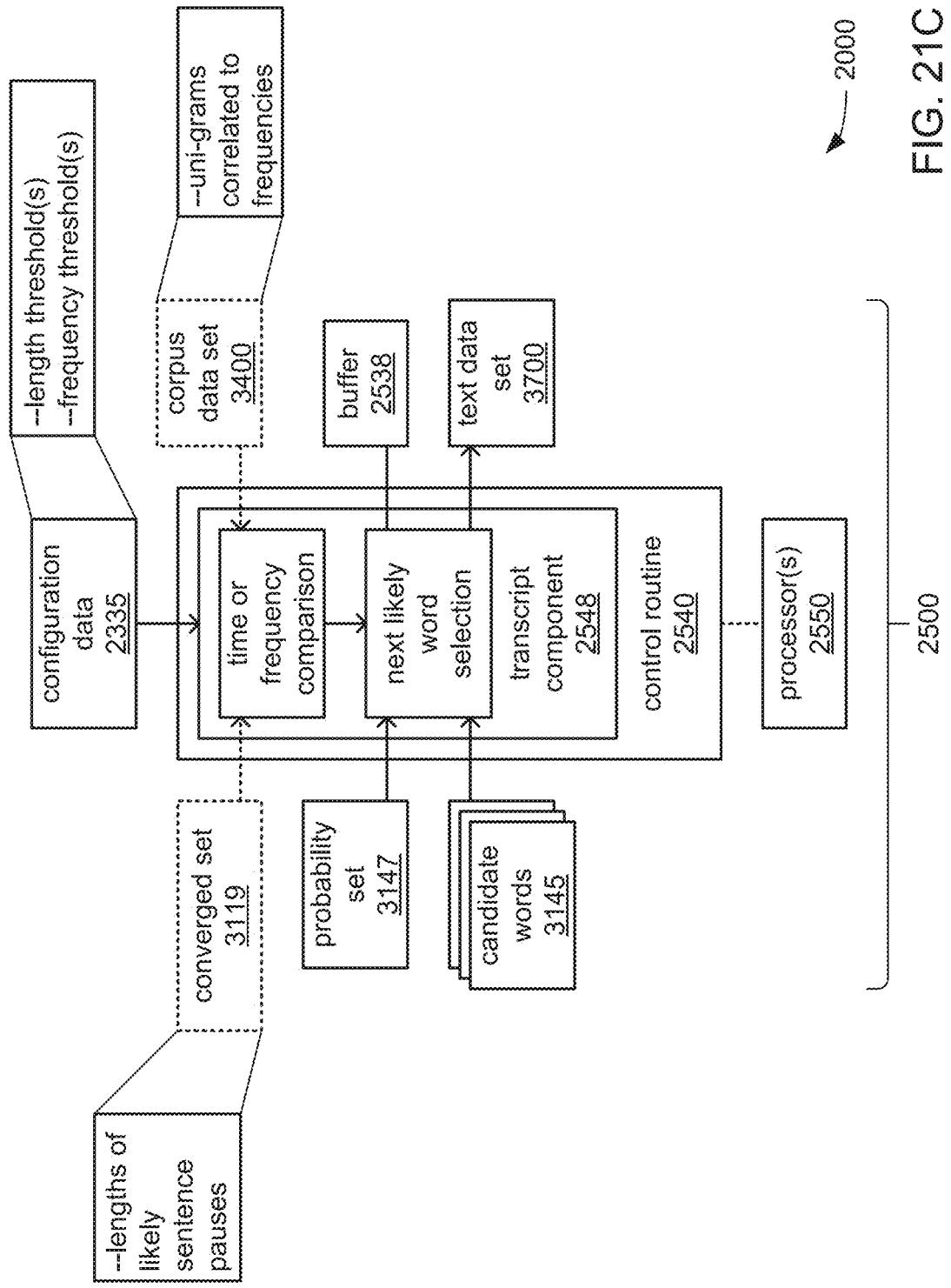

FIGS. 21A, 21B and 21C illustrate examples of additional improvements that may be incorporated to the performance of various ones of the speech-to-text operations described above. FIG. 21A illustrates aspects of using the same acoustic model in the aforedescribed CTC segmentation technique and in the aforedescribed initial speech-to-text processing operations. FIG. 21B illustrates aspects of the addition of dynamic per-word assignment of relative weighting to the use of an acoustic model or a language model in identifying spoken words. FIG. 21C illustrates aspects of selective concatenation of segments of audio speech to effect the formation of longer transcripts to improve the results of subsequent post-processing text analysis operations.

Turning to FIG. 21A, as previously discussed, due to the use of an acoustic model in the aforedescribed CTC segmentation technique of FIGS. 17A-B, and due to use of an acoustic model in the aforedescribed initial speech-to-text processing operations of FIGS. 19A-D, it may be that, in some embodiments, the very same acoustic model is used in both of these pre-processing and speech-to-text processing operations. In such embodiments, and where the processing system 2000 includes multiple node devices 2300 in which the single acoustic model may be used to perform of those functions, it may be that the single acoustic model is instantiated within those multiple node devices 2300 in preparation for the performing the CTC segmentation technique, and then allowed to remain instantiated so as to already be in place within the storage of those multiple node devices 2300 for subsequent use in the aforedescribed initial speech-to-text processing operations. In this way, advantage may be taken of an opportunity to avoid the consumption of time, network resources and/or processing resources to instantiate the same acoustic model, twice.

Thus, by way of example, and as specifically depicted in FIG. 21A, in such embodiments where the acoustic model may be implemented using the hardware-based neural network 2355 incorporated into each of such node devices 2300, it may be that execution of the configuration component 2315 (as described earlier in connection with FIG. 17A) to cause configuration of the neural network 2355 to implement the acoustic model enables the avoidance of subsequent execution of the configuration component 2345 (as described earlier in connection with FIG. 19A) to do so, again.

Turning to FIG. 21B, as previously discussed, it has become commonplace to employ a two-stage combination of an acoustic model and a language model in which the acoustic model is typically relied upon to perform a first pass at identifying words that are likely to be the ones that were spoken, and the language model is typically relied upon to perform the next and final pass by refining the identification of such spoken words such that the words identified by the language model are the ones from which a transcript is generated. However, and as also previously discussed, the reduced error rate achieved by such a two-stage combination is still widely seen as being too high. Again, a possible reason for being still too high is that a good language model tends to resist identifying words that are actually spoken where those spoken words include mistakes in vocabulary and/or syntax.

To improve upon the error rate of such a typical two-stage use of a combination of an acoustic model and a language model, in some embodiments, the transcript component 2548 may incorporate additional functionality to dynamically vary the relative weighting assigned to each of the acoustic model and the language model for each word to be identified based on the degree of uncertainty in the per-grapheme probability distributions output by the acoustic model for each word. Thus, in addition to being provided with the probability set 3147 and corresponding candidate words 3145 associated with a segment of speech audio as inputs, the transcript component 2548 may additionally receive the corresponding probability distribution set 3143 that includes the corresponding probability distributions for graphemes associated with the same segment of speech audio.

In executing the transcript component 2548, core(s) 2551 of processor(s) 2550 of the control device 2500 may be caused to use the probability distributions of graphemes that are output by the acoustic model for the pronunciation of a single word spoken within the segment to derive a measure of the degree of uncertainty for each of those probability distributions. Such a degree of uncertainty may be based on degree of a perplexity, degree of entropy, or other statistical measures of those probability distributions. Again, such a degree of uncertainty may serve as an indication of the degree to which a probability distribution for a grapheme presents an indefinite indication of which speech sound was uttered during a corresponding portion of the segment of speech audio.

A probability distribution for graphemes that provides an uncertain indication of what speech sound was uttered may be one in which the degree of probability for the grapheme indicated as being the most probable is not significantly higher than the degree of probability for the grapheme indicated as being the second most probable. More specifically, where the difference between these two degrees of probability is less than a pre-determined threshold difference in probabilities, the probability distribution may be deemed to provide an indication that the second most probable grapheme is almost as likely to describe a speech sound that was uttered as the speech sound described by the most probable grapheme such that it is deemed to be uncertain as to which of these two speech sounds is the one that was uttered.

In this way, the probability distribution may be said to provide an ambiguous indication of what speech sound was uttered. In some embodiments, the degree of uncertainty used to control which model is to be relied upon to identify a single word may be derived from measures of such a difference in probabilities associated with the most probable grapheme and the second most probable grapheme within each probability distribution associated with the single word. These differences in probabilities may be averaged or otherwise aggregated to derive a single value indicative of the degree of uncertainty, which may then be compared to a threshold degree of uncertainty specified in the configuration data 2335. Where the degree of uncertainty is less than the threshold, greater weight may be assigned to the identification of the single word using the acoustic model, and where the degree of uncertainty is greater than the threshold, greater weight may be assigned to the identification of the single word using the language model.

In other embodiments, the degree of uncertainty used to control which model is to be relied upon to identify a single word may be derived as an aggregate degree of perplexity or entropy. Stated differently, the degree of uncertainty may be based on calculations of the degree of entropy or degree of perplexity (which may be derived from a degree of entropy) of each probability distribution associated with the single word may be calculated and aggregated to derive a degree of uncertainty. In such embodiments, the aggregated degree of uncertainty may be compared to a threshold degree of uncertainty specified in the configuration data 2335. Again, where the degree of uncertainty is less than the threshold, greater weight may be assigned to the identification of the single word using the acoustic model, and where the degree of uncertainty is greater than the threshold, greater weight may be assigned to the identification of the single word using the language model.

As previously discussed, in some embodiments, both of the acoustic model and the language model may always be utilized in combination for each spoken word, regardless of whether the dynamic per-word determination is made to give greater weight to relying more on the acoustic model or the language model to identify a word. Thus, the beam searches associated with the execution of the beam search component 2347 to use the language model (where the language model is based on an n-gram corpus) may always be performed regardless of such dynamic per-word assignment of relative weighting. This may be the case where an output of the language model is employed as an input to the dynamic per-word relative weighting assigned to the acoustic and language models in addition to degree of uncertainty for the probability distributions for the corresponding graphemes.

Alternatively, in other embodiments, it may be that the language model is not used to provide any input to the dynamic per-word relative weighting. In such other embodiments, such a situation may provide the opportunity to entirely refrain from consuming processing and or storage resources to perform beam searches associated with using the language model to identify a particular word if the results of the dynamic per-word relative weighting are such that the identification of the word that would be provided by the language model will not be used. In this way, use of the language model may be made contingent on such dynamic per-word relative weighting.

As will be familiar to those skilled in the art, speech recognition in the human brain involves using a combination of detecting and recognizing speech sounds as received by the ears, and recognizing portions of language based on language rules. It has been observed that, where speech sounds are able to be clearly heard, speech recognition in the human brain tends to rely more heavily on those sounds to determine what was said. However, such reliance on speech sounds as received by the human ears may become insufficient where acoustic conditions are such that some speech sounds are masked enough to not be heard such that there are noticeable gaps in the speech sounds as received. It has been observed that, where at least some speech sounds are less clearly heard, speech recognition in the human brain tends to rely more heavily on language rules to determine what was said, thereby effectively "filling in the gaps" among the speech sounds that were able to be heard. To put this more simply, it has been observed that the human brain will take advantage of opportunities to not expend the resources needed to use language rules for such purposes when it is not necessary.

The use of degrees of uncertainty to select between the acoustic and language models in identifying each word, as just described, effectively achieves a similar result. Where acoustic conditions are sufficiently good as to enable spoken words to be captured clearly, the probability distributions output by the acoustic model are more likely to demonstrate greater certainty in being able to identify words through use of the acoustic model, alone. However, where acoustic conditions are sufficiently poor as to degrade the ability to capture spoken words clearly, the probability distributions output by the acoustic model are more likely to demonstrate greater uncertainty in being able to identify words through use of the acoustic model alone, thereby inviting the use of the language model to identify words. Thus, such an evaluation of at least the degree of uncertainty of the probability distributions output by the acoustic model provide an indirect path for taking acoustic conditions into account in dynamically determining how each spoken word is ultimately identified.

However, as also depicted in FIG. 21B, alternative embodiments are possible in which the acoustic conditions under which speech sounds are captured may be more directly taken into account. Specifically, it may be that the indications of audio noise level 2235 that are determined and stored as part of performing the APA segmentation technique (as described earlier in connection with FIG. 16A) may be used as another input to the transcript component 2548 in determining whether to use the acoustic model or the language model in selecting each word for inclusion in a transcript. By way of example, while it may be that the degree of uncertainty demonstrated in the probability distributions from the acoustic model may be a primary factor in making such selections, an indication in the audio noise level 2235 of there being audio noise at a level exceeding a pre-determined upper limit may trigger the use of the language model, regardless of the degree of uncertainty demonstrated in the probability distributions from the acoustic model.

Turning to FIG. 21C, from experimentation and observation, it has been found that, generally, many forms of automated text analyses are able to be more successfully used with longer transcripts. Again, it has been found that shorter transcripts tend to cause an overemphasis on words with greater frequencies of use in a language, with the result that analyses to derive topics and/or other insights concerning the text of a transcript tend to produce less useful results.

As an approach to counteracting this effect, in some embodiments, all of the text derived from a single piece of speech audio may be maintained and treated (at least for purposes of performing text analyses) as a single transcript. More specifically, the text generated from speech-to-text processing of a single speech data set 3100 may be organized within the text data set 3700 as a single transcript.

However, as also previously discussed, a single transcript encompassing speech audio that is especially long and/or that includes multiple conversations and/or verbal presentations may also beget less useful results when text analyses are performed thereon.

Thus, in some embodiments, rules concerning lengths of transcripts, frequencies of words, and/or acoustic features such as relatively lengthy pauses may be used to bring about the generation of lengths and/or quantities of transcripts for each piece of speech audio that are more amenable to providing useful results from automated text analyses. More specifically, a set of such rules may be used to cause the selective concatenation of the text of consecutive sets of segments of speech audio stored as a single speech data set 3100 to form multiple transcripts that may be stored together as a set of transcripts within a single corresponding text data set 3700 (or as a set of transcripts that are each stored as a separate text data set 3700). Such a text data set 3700 (or such a multitude of text data sets 3700) may include indications of the relative temporal order of the multiple transcripts to preserve at least that contextual aspect.

Indications of such rules and/or thresholds therefore may be maintained as part of the configuration data 2335. Among such thresholds may be a minimum and/or maximum threshold for the size of a transcript, which may be expressed in terms of quantities of words and/or lengths of time periods. In some of such embodiments, it may be that text associated with segments of speech audio may be automatically combined to form transcripts that have a length that meets such word count and/or time thresholds.

Alternatively or additionally, the configuration data 2335 may specify a minimum threshold quantity of words in a transcript that are required to have a frequency of occurrence in a language that falls below a specified maximum threshold. In some of such embodiments, it may be that text associated with segments of speech audio may be combined to form transcripts in which the combination of words includes such a requisite quantity of such lower frequency words. In so doing, the storage, within a corpus data set 3400, of uni-grams that are each correlated to an indication of frequency of use may be relied upon as a source of such indications of frequency.

Also alternatively or additionally, the configuration data 2335 may specify a minimum threshold length of time for a pause between speech sounds that may be greater than the minimum threshold length for a likely sentence pause such that it may be deemed a likely pause between conversations and/or verbal presentations where a change of subject may be more likely to occur. In some of such embodiments, occurrences of such longer pauses may be used as breakpoints at which text may be divided to define multiple transcripts. There may still be an enforcement of minimum and/or maximum thresholds as a default to address situations in which too few or too many of such longer pauses are found to occur.

Figure 22A:
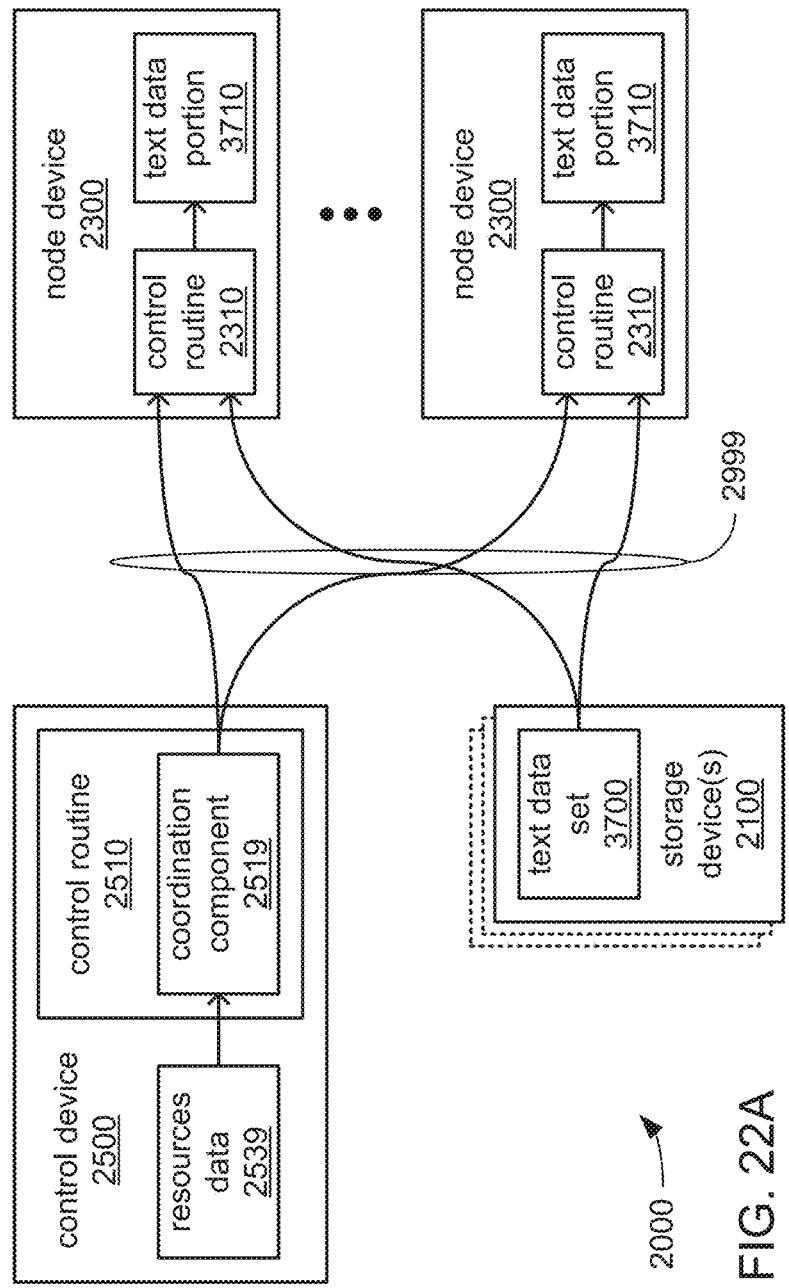
Figure 22B:
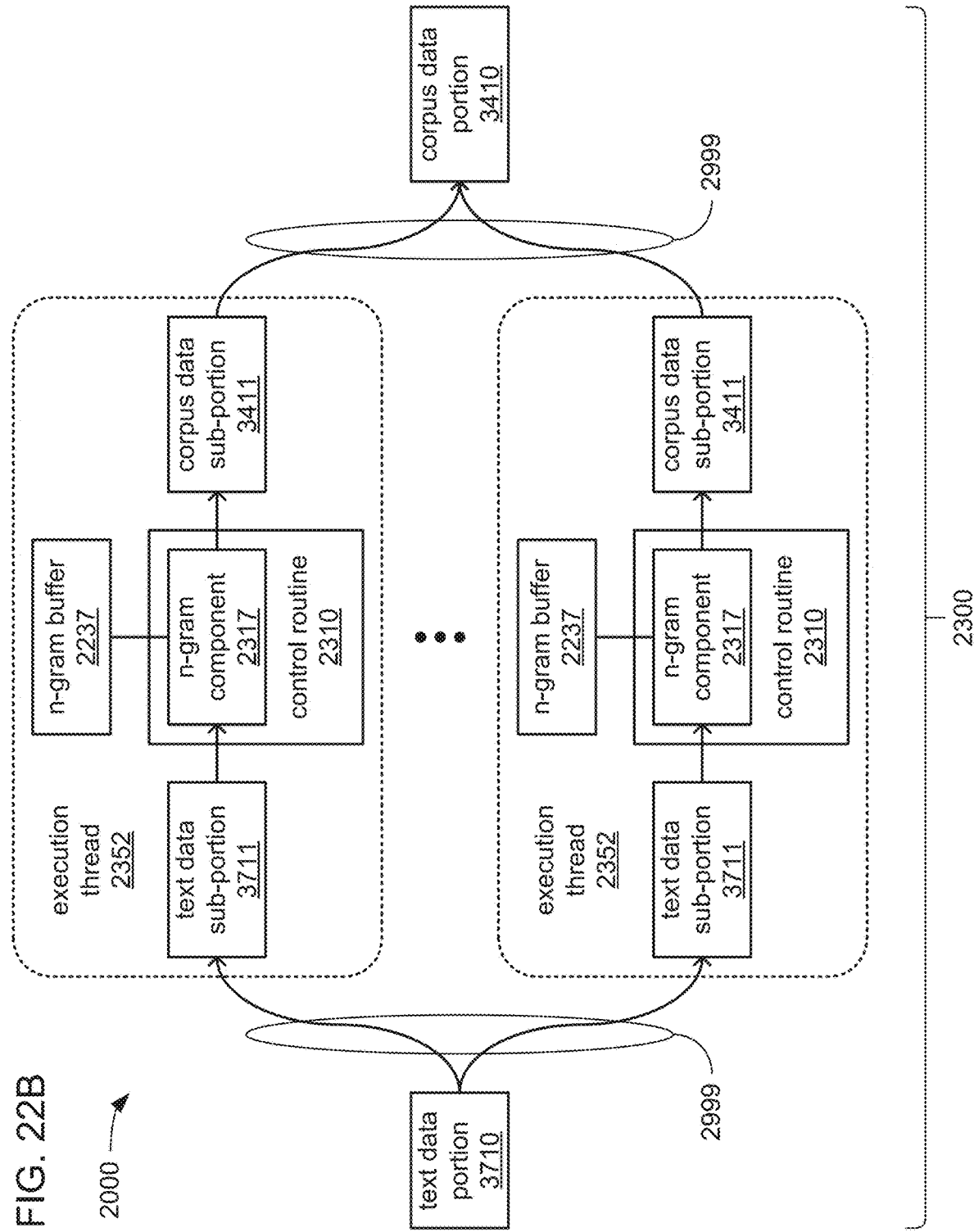

FIGS. 22A, 22B, 22C, 22D, 22E, 22F and 22G, taken together, illustrate, in greater detail, aspects of the generation and/or augmentation of an n-gram corpus implementing an n-gram language model. More specifically, FIGS. 22A-F present, in greater detail, aspects of the generation and/or augmentation of a corpus data set 3400 based on the contents of a text data set 3700. FIG. 22A illustrates aspects of the distribution of portions of a selected text data set 3700 among multiple node devices 2300 in preparation for the generation of n-grams therefrom. FIG. 22B illustrates aspects of the generation of a portion of an n-gram corpus from each of the portions of the selected text data set 3700.

Figure 22C:
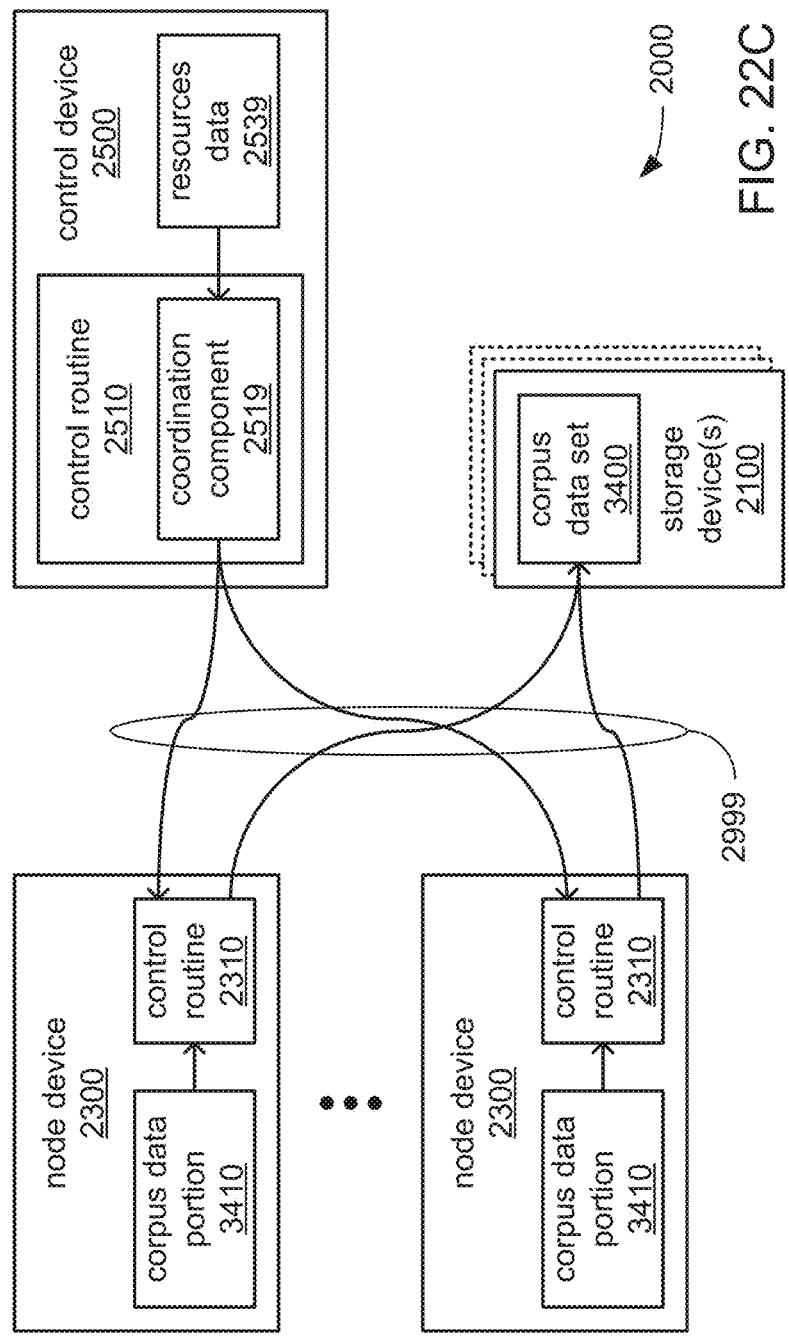
Figure 22D:
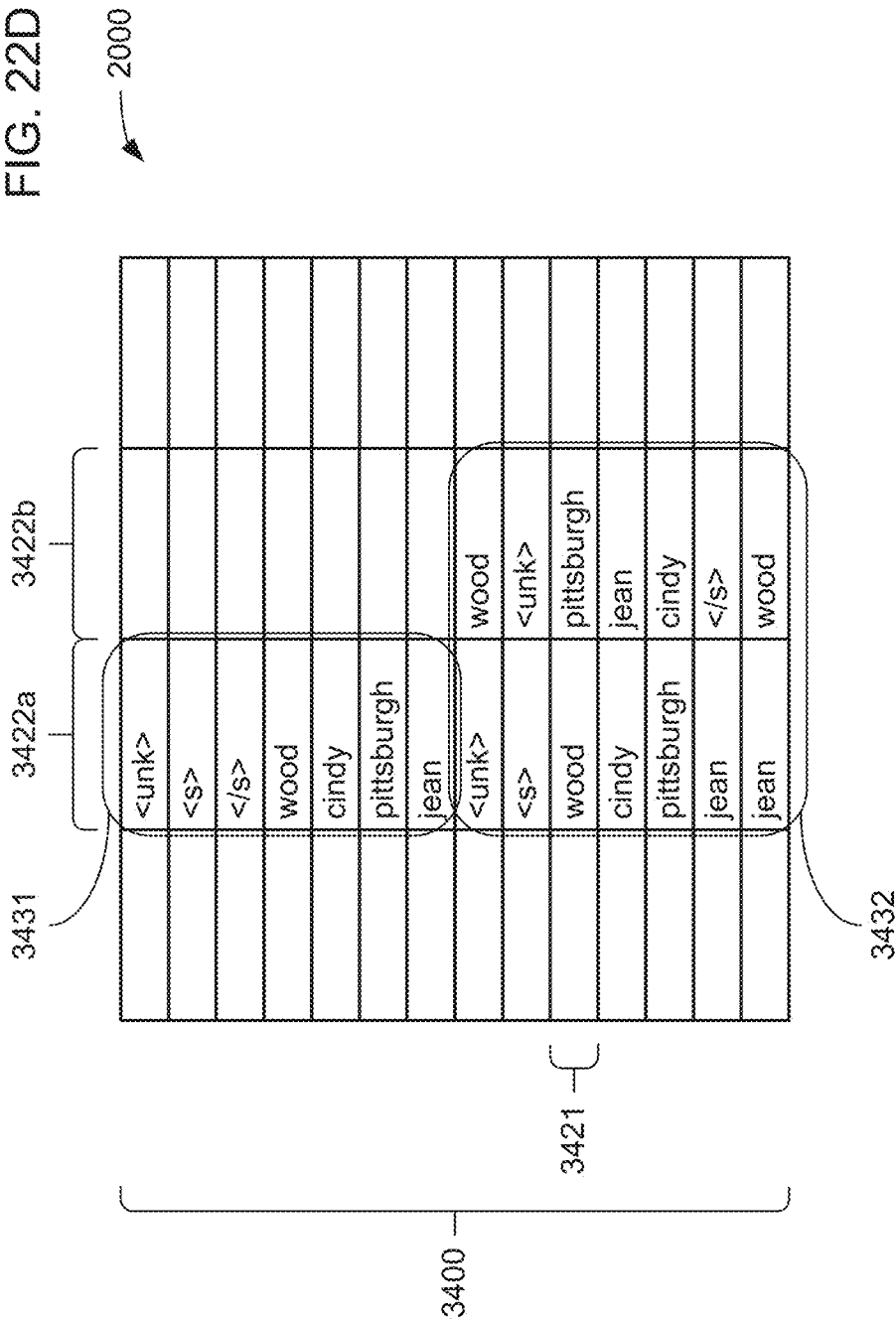
Figure 22E:
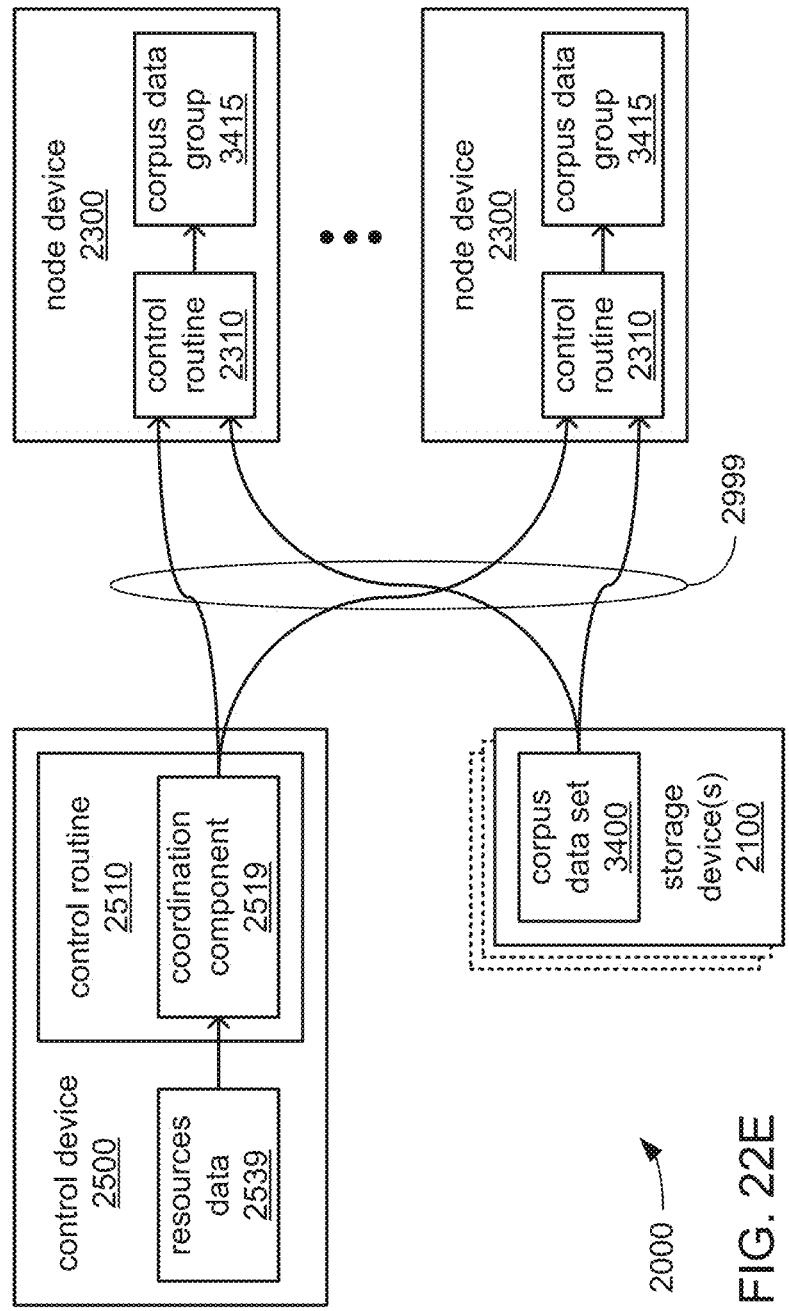

FIGS. 22C-D illustrate aspects of the collection and combining of the generated portions of n-gram corpus to either form an entirely new corpus data set 3400, or augment an existing corpus data set 3400. FIG. 22E illustrates aspects of the distribution of portions of the new or augmented corpus data set 3400 among multiple node devices 2300 in preparation for the deduplication of n-grams therein. FIGS. 22F-G illustrate aspects of the collection and re-combining of the deduplicated portions of the corpus data set 3400, and the calculation and/or re-calculation of relative frequencies and/or probabilities of occurrence of each of the n-grams therein.

Turning to FIG. 22A, within the control device 2500, execution of the control routine 2510 may cause processor(s) 2550 thereof to select particular ones of the node devices 2300 for use in performing operations to generate or augment an n-gram corpus from a selected text data set 3700. The text data set 3700 may have been previously generated as a transcript from speech audio, and/or the text data set 3700 may have been generated from any of a variety of other sources.

Following the selection of node devices 2300, in executing a coordination component 2519 of the control routine 2510, processor(s) 2550 of the control device 2500 may be caused to cooperate with processors 2350 of the node devices 2300 to coordinate communications through the network 2999 to cause the provision of a different portion 3710 of the text data set 3700 to each of the selected node devices 2300. In this way the selected node devices 2300 are prepared for use in generating n-grams from the selected text data set 3700 in a distributed manner.

Turning to FIG. 22B, in some embodiments, the processor(s) 2350 of one or more of the selected node devices 2300 may be capable of supporting multiple execution threads 2352 by which multiple different executable routines and/or multiple instances of an executable routine may be executed at least partially in parallel. Within each of such selected node devices 2300, the received text data portion 3710 may be divided into multiple text data sub-portions 3711 that are distributed among multiple execution threads 2352 therein. Within each such execution thread 2352, execution of an n-gram component 2317 of an instance of the control routine 2310 may cause a core of a processor 2350 to parse through the text within the corresponding text data sub-portion 3711 to generate n-grams therefrom.

In so doing, within each execution thread 2352, it may be that an n-gram buffer 2237 is instantiated to temporarily assemble and store sets of the generated n-grams until the n-gram buffer 2237 has been filled to at least a predetermined degree, whereupon the contents of the n-gram buffer 2237 may be added to a corresponding corpus data sub-portion 3411. In some embodiments, the n-gram buffer 2237 may be implemented as a hash map in which a two-dimensional (2D) array is defined wherein each row thereof is to store an n-gram generated from the corresponding text-data sub-portion 3711, along with a count of instances of that n-gram that have been generated. As each n-gram is generated from the text of the text data sub-portion 3711, a hash value may be taken of that n-gram, and that hash value may become the index value used to specify which row within the n-gram buffer 2237 is the row in which that n-gram is to be stored, and in which the count for that n-gram is to be incremented to reflect the generation of an instance thereof. Each time the contents of the n-gram buffer 2237 are added to the corresponding corpus data sub-portion 3411, the counts for all of the rows therein may be reset to indicate a quantity of 0 instances.

Such use of an n-gram buffer 2237 implemented as such a hash map may aid in reducing data storage requirements for each execution thread 2352 and/or for each corpus data sub-portion by enabling some degree of deduplication of n-grams to be performed. More specifically, such use of hash values as index values for rows within such an implementation of a hash table enables multiple instances of the same n-gram to be relatively quickly and efficiently identified so that just a single row of storage space within the n-gram buffer 2237 is occupied for those multiple instances, instead of allowing each of those instances to occupy a separate storage location within a data structure, even temporarily.

Such use of distributed processing across multiple node devices 2300 and/or across multiple execution threads 2352 within each node device 2300, and such use of hash maps in performing at least an initial deduplication of n-grams, may serve to enable relatively large n-gram corpuses to be generated and used in the performance of speech-to-text processing. As a result, supporting a larger than commonplace n-gram corpus that includes larger n-grams that include relatively large quantities of words (e.g., greater than the more commonplace quantities of 5 words or less) becomes practical. Alternatively or additionally, supporting a larger than commonplace n-gram corpus that includes highly infrequently used n-grams (e.g., n-grams that include names of specific people and/or places such that they may be found in just one of thousands of text documents) also becomes practical. As those skilled in the art will readily recognize, it is commonplace practice to allow only n-grams that occur in texts with a frequency above a predetermined minimum threshold frequency to be included in an n-gram corpus in an effort to limit the overall size thereof. The ability to support a larger n-gram corpus may render such a restriction unnecessary, thereby increasing the accuracy that is able to be achieved in performing to speech-to-text processing.

Within each of the selected node devices 2300, following the use of the entirety of the text data sub-portion 3711 in generating n-grams, the multiple execution threads 2352 may be caused to cooperate to assemble the multiple corpus data sub-portions 3411 therein to form a single corresponding corpus data portion 3410.

Turning to FIG. 22C, within the control device 2500, further execution of the coordination component 2519 may cause processor(s) 2550 of the control device 2500 to cooperate with processors 2350 of the node devices 2300 to coordinate communications through the network 2999 to cause the corpus data portions 3410 generated within each of the selected node devices to be provided to the one or more storage devices 2100. In so doing, the multiple corpus data portions 3410 may be combined to form a new corpus data set 3400, or may be combined and added to an existing corpus data set 3400.

Turning to FIG. 22D, as depicted, each of the corpus data sets 3400 stored within the one or more storage devices 2100 may employ a 2D array data structure of rows 3421 and columns 3422. As also depicted, while each n-gram may occupy a single row 3421, each word within an n-gram occupies a separate column 3422 such that the number of columns occupied by each n-gram is based on the quantity of words that it includes. It should be noted that FIG. 22D depicts a deliberately highly simplified example of a very small n-gram corpus that includes relatively few uni-grams 3431 and relatively few bi-grams 3432. As depicted, the single word within each of the uni-grams 3431 occupies just column 3422a, while the pair of words within each of the bi-grams 3432 occupies both columns 3422a and 3422b.

As will be familiar to those skilled in the art, the currently widely used standard format for organizing n-gram corpuses to implement a language model is the "ARPA" text format originally introduced by Doug B. Paul of the Massachusetts Institute of Technology. The ARPA format is generally implemented as an ASCII text file in which each n-gram is stored within a separate line of text separated by carriage returns. Although this format is widely accepted, it suffers various disadvantages, including slower access due to requiring a text parser to interpret the contents of each line (not all of which include n-grams). Another limitation of the ARPA format is the imposition of a requirement that all n-grams having the same quantity of words must be grouped together, and must be provided with a textual label indicating the quantity of words therein.

In contrast, the 2D array format depicted in FIG. 22D does not require a text parser for such purposes as it relies on the row-column organization of the array structure to enable speedier addressability and access to each word of n-gram. Also, as depicted, there may be no need to group the uni-grams 3431 together and separately from the bi-grams 3432, or to provide distinct labels or other form of identification for each group. Instead, it may simply be the quantity of columns 3422 occupied by each n-gram that determines the quantity of words therein. Again, the single word of each uni-gram 3431 occupies the single column 3422a, while the pair of words of each bi-gram 3432 occupies the pair of columns 3422a and 3422b, and so on. However, it should be noted that such a 2D array format enables relatively easy importation of the n-grams and related information from the ASCII text file structure of the ARPA format. Specifically, a text parser may be used just once to parse such a text file structure to identify n-grams and related information with which to fill the rows of the 2D array format.

As a result of using such a 2D array format, the combining of the corpus data portions 3410 to form a new corpus data set 3400, or to add to an existing corpus data set 3400, becomes a relatively simple matter of combining rows 3421. In this way, the need for a text parser, as well as text file editing functionality, is eliminated.

Turning to FIG. 22E, following such combining of rows 3421 as part of combining corpus data portions 3410 containing newly generated n-grams, as just discussed, processor(s) 2550 of the control device 2500 may be caused to cooperate with the one or more storage devices 2100 to re-distribute the newly formed or newly augmented corpus data set 3400 among multiple node devices 2300 in preparation for being refined. More specifically, although the newly formed or newly augmented corpus data set 3400 may contain a relatively large quantity of newly generated n-grams, there may remain duplications of n-grams therein, at least as a result of having been generated in a distributed manner across multiple node devices 2300. Also, to fully enable the use of the corpus data set 3400 as a language model, relative frequencies and/or probabilities of occurrence for each n-gram must be calculated, or re-calculated.

Unlike the relatively simple division of the text data set 3700 into text data portions 3710 earlier discussed in reference to FIG. 22A, in FIG. 22E, the rows 3421 of n-grams within the corpus data set 3400 may be reorganized into groups based on hash values taken of each n-gram. More precisely, a hash value may be taken of each n-gram, and then the n-grams may be reorganized within the corpus data set 3400 based on an ascending or descending order of their hash values. This advantageously has the result of causing the rows 3421 of duplicate n-grams to become adjacent rows 3421. With the rows 3421 of n-grams so reorganized, sub-ranges of hash values within the full range of hash values may be derived as a mechanism for dividing the corpus data set 3400 into multiple corpus data groups 3415 that contain relatively similar quantities of rows 3421 for distribution among the multiple node devices 2300. In this way, each set of adjacent rows 3421 of duplicate n-gram is kept together and provided together to a single node device 2300 for deduplication.

As previously discussed, in some embodiments, it may be that processor(s) of the one or more storage devices 2100 are capable of performing at least a limited range of processing operations needed to maintain local and/or distributed file systems as part of storing data sets of widely varying sizes within either a single storage device 2100 or across multiple storage devices 2100. In such embodiments, the processor(s) of the one or more storage devices 2100 may be capable of performing at least a limited range of data reorganization functions, including the grouping of rows within array-type data structures based on a variety of organizing criteria, including hash values. Thus, in such embodiments, it may be that processor(s) 2550 of the control device are caused, by execution of the coordinating component 2519, to transmit a command to the one or more storage devices 2100 to cause such a reorganization of the rows 3421 within the corpus data set 3400, prior to the division of the corpus data set 3400 into the multiple corpus data groups 3415 by sub-ranges of those very same hash values.

Turning to FIG. 22F, within each of the multiple node devices 2300, execution of a compacting component 2318 may cause processor(s) 2350 thereof to iterate through the rows 3421 of n-grams within its corresponding corpus data group 3415 to identify instances of two or more rows 3421 containing duplicate n-grams. For each such instance of duplicate n-grams, the two or more rows 3421 containing duplicates of an n-gram may be reduced to a single row 3421 containing just a single copy of that n-gram, and an indication of at least the quantity of duplicates identified may be stored within the single row 3421.

As such deduplication of n-grams within each corpus data group 3415 is completed, the corpus data groups 3415 may be provided to the control device 2500, where they may be re-combined to recreate the corpus data set 3400. In so doing, execution of a probability component 2511 of the control routine 2510 may cause processor(s) 2550 of the control device 2500 to calculate values for the frequency and/or probability of occurrence for each n-gram, and to augment each row 3421 with those value(s). More specifically, and as depicted in FIG. 22G, one or more columns 3422 that were previously unoccupied across all of the rows 3421 may be caused to store such frequency and/or probability values.

Returning to FIG. 22F, as will be familiar to those skilled the art, there may arise situations in which the n-grams within the corpus data set 3400 do not cover all possible combinations of the words that are present within the corpus data set 3400. This may result in a default assignment of a zero probability value to such combinations of words as if such combinations could never occur, and this may adversely affect the accuracy of the resulting language mode in speech-to-text operations.

To at least mitigate this adverse affect, the processor(s) 2550 of the control device 2500 may be caused to provide one of a variety of types of "smoothing" of values indicative of probability of occurrence for at least a subset of the n-grams within the corpus data set 3400. More specifically, for at least some n-grams with a higher probability of occurring, their probability values may be reduced by a relatively small degree (thereby indicating a slightly reduced probability of occurring), and the probability value assigned for the occurrence of n-grams not included within the corpus data set 3400 may be increased to a non-zero value.

Among the widely accepted techniques for smoothing are various "backoff" calculations that may be used to derive a backoff value by which the probability values of at least a subset of the n-grams may be multiplied to reduce those values by a relatively small degree. As those skilled in the art will readily recognize, one widely used technique for calculating the backoff value is the Katz back-off model introduced by Slava M. Katz, but this technique becomes less effective as the size of the n-gram corpus increases. Another widely known technique is the "Stupid Backoff" introduced by Google, Inc. in 2007, but this technique is based on the use of a fixed value which, despite being capable of at least somewhat better results than the Katz back-off model, can also yield increasingly less effective results as the size of the n-gram corpus increases.

To better handle the potentially larger than commonplace size of the n-gram corpus within the corpus data set 3400, the probability component 2511 may employ an entirely new calculation:

$$\text{Backoff}(n) = \frac{|\text{Set}(n \text{ gram})|}{|\text{Set}(n-1 \text{ gram})|}$$

In this new calculation, the backoff value for an n-gram corpus of up to n words per n-gram may be derived by dividing the quantity of n-grams that include n words by the quantity of n-grams that include n−1 words. This backoff value is able to be quickly and simply calculated once, and then the values for the probability of occurrence of all of the n-grams may be multiplied by this backoff value. Since this backoff value is calculated based on the n-grams actually present within the corpus data set 3400, instead of being based on an arbitrary fixed value, the resulting n-gram perplexity is not rendered artificially smaller than it should be, thereby enabling better accuracy in the use of the corpus data set 3400 as a language model for speech-to-text processing operations.

FIGS. 23A, 23B, 23C, 23D and 23E, together, illustrate an example embodiment of a logic flow 4100. The logic flow 4100 may be representative of some or all of the operations executed by one or more embodiments described herein. More specifically, the logic flow 4100 may illustrate operations performed by core(s) 2351 and/or 2551 of the processor(s) 2350 and/or 2550 of the node devices 2300 and/or of the control device 2500, respectively, in executing various ones of the control routines 2310, 2340, 2510 and 2540.

Figure 23A:
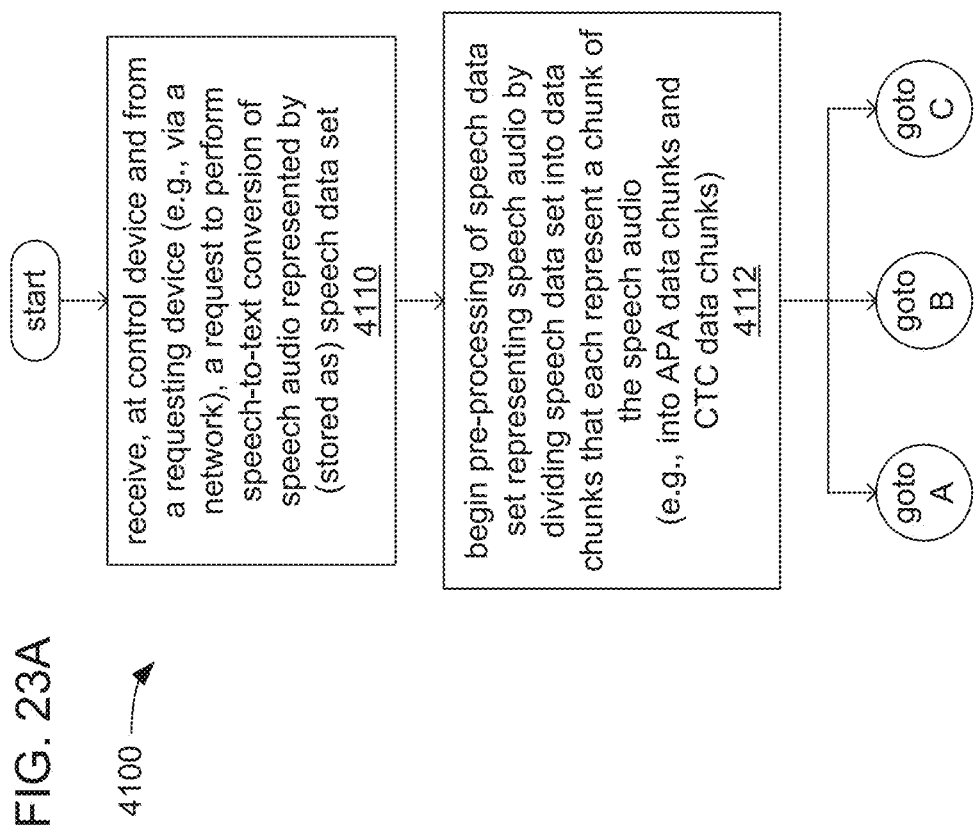

Starting at FIG. 23A, at 4110, processor(s) of a control device of a processing system (e.g., the processor(s) 2550 of the control device 2500 of the processing system 2000 of either of FIG. 13A or 13B) may receive a request from a requesting device via a network (e.g., the requesting device 2700 via the network 2999) to perform speech-to-text conversion of speech audio represented by a specified speech data set (e.g., one of the speech data sets 3100).

At 4112, pre-processing of the speech audio represented by the specified speech data set may begin with either a processor of the control device or processor(s) of one or more node devices of the processing system (e.g., one or more of the node devices 2300) dividing the speech data set into data chunks that each represent a chunk of the speech audio. As has been discussed, the pre-processing may entail the performances of multiple segmentation techniques (e.g., the combination of at least the APA segmentation technique of FIGS. 16A-C, and the CTC segmentation technique of FIGS. 17A-B) at least partially in parallel. As also discussed, where the processing system does include multiple node devices (e.g., the multiple node devices 2300), it may be that each segmentation technique is assigned to be performed by a different one of the node devices. Alternatively, where the processing system does not so include such a multitude of node devices, it may be that each segmentation technique is assigned to be performed by a different core and/or a different processor of the control device.

It should again be noted that the chunks of the speech audio used by different ones of the segmentation techniques may not be of the same size, or more precisely, may not represent chunks of the speech audio that are of the same length (e.g., as previously discussed, the chunks of speech audio generated for the APA segmentation technique may be shorter than those generated for the CTC segmentation technique). Therefore, it may be that multiple different sets of chunks of the speech audio are generated at 4112. More precisely, where each segmentation technique is assigned to a different node device or to a different thread of execution, it may be that the division of the speech audio into chunks is among the operations that are also so assigned such that separate node devices or separate cores are used to separately generate chunks of speech audio that are of appropriate length for their corresponding one of the segmentation techniques.

Figure 23B:
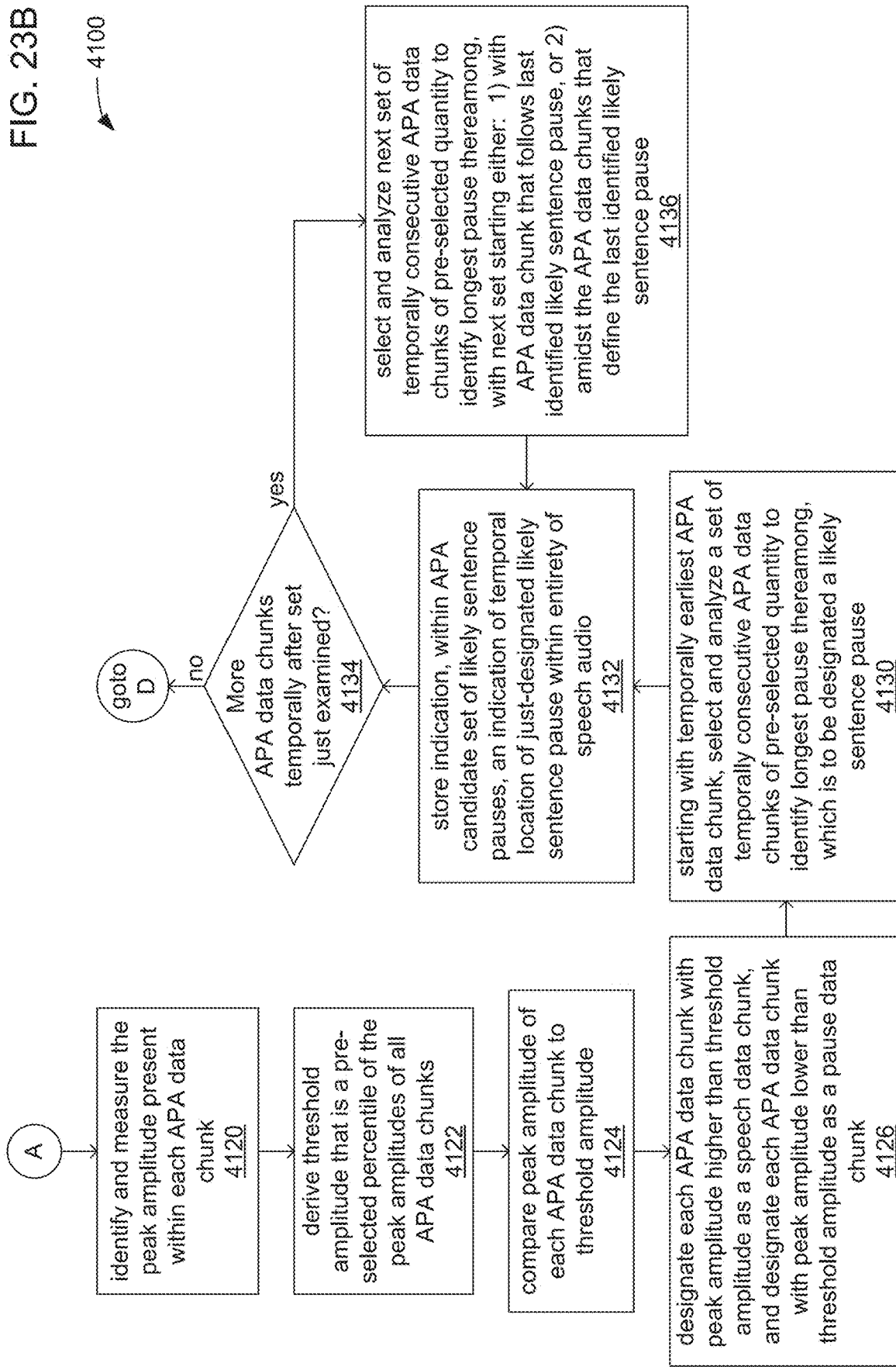
Figure 23C:
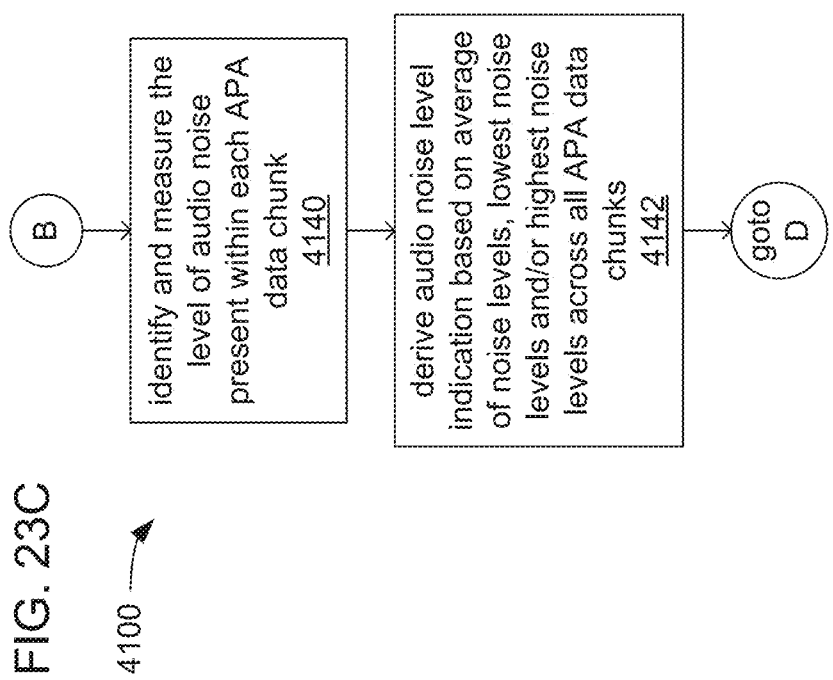

Regardless of the exact manner in which chunks of speech audio are generated at 4112, as depicted, multiple portions of pre-processing may be performed at least partially in parallel across FIGS. 23B-D, including the APA and CTC segmentation techniques.

Turning to FIG. 23B, and following the generation of APA data chunks at 4112 that are of appropriate size for use as inputs to the APA segmentation technique (e.g., the data chunks 3110a), at 4120, core(s) of a processor of either a node device or of the control device may analyze the chunk of speech audio represented by each APA data chunk to identify and measure the peak amplitude present therein. At 4122, with the peak amplitudes of each of the APA data chunks so measured, a pre-selected percentile amplitude may be derived from across all of the measured peak amplitudes from across all of the APA data chunks, and may be designated to serve as a threshold amplitude (e.g., the threshold amplitude 2232).

At 4124, the peak amplitude measured within each of the APA data chunks may be compared to the threshold amplitude. At 4126, each APA data chunk representing a chunk of speech audio having a peak amplitude greater than the threshold amplitude may be designated as a speech data chunk (e.g., a speech data chunk 3110s), and each APA data chunk representing a chunk of speech audio having a peak amplitude less than the threshold amplitude may be designated as a pause data chunk (e.g., a pause data chunk 3110p). Again, in various differing embodiments, each APA data chunk representing a chunk of speech audio having a peak amplitude equal to the threshold amplitude may be designated as either a speech data chunk or a pause data chunk.

At 4130, a first set of temporally consecutive APA data chunks of a pre-selected quantity, starting with the temporally earliest one of the APA data chunks, may be selected and analyzed to identify the longest consecutive subset of the APA data chunks therein that have been designated as pause data chunks, thereby corresponding to the longest pause present across all of the corresponding consecutive chunks of speech audio represented by the set of APA data chunks. The identified longest pause may be designated a likely sentence pause.

At 4132, an indication of the just-designated likely sentence pause may then be noted within an APA candidate set of likely sentence pauses (e.g., the APA candidate set 3118a of likely sentence pauses). As previously discussed, such an indication of a likely sentence pause within the APA candidate set may include an indication of the temporal location of the likely sentence pause within the entirety of the speech audio.

At 4134, a check may be made of whether there are any more APA data chunks beyond (i.e., temporally later than) the set of APA data chunks just analyzed. If so, then at 4136, another set of temporally consecutive APA data chunks of a pre-selected quantity may be selected, where the newly selected set may start either 1) with the APA chunk that temporally follows the subset of APA data chunks that make up the longest pause of the last set, or 2) amidst the subset of APA data chunks that make up the longest pause of the last set (e.g., with the APA chunk at the midpoint of that longest pause). The newly selected set of APA data chunks may then be analyzed to identify the longest consecutive subset of the APA data chunks with the new set that have been designated as pause data chunks, thereby corresponding to the longest pause present across all of the corresponding consecutive chunks of speech audio represented by the set of APA data chunks. The identified longest pause may be designated a likely sentence pause. Again, at 4132, an indication of the just-designated likely sentence pause may then be noted within the APA candidate set of likely sentence pauses.

Figure 23E:
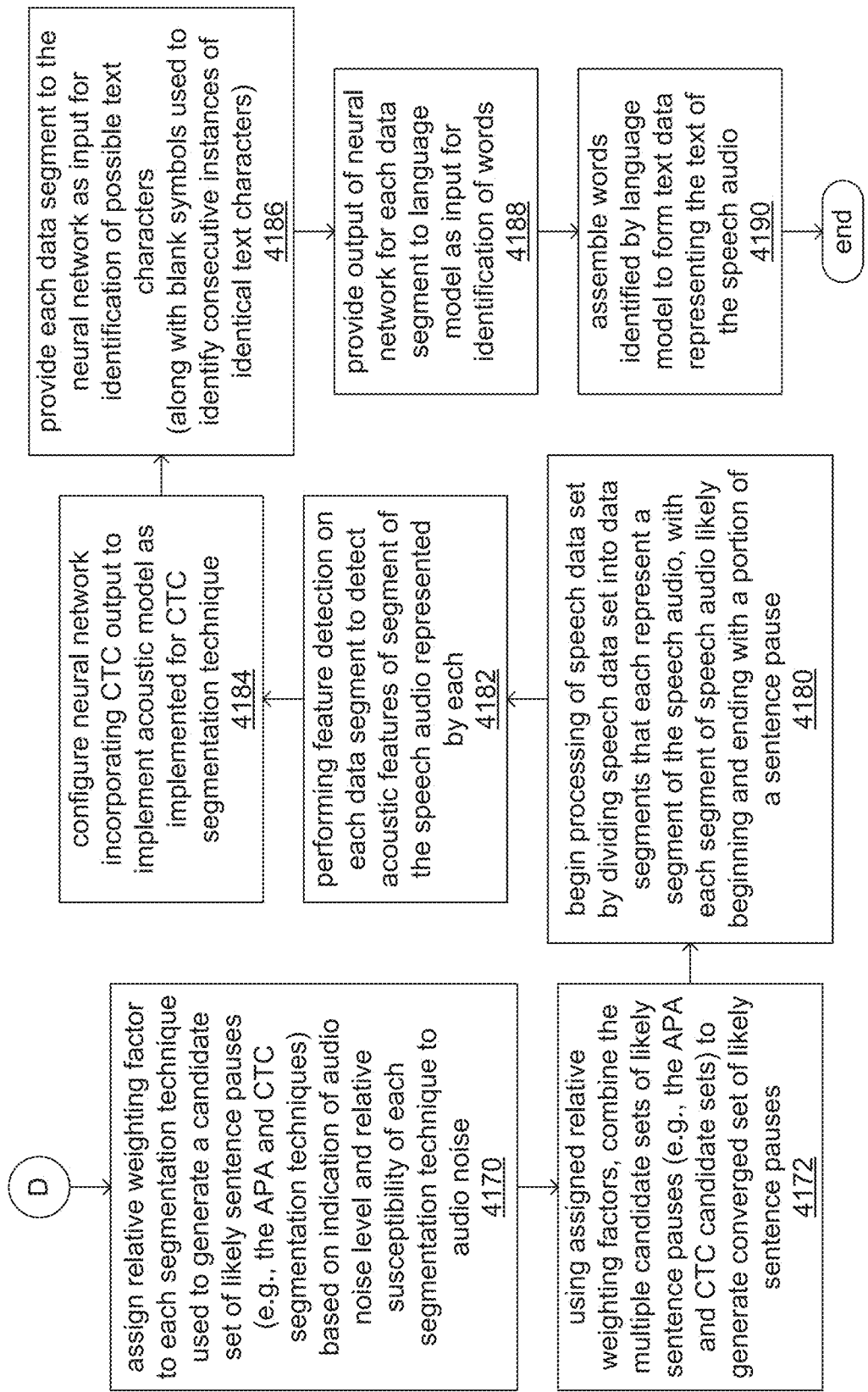

However, if at 4134, there are no more APA data chunks beyond the set of APA data chunks just analyzed, then a combining of multiple candidate sets of likely sentence pauses may be performed at 4170 and 4172 in FIG. 23E, as will shortly be described.

Turning to FIG. 23C, and following the generation of APA data chunks at 4112 that are of appropriate size for use as inputs to the APA segmentation technique (e.g., the data chunks 3110a), at 4140, core(s) of a processor of either a node device or of the control device may analyze the chunk of speech audio represented by each APA data chunk to identify and measure an amplitude of audio noise present therein. As previously discussed in reference to FIG. 16A, it may be that such measurements of a level of audio noise may be taken coincident with the taking of measurements of peak amplitude of each of the APA data chunks. However, it should be noted that other embodiments are possible in which measurements of a level of audio noise may be taken of other chunks generated for another of the multiple segmentation techniques, or measurement(s) may be taken of a level of audio noise in the speech audio at a time and/or in a manner that may entirely unconnected with any of the segmentation techniques.

At 4142, with the audio noise levels of each of the APA data chunks so measured, at least one indication of the audio noise level within the speech audio (e.g., the audio noise level 2235) may be derived using any of a variety of ways. By way of example, and as previously discussed, such an indicated audio noise level may be based on average noise levels, lowest noise levels, and/or highest noise levels across all of the APA data chunks.

Following the derivation of the indicated audio noise level, a combining of multiple candidate sets of likely sentence pauses may be performed at 4170 and 4172 in FIG. 23E, as will shortly be described, including the use of the indicated audio noise level.

Turning to FIG. 23D, and following the generation of CTC data chunks at 4112 that are of appropriate size for use as inputs to the CTC segmentation technique (e.g., the data chunks 3110*c*), at 4150, core(s) of a processor of either a node device or of the control device may configure a neural network of the node device or of the control device to implement an acoustic model. As has been discussed, the neural network that is so configured may incorporate a CTC output that would normally be used to output a blank symbol that provides an indication of their being consecutive instances of a character that are not to be merged. At 4152, the temporally earliest one of the CTC data chunks may be provided to the neural network as an input.

At 4154, if there are no strings of consecutive blank symbols output by the neural network, then a check may be made at 4164 of whether there are any more CTC data chunks remaining to be provided to the neural network as input. If there is at least one more of such CTC data chunks remaining, then the temporally next CTC data chunk (i.e., the next CTC data chunk in order from the temporally earliest to the temporally latest) may be provided to the neural network as input at 4166.

However, if at 4154, there are one or more strings of consecutive blank symbols output by the neural network in response to the provision thereto of a CTC data chunk as input, then at 4156, the length of each of those one or more strings may be compared to a pre-determined threshold blank string length. At 4158, any string of consecutive blank symbols that is at least as long as the threshold blank string length, then each such string may be designated as a likely sentence pause. If, at 4160, there are no strings of consecutive blank symbols in the output of the neural network that have been so designated as likely sentence pauses, then the check of whether there are any more CTC data chunks remaining may be made at 4164. However, if at 4160, there are one or more strings of consecutive blank symbols that have been designated as likely sentence pauses, then for each such string, an indication of a likely sentence pause may then be noted within the CTC candidate set of likely sentence pauses at 4162, and then the check may be made at 4164 for more CTC data chunks.

However, if at 4164, there are no more CTC data chunks, then a combining of multiple candidate sets of likely sentence pauses may be performed at 4170 and 4172 in FIG. 23E, as will now be described.

Turning to FIG. 23E, at 4170, core(s) of a processor of either a node device or of the control device may assign relative weighting factors to each of the segmentation techniques by which a candidate set of likely sentence pauses has been generated. As has been discussed, such weighting factors may be made dynamically adjustable based on the earlier derived indication of audio noise level, and this may be done in recognition of the differing degrees to which each of the segmentation techniques is susceptible to the presence of audio noise within speech audio. At 4172, the assigned relative weighting factors may be used in the combining of the multiple candidate sets of likely sentences pauses to generate the converged set thereof.

At 4180, core(s) of a processor of each of one or more node devices, and/or cores(s) of a processor of the control device may re-divide the speech data set into data segments that each represent a segment of the speech audio. With the provision of segments of the speech audio to use as an input, the processing operations to perform the requested speech-to-text may begin. As has been discussed, due to the performance of the pre-processing operations, each point at which the speech audio is divided to form segments is at least likely to be a midpoint of a sentence pause, thereby making it more likely that each segment will fully contain the complete pronunciations of phonemes, words and/or entire sentences. As also discussed, it may be that the segments are distributed among multiple node devices or among multiple execution threads within the control device to enhance the speed at which such processing is performed.

At 4182, feature detection is performed on each segment to detect instances of a pre-selected set of acoustic features that are to be provide as an input to an acoustic model for purposes of identifying likely text characters. At 4184, within each node device and/or within the control device, core(s) of a processor may configure neural network(s) to implement an acoustic model for use in character identification. Again, the same type of neural network with CTC output may be configured to re-implement the same acoustic model as was used during pre-processing in the CTC segmentation technique.

At 4186, each data segment is provided to such a neural network as input for the identification of likely text characters (along with blank symbols used to identify instances of identical consecutive text characters). At 4188, such identified text characters are provided to implementation(s) of a language model as input for the identification of words.

At 4190, a processor of a node device or a processor of the control device may assemble the identified words, in temporal order, to form text data that represents the text into which the speech audio of the speech data set has been converted (e.g., the text data 2519). As previously discussed, such text data may then be transmitted back to the device from which the request was received to perform the speech-to-text conversion.

Figure 24:
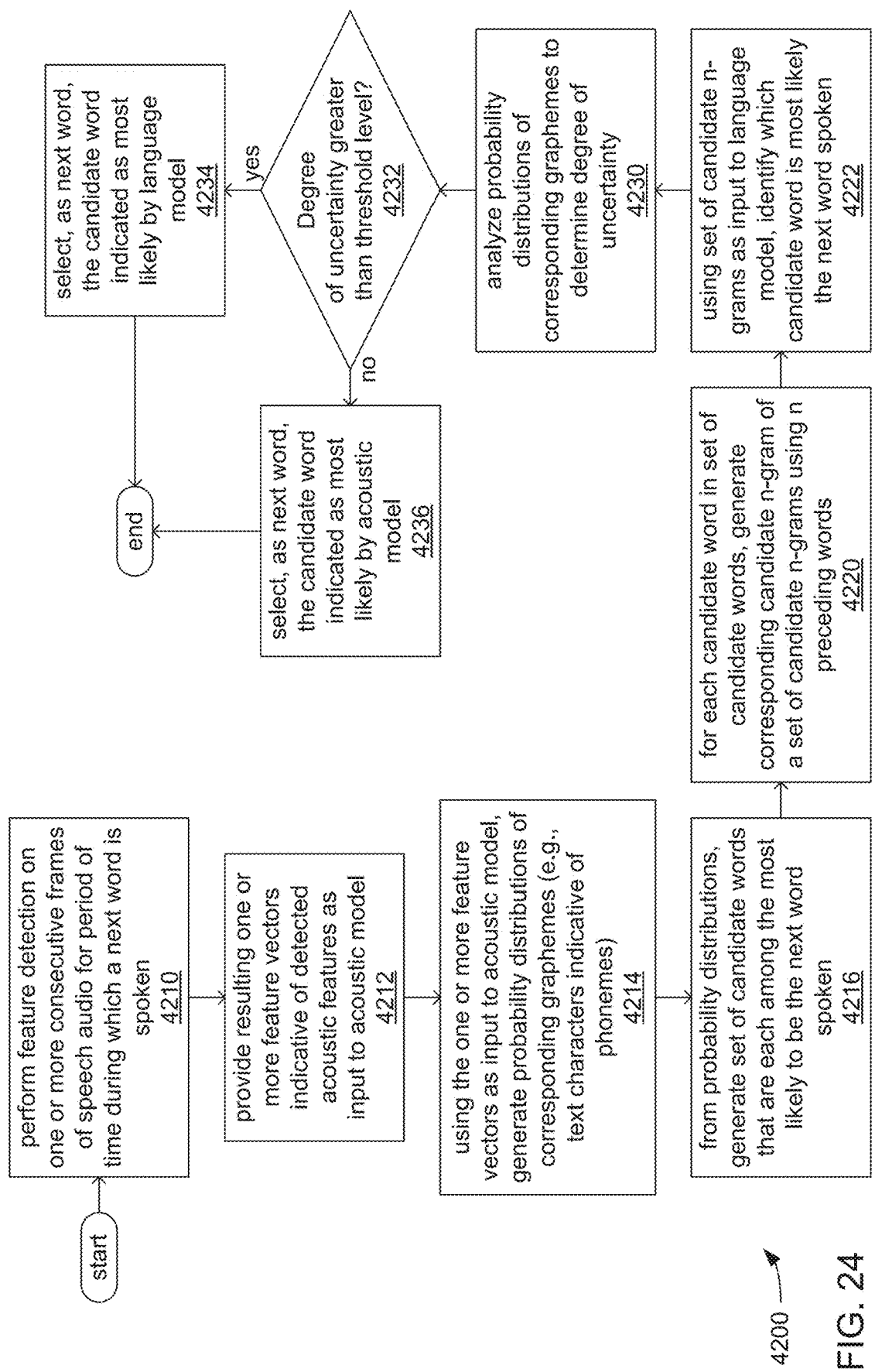
FIG. 24 illustrates an example logic flow of operations performed within a processing system to perform speech-to-text processing operations.

FIG. 24 illustrates an example embodiment of another logic flow 4200. The logic flow 4200 may be representative of some or all of the operations executed by one or more embodiments described herein. More specifically, the logic flow 4200 may illustrate operations performed by core(s) 2351 and/or 2551 of the processor(s) 2350 and/or 2550 of the node devices 2300 and/or of the control device 2500, respectively, in executing various ones of the control routines 2340 and 2540.

At 4210, core(s) of processor(s) of a node device of a processing system (e.g., the core(s) 2351 of the processor(s) 2350 of one of the node devices 2300 of the processing system 2000 of either of FIG. 13A or 13B), or core(s) of processor(s) of a control device of the processing system (e.g., the core(s) 2551 of the processor(s) 2550 of the control device 2500 of the processing system 2000 of either of FIG. 13A or 13B) may perform feature detection on one or more consecutive frames of a segment of speech audio covering a period of time during which a next word was spoken. As has been discussed, the output of the performance of feature detection may be data structures (e.g., the feature vectors 3142) that provide indications of detected instances of various acoustic features, along with indications of when those instances occurred.

At 4212, such feature vectors generated from the performance of feature detection may be provided as input to an acoustic model. As has been discussed, the acoustic model may be implemented using a neural network (e.g., the neural network 2355 or 2555, which may include a CTC output 2356 or 2556, respectively), or using any of a variety of other technologies.

At 4214, the core(s) of the processor(s) of either the node device or the control device may be caused to use the acoustic model with the feature vectors as input to generate corresponding probability distributions of graphemes. As has been discussed, each grapheme may be correlated, either individually or in various combinations, to one or more speech sounds. As a result, each of the probability distributions provides an indication of relative probabilities of various different speech sounds having been uttered at a particular time.

At 4216, from multiple probability distributions that are associated with the pronunciation of the next single word that was spoken and that is to be identified for addition to a transcript, a set of a pre-determined quantity of candidate words (e.g., the candidate words 3145) may be generated, where each of the candidate words is among those that are most likely to be the next spoken word. At 4220, for each candidate word in the set of candidate words, a corresponding candidate n-gram may be generated that is to become part of a corresponding set of candidate n-grams (e.g., the set 3146 of candidate n-grams).

At 4222, the core(s) of the processor(s) of either the node device or the control device may be caused to use the language model with the set of candidate n-grams as input to generate a corresponding set of probabilities (e.g., one of the probability sets 3147). As has been discussed, where the language model is based on an n-gram corpus (e.g., one of the corpus data sets 3400), beam searches may be used to retrieve the per-n-gram probabilities stored as part of the n-gram corpus. As a result, each of the probability sets provides the relative probabilities of the set of n-grams, thereby enabling the most probable candidate n-gram of that set to be determined, and in so doing, enabling the most probable corresponding candidate word to be identified as the next most likely word to be spoken, according to the language model.

At 4230, each of the probability distributions for graphemes associated with the next word may be analyzed to derive an aggregate degree of uncertainty for those probability distributions. If, at 4232, the resulting degree of uncertainty is greater than a pre-determined threshold level, then at 4234, greater weighting may be given to relying on the language model to identify the next word most likely to have been spoken. However, if at 4232, the resulting degree of uncertainty is less than the pre-determined threshold level, then at 4236, greater weighting may be given to relying on the acoustic model to identify the next word most likely to have been spoken.

In various embodiments, each of the processors 2350, 2550 and 2750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor(s) 2350 of each of the one or more node devices 2300 may be selected to efficiently perform the analysis of multiple instances of pre-processing, processing and/or post-processing operations at least partially in parallel. By way of example, the processors 2350 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2310, 2340, 2370, 2510, 2540, 2570 and 2740, including the components of which each is composed, may be selected to be operative on whatever type of processor or processors that are selected to implement applicable ones of the processors 2350, 2550 and/or 2750 within each one of the devices 2300, 2500 and/or 2700, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2350, 2550 and/or 2750. Where one or more device drivers are included, those device drivers may provide support for any of a variety of other components, whether hardware or software components, of the devices 2300, 2500 and/or 2700.

In various embodiments, each of the storages 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2560 in embodiments in which the one or more of the federated devices 2500 provide federated spaces 2566, or the storage devices 2600 in embodiments in which the one or more storage devices 2600 provide federated spaces 2566, may be implemented with a redundant array of independent discs (RAID) of a RAID level selected to provide fault tolerance to objects stored within the federated spaces 2566.

In various embodiments, the input device 2720 may be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, the display 2780 may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 may be a touchscreen display such that the input device 2720 may be incorporated therein as touch-sensitive components thereof.

In various embodiments, each of the network interfaces 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

However, in a specific embodiment, one or more of the network interfaces 2390 and/or 2590 may be implemented with multiple copper-based or fiber-optic based network interface ports to provide redundant and/or parallel pathways in exchanging at least the speech data sets 2130.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the speech data sets 2130 are not dependent on, nor constrained by, existing API architectures and/or supporting communications protocols. More broadly, there is nothing in the manner in which the speech data sets 2130 may be organized in storage, transmission and/or distribution via the network 2999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising at least one processor and a storage to store instructions that, when executed by the at least one processor, cause the at least one processor to perform operations comprising:

receive, from a requesting device via a network, a request to perform speech-to-text conversion of a specified speech data set representing speech audio;

in response to the request, the at least one processor is caused to perform pre-processing operations comprising:

derive an audio noise level based on at least one measure of a level of audio noise of the speech audio;

based on the audio noise level, derive a first relative weighting for a first segmentation technique for identifying likely sentence pauses in the speech audio and a second segmentation technique for identifying likely sentence pauses in the speech audio, wherein the first segmentation technique becomes more susceptible than the second segmentation technique to inaccuracies in identifying likely sentence pauses as the audio noise level increases; and based on the first relative weighting, select likely sentence pauses for inclusion in a converged set of likely sentence pauses from among the likely sentence pauses identified by the first segmentation technique and from among the likely sentence pauses identified by the second segmentation technique; and in response to the request, the at least one processor is caused to perform speech-to-text processing operations comprising:

based on the converged set of likely sentence pauses, divide the speech data set into multiple data segments that each represent a speech segment of multiple speech segments of the speech audio;

use an acoustic model with each data segment of the multiple data segments to identify candidate sets of words likely spoken in the speech audio;

based on the audio noise level, derive a second relative weighting for selecting each word to include in generating a transcript of the speech audio from candidate words indicated by the acoustic model as most likely spoken or candidate words indicated by a language model as most likely spoken; and transmit an indication of the generation of the transcript to the requesting device.

2. The apparatus of claim 1, wherein, in response to the request, the at least one processor is caused to perform further pre-processing operations of one of the first segmentation technique and the second segmentation technique, the further pre-processing operations comprising:
  divide the speech data set into multiple data chunks that each represent a chunk of multiple chunks of the speech audio;
  derive a threshold amplitude based on at least one peak amplitude of the speech audio;
  compare a peak amplitude of the chunk of the speech audio of each data chunk to the threshold amplitude;
  designate each data chunk with a peak amplitude that is below the threshold amplitude as a pause data chunk;
  within at least one set of temporally consecutive data chunks of the multiple data chunks, identify a longest subset of temporally consecutive pause data chunks; and
  within each set of the at least one set of temporally consecutive data chunks, designate the longest subset of temporally consecutive pause data chunks as a likely sentence pause.

3. The apparatus of claim 2, wherein the at least one processor is caused to derive the audio noise level at least partially in parallel with the derivation of the threshold amplitude.

4. The apparatus of claim 1, wherein, in response to the request, the at least one processor is caused to perform further pre-processing operations of one of the first segmentation technique and the second segmentation technique, the further pre-processing operations comprising:
  divide the speech data set into multiple data chunks that each represent a chunk of multiple chunks of the speech audio;
  configure a neural network to implement the acoustic model, wherein the neural network comprises a connectionist temporal classification (CTC) output;
  provide each data chunk of the multiple data chunks to the neural network as an input and monitor the CTC output for a string of blank symbols generated based on the speech chunk;
  compare a length of each string of blank symbols from the CTC output to a predetermined blank threshold length; and
  designate each string of blank symbols from the CTC output that is at least as long as the predetermined blank threshold length as a likely sentence pause.

5. The apparatus of claim 1, wherein the at least one processor is caused, in response to the audio noise level exceeding a predetermined upper threshold noise level, to exclude likely sentence pauses identified by the first segmentation technique from inclusion in the converged set of likely sentence pauses.

6. The apparatus of claim 1, wherein, in response to the request, the at least one processor is caused to perform further speech-to-text processing operations comprising:
  use the acoustic model to generate a first set of probabilities of speech sounds within a portion of the speech audio;
  derive at least a first candidate word of a set of candidate words most likely spoken in the speech audio using the first set of probabilities;
  analyze the first set of probabilities to derive a degree of uncertainty of the first set of probabilities;
  in response to at least the degree of uncertainty and the second relative weighting, select either the first candidate word, or a second candidate word of the set of candidate words indicated as being most likely spoken based on a second set of probabilities generated by the language model, as a next word most likely spoken in the speech audio; and
  add the next word most likely spoken to the transcript.

7. The apparatus of claim 6, wherein the at least one processor is caused to condition expending processing resources to use the language model to generate the second set of probabilities on at least one of the degree of uncertainty of the first set of probabilities being less than a threshold degree of uncertainty or the audio noise level being less than a predetermined lower threshold audio noise level.

8. The apparatus of claim 6, wherein the at least one processor is caused, in response to the audio noise level exceeding a predetermined upper threshold audio noise level, to exclude probabilities generated by the acoustic model in selecting words to include in the transcript.

9. The apparatus of claim 6, wherein:
  the first set of probabilities comprises at least one probability distribution indicative of relative probabilities of utterance of each grapheme of a pre-selected set of graphemes at a time during pronunciation of speech sounds of the next word; and
  analysis of the first set of probabilities to derive the degree of uncertainty comprises deriving a degree of entropy or perplexity for each probability distribution of the at least one probability distribution.

10. The apparatus of claim 6, wherein:
  the language model is based on an n-gram corpus comprising n-grams correlated to corresponding probabilities of use in a pre-selected language; and
  the use of the language model to generate the second set of probabilities comprises the at least one processor performing operations comprising:
    for each candidate word of the set of candidate words, generate a corresponding candidate n-gram of a set of candidate n-grams that comprises a combination of the candidate word and at least one preceding word spoken in the speech audio;
    for each candidate n-gram, search the n-gram corpus for the candidate n-gram to retrieve the corresponding probability for inclusion in the second set of probabilities;
    determine which candidate n-gram of the set of candidate n-grams corresponds to the highest probability among the second set of probabilities; and
    indicate the candidate word that corresponds to the candidate n-gram that corresponds to the highest probability of the second set of probabilities as being the second candidate word.

11. A computer-program product tangibly embodied in a non-transitory machine-readable storage medium, the computer-program product including instructions operable to cause at least one processor to perform operations comprising:
  receive, from a requesting device via a network, a request to perform speech-to-text conversion of a specified speech data set representing speech audio;
  in response to the request, the at least one processor is caused to perform pre-processing operations comprising:
    derive an audio noise level based on at least one measure of a level of audio noise of the speech audio;

based on the audio noise level, derive a first relative weighting for a first segmentation technique for identifying likely sentence pauses in the speech audio and a second segmentation technique for identifying likely sentence pauses in the speech audio, wherein the first segmentation technique becomes more susceptible than the second segmentation technique to inaccuracies in identifying likely sentence pauses as the audio noise level increases; and based on the first relative weighting, select likely sentence pauses for inclusion in a converged set of likely sentence pauses from among the likely sentence pauses identified by the first segmentation technique and from among the likely sentence pauses identified by the second segmentation technique; and in response to the request, the at least one processor is caused to perform speech-to-text processing operations comprising:

based on the converged set of likely sentence pauses, divide the speech data set into multiple data segments that each represent a speech segment of multiple speech segments of the speech audio;

use an acoustic model with each data segment of the multiple data segments to identify candidate sets of words likely spoken in the speech audio;

based on the audio noise level, derive a second relative weighting for selecting each word to include in generating a transcript of the speech audio from candidate words indicated by the acoustic model as most likely spoken or candidate words indicated by a language model as most likely spoken; and transmit an indication of the generation of the transcript to the requesting device.

12. The computer-program product of claim 11, wherein, in response to the request, the at least one processor is caused to perform further pre-processing operations of one of the first segmentation technique and the second segmentation technique, the further pre-processing operations comprising:

divide the speech data set into multiple data chunks that each represent a chunk of multiple chunks of the speech audio;

derive a threshold amplitude based on at least one peak amplitude of the speech audio;

compare a peak amplitude of the chunk of the speech audio of each data chunk to the threshold amplitude;

designate each data chunk with a peak amplitude that is below the threshold amplitude as a pause data chunk;

within at least one set of temporally consecutive data chunks of the multiple data chunks, identify a longest subset of temporally consecutive pause data chunks; and within each set of the at least one set of temporally consecutive data chunks, designate the longest subset of temporally consecutive pause data chunks as a likely sentence pause.

13. The computer-program product of claim 12, wherein the at least one processor is caused to derive the audio noise level at least partially in parallel with the derivation of the threshold amplitude.

14. The computer-program product of claim 11, wherein, in response to the request, the at least one processor is caused to perform further pre-processing operations of one of the first segmentation technique and the second segmentation technique, the further pre-processing operations comprising:

divide the speech data set into multiple data chunks that each represent a chunk of multiple chunks of the speech audio;

configure a neural network to implement the acoustic model, wherein the neural network comprises a connectionist temporal classification (CTC) output;

provide each data chunk of the multiple data chunks to the neural network as an input and monitor the CTC output for a string of blank symbols generated based on the speech chunk;

compare a length of each string of blank symbols from the CTC output to a predetermined blank threshold length; and designate each string of blank symbols from the CTC output that is at least as long as the predetermined blank threshold length as a likely sentence pause.

15. The computer-program product of claim 11, wherein the at least one processor is caused, in response to the audio noise level exceeding a predetermined upper threshold noise level, to exclude likely sentence pauses identified by the first segmentation technique from inclusion in the converged set of likely sentence pauses.

16. The computer-program product of claim 11, wherein, in response to the request, the at least one processor is caused to perform further speech-to-text processing operations comprising:

use the acoustic model to generate a first set of probabilities of speech sounds within a portion of the speech audio;

derive at least a first candidate word of a set of candidate words most likely spoken in the speech audio using the first set of probabilities;

analyze the first set of probabilities to derive a degree of uncertainty of the first set of probabilities;

in response to at least the degree of uncertainty and the second relative weighting, select either the first candidate word, or a second candidate word of the set of candidate words indicated as being most likely spoken based on a second set of probabilities generated by the language model, as a next word most likely spoken in the speech audio; and add the next word most likely spoken to the transcript.

17. The computer-program product of claim 16, wherein the at least one processor is caused to condition expending processing resources to use the language model to generate the second set of probabilities on at least one of the degree of uncertainty of the first set of probabilities being less than a threshold degree of uncertainty or the audio noise level being less than a predetermined lower threshold audio noise level.

18. The computer-program product of claim 16, wherein the at least one processor is caused, in response to the audio noise level exceeding a predetermined upper threshold audio noise level, to exclude probabilities generated by the acoustic model in selecting words to include in the transcript.

19. The computer-program product of claim 16, wherein:

the first set of probabilities comprises at least one probability distribution indicative of relative probabilities of utterance of each grapheme of a pre-selected set of graphemes at a time during pronunciation of speech sounds of the next word; and analysis of the first set of probabilities to derive the degree of uncertainty comprises deriving a degree of entropy or perplexity for each probability distribution of the at least one probability distribution.

20. The computer-program product of claim 16, wherein:
the language model is based on an n-gram corpus comprising n-grams correlated to corresponding probabilities of use in a pre-selected language; and
the use of the language model to generate the second set of probabilities comprises the at least one processor performing operations comprising:
  for each candidate word of the set of candidate words, generate a corresponding candidate n-gram of a set of candidate n-grams that comprises a combination of the candidate word and at least one preceding word spoken in the speech audio;
  for each candidate n-gram, search the n-gram corpus for the candidate n-gram to retrieve the corresponding probability for inclusion in the second set of probabilities;
  determine which candidate n-gram of the set of candidate n-grams corresponds to the highest probability among the second set of probabilities; and
  indicate the candidate word that corresponds to the candidate n-gram that corresponds to the highest probability of the second set of probabilities as being the second candidate word.

21. A computer-implemented method comprising:
receiving, by at least one processor, and from a requesting device via a network, a request to perform speech-to-text conversion of a specified speech data set representing speech audio;
in response to the request, performing pre-processing operations comprising:
  deriving, by the at least one processor, an audio noise level based on at least one measure of a level of audio noise of the speech audio;
  based on the audio noise level, deriving, by the at least one processor, a first relative weighting for a first segmentation technique for identifying likely sentence pauses in the speech audio and a second segmentation technique for identifying likely sentence pauses in the speech audio, wherein the first segmentation technique becomes more susceptible than the second segmentation technique to inaccuracies in identifying likely sentence pauses as the audio noise level increases; and
  based on the first relative weighting, selecting, by the at least one processor, likely sentence pauses for inclusion in a converged set of likely sentence pauses from among the likely sentence pauses identified by the first segmentation technique and from among the likely sentence pauses identified by the second segmentation technique; and
in response to the request, performing speech-to-text processing operations comprising:
  based on the converged set of likely sentence pauses, dividing the speech data set into multiple data segments that each represent a speech segment of multiple speech segments of the speech audio;
  using, by the at least one processor, an acoustic model with each data segment of the multiple data segments to identify candidate sets of words likely spoken in the speech audio;
  based on the audio noise level, deriving, by the at least one processor, a second relative weighting for selecting each word to include in generating a transcript of the speech audio from candidate words indicated by the acoustic model as most likely spoken or candidate words indicated by a language model as most likely spoken; and
  transmitting, from the at least one processor, an indication of the generation of the transcript to the requesting device.

22. The computer-implemented method of claim 21, comprising, in response to the request, performing further pre-processing operations of one of the first segmentation technique and the second segmentation technique, the further pre-processing operations comprising:
  dividing the speech data set into multiple data chunks that each represent a chunk of multiple chunks of the speech audio;
  deriving, by the at least one processor, a threshold amplitude based on at least one peak amplitude of the speech audio;
  comparing, by the at least one processor, a peak amplitude of the chunk of the speech audio of each data chunk to the threshold amplitude;
  designating, by the at least one processor, each data chunk with a peak amplitude that is below the threshold amplitude as a pause data chunk;
  within at least one set of temporally consecutive data chunks of the multiple data chunks, identifying, by the at least one processor, a longest subset of temporally consecutive pause data chunks; and
  within each set of the at least one set of temporally consecutive data chunks, designating, by the at least one processor, the longest subset of temporally consecutive pause data chunks as a likely sentence pause.

23. The computer-implemented method of claim 22, comprising deriving, by the at least one processor, the audio noise level at least partially in parallel with the derivation of the threshold amplitude.

24. The computer-implemented method of claim 21, comprising, in response to the request, performing further pre-processing operations of one of the first segmentation technique and the second segmentation technique, the further pre-processing operations comprising:
  dividing the speech data set into multiple data chunks that each represent a chunk of multiple chunks of the speech audio;
  configuring, by the at least one processor, a neural network to implement the acoustic model, wherein the neural network comprises a connectionist temporal classification (CTC) output;
  providing, by the at least one processor, each data chunk of the multiple data chunks to the neural network as an input and monitor the CTC output for a string of blank symbols generated based on the speech chunk;
  comparing, by the at least one processor, a length of each string of blank symbols from the CTC output to a predetermined blank threshold length; and
  designating, by the at least one processor, each string of blank symbols from the CTC output that is at least as long as the predetermined blank threshold length as a likely sentence pause.

25. The computer-implemented method of claim 21, comprising, in response to the audio noise level exceeding a predetermined upper threshold noise level, excluding likely sentence pauses identified by the first segmentation technique from inclusion in the converged set of likely sentence pauses.

26. The computer-implemented method of claim 21, comprising, in response to the request, performing further speech-to-text processing operations comprising:
  using, by the at least one processor, the acoustic model to generate a first set of probabilities of speech sounds within a portion of the speech audio;

deriving, by the at least one processor, at least a first candidate word of a set of candidate words most likely spoken in the speech audio using the first set of probabilities;

analyzing, by the at least one processor, the first set of probabilities to derive a degree of uncertainty of the first set of probabilities;

in response to at least the degree of uncertainty and the second relative weighting, selecting, by the at least one processor, either the first candidate word, or a second candidate word of the set of candidate words indicated as being most likely spoken based on a second set of probabilities generated by the language model, as a next word most likely spoken in the speech audio; and adding the next word most likely spoken to the transcript.

27. The computer-implemented method of claim 26, comprising conditioning, by the at least one processor, expending processing resources to use the language model to generate the second set of probabilities on at least one of the degree of uncertainty of the first set of probabilities being less than a threshold degree of uncertainty or the audio noise level being less than a predetermined lower threshold audio noise level.

28. The computer-implemented method of claim 26, comprising, in response to the audio noise level exceeding a predetermined upper threshold audio noise level, excluding, by the at least one processor, probabilities generated by the acoustic model in selecting words to include in the transcript.

29. The computer-implemented method of claim 26, wherein:
the first set of probabilities comprises at least one probability distribution indicative of relative probabilities of utterance of each grapheme of a pre-selected set of graphemes at a time during pronunciation of speech sounds of the next word; and analysis of the first set of probabilities to derive the degree of uncertainty comprises performing operations comprising deriving, by the at least one processor, a degree of entropy or perplexity for each probability distribution of the at least one probability distribution.

30. The computer-implemented method of claim 26, wherein:
the language model is based on an n-gram corpus comprising n-grams correlated to corresponding probabilities of use in a pre-selected language; and the use of the language model to generate the second set of probabilities comprises performing operations comprising:
for each candidate word of the set of candidate words, generating, by the at least one processor, a corresponding candidate n-gram of a set of candidate n-grams that comprises a combination of the candidate word and at least one preceding word spoken in the speech audio;

for each candidate n-gram, searching, by the at least one processor, the n-gram corpus for the candidate n-gram to retrieve the corresponding probability for inclusion in the second set of probabilities;

determining, by the at least one processor, which candidate n-gram of the set of candidate n-grams corresponds to the highest probability among the second set of probabilities; and indicating the candidate word that corresponds to the candidate n-gram that corresponds to the highest probability of the second set of probabilities as being the second candidate word.

* * * * *